United States Patent
Maganti et al.

(10) Patent No.: US 11,336,462 B1
(45) Date of Patent: May 17, 2022

(54) SYSTEMS AND METHODS FOR POST-QUANTUM CRYPTOGRAPHY OPTIMIZATION

(71) Applicant: WELLS FARGO BANK, N.A., San Francisco, CA (US)

(72) Inventors: Ravi K. Maganti, Waxhaw, NC (US); Robert L. Carter, Jr., Pleasant Hill, IA (US); Bradford A. Shea, Mint Hill, NC (US); M. Erik Meinholz, Charlotte, NC (US); Jeff J. Stapleton, O'Fallon, MO (US); Peter Bordow, Fountain Hills, AZ (US); Pierre Arbajian, Matthews, NC (US); Abhijit Rao, Irvine, CA (US)

(73) Assignee: Wells Fargo Bank, N.A., San Francisco, CA (US)

( * ) Notice: Subject to any disclaimer, the term of this patent is extended or adjusted under 35 U.S.C. 154(b) by 254 days.

(21) Appl. No.: 16/566,026

(22) Filed: Sep. 10, 2019

(51) Int. Cl.
*H04L 9/32* (2006.01)
*H04L 9/30* (2006.01)
(Continued)

(52) U.S. Cl.
CPC .......... *H04L 9/3249* (2013.01); *H04L 9/0631* (2013.01); *H04L 9/0844* (2013.01);
(Continued)

(58) Field of Classification Search
CPC ... H04L 9/3249; H04L 9/0631; H04L 9/0844; H04L 9/0852; H04L 9/30–302; H04L 9/3263
See application file for complete search history.

(56) References Cited

U.S. PATENT DOCUMENTS

| 7,680,937 B2 * | 3/2010 | Miller ................... G06F 21/645 709/226 |
| 9,569,731 B2 | 2/2017 | Doi et al. |

(Continued)

FOREIGN PATENT DOCUMENTS

| CN | 106803784 A | 6/2017 |
| CN | 108429616 A | 8/2018 |

(Continued)

OTHER PUBLICATIONS

"Informative Report: Quantum Computing Risks to the Financial Services Industry," Accredited Standards Committee X9, Inc., ASC X9 IR 01-2019, 54 pages, (2019).

(Continued)

*Primary Examiner* — Daniel B Potratz
*Assistant Examiner* — D'Arcy Winston Straub
(74) *Attorney, Agent, or Firm* — Womble Bond Dickinson (US) LLP

(57) ABSTRACT

Systems, apparatuses, methods, and computer program products are disclosed for quantum computing (QC) detection. An example method includes generating QC detection data. The example method further includes generating a pair of asymmetric cryptographic keys comprising a public cryptographic key and a private cryptographic key, generating encrypted QC detection data based on the pair of asymmetric cryptographic keys, and destroying the private cryptographic key. The example method further includes monitoring a set of data environments for electronic information related to the encrypted QC detection data. Subsequently, the example method may include generating a QC detection alert control signal in response to detection of the electronic information related to the encrypted QC detection data.

20 Claims, 7 Drawing Sheets

(51) Int. Cl.
*H04L 9/08* (2006.01)
*H04L 9/06* (2006.01)

(52) U.S. Cl.
CPC ............ *H04L 9/0852* (2013.01); *H04L 9/302* (2013.01); *H04L 9/3263* (2013.01)

(56) References Cited

U.S. PATENT DOCUMENTS

| | | | |
|---|---|---|---|
| 10,043,035 | B2 | 8/2018 | Lafever et al. |
| 10,275,721 | B2 | 4/2019 | Dukatz et al. |
| 10,785,019 | B2* | 9/2020 | Feng ............... H04L 9/0841 |
| 2010/0043081 | A1* | 2/2010 | Kiayias .............. H04L 9/083 726/30 |
| 2016/0127217 | A1 | 5/2016 | Brichford |
| 2017/0351974 | A1 | 12/2017 | Rose et al. |
| 2018/0054304 | A1 | 2/2018 | Tanizawa |
| 2018/0083960 | A1 | 3/2018 | Sbeiti et al. |
| 2018/0083988 | A1 | 3/2018 | Kataoka et al. |
| 2018/0115523 | A1 | 4/2018 | Subbarayan et al. |
| 2018/0260564 | A1 | 9/2018 | Porteboeuf |
| 2018/0308007 | A1 | 10/2018 | Amin et al. |
| 2018/0367309 | A1 | 12/2018 | Reinhold |
| 2019/0052652 | A1 | 2/2019 | Takahashi et al. |
| 2019/0205790 | A1 | 7/2019 | Dukatz et al. |
| 2021/0144001 | A1* | 5/2021 | Noda ................. G06Q 20/065 |

FOREIGN PATENT DOCUMENTS

| | | |
|---|---|---|
| CN | 105959113 B | 11/2018 |
| CN | 108768629 A | 11/2018 |
| CN | 108768641 A | 11/2018 |
| CN | 108900298 A | 11/2018 |

OTHER PUBLICATIONS

"Quantum Techniques in Cryptographic Message Syntax (CMS)", Accredited Standards Committee X9, Inc, ASC X9 TR 50-2019, 42 pages, (2019).

Barker, "Recommendation for Key Management, Part 1: General", NIST Special Publication 800-57 Pt 1., Rev. 4, National Institute of Standards and Technology, 160 pages, (2016).

Bos et al., "Post-quantum key exchange for the TLS protocol from the ring learning with errors problem," 2015 IEEE Symposium on Security and Privacy, San Jose, CA, 2015, pp. 553-570, (2015).

Wankhede et al., "Securing Cloud Data Storage through Encryption," National Conference on Advanced Technologies in Computing and Networking, International Journal of Electronics, Communication & Soft Computing Science and Engineering, pp. 21-28, (2015).

"AI, quantum technologies and new cyber threats—are we prepared?" <http://dx.doi.org/10.1109/MMW.2005.1417991> dated Jun. 11, 2019.

* cited by examiner

SYSTEMS AND METHODS FOR POST-QUANTUM CRYPTOGRAPHY OPTIMIZATION

TECHNOLOGICAL FIELD

Example embodiments of the present disclosure relate generally to cryptography and, more particularly, to systems and methods for providing post-quantum cryptography (PQC).

BACKGROUND

Although still in its infancy, quantum computing and its boundless potential applications are of rapidly increasing interest to a broad array of industrial sectors, including simulation, artificial intelligence, healthcare, and financial services. Unlike classical computers, which process information in bits that can only represent one of two binary information states at a time, quantum computers process information in quantum bits (qubits) that can represent a coherent superposition of both binary information states at the same time. Further, two or more qubits may be entangled so that their physical properties are correlated even when separated by large distances, and quantum computers may simultaneously perform a vast number of operations on these entangled qubits. This massive parallelism allows quantum computers to perform incredibly complex calculations at speeds unimaginable today and solve certain classes of problems that are beyond the capability of today's most powerful supercomputers.

Reflecting this broad potential impact, companies from a variety of market sectors are investing substantial resources to develop these promising quantum computing theories into real-world quantum computing capabilities. However, this heightened interest and investment has yet to produce an enduring and functional quantum computer outside of a laboratory environment.

Nonetheless, there is widespread agreement among experts that quantum computers will disrupt current security protocols that protect global financial markets and governmental institutions. For example, most common public-key cryptography schemes, such as the widely-used Rivest-Shamir-Adleman (RSA) and Diffie-Hellman (DH) schemes, rely on the inability of classical computers to complete certain types of complex mathematical calculations, such as integer factorization and discrete logarithm computation, respectively, within a reasonable amount of time. A quantum computer implementing Shor's algorithm potentially could complete these complex calculations in a relatively short time and thereby determine the private keys used for current public-key systems from the corresponding public keys. Accordingly, there is an urgent need for data owners and hosting services to begin migrating their data and upgrading their systems to use quantum-resistant algorithms before quantum computing capabilities are realized. However, the sheer volume of this data and complexity of these systems presents myriad challenges to any such migration plan.

BRIEF SUMMARY

Computing systems, computing apparatuses, computer-implemented methods, and computer program products are disclosed herein for quantum computing (QC) detection that, in some instances, provides for improved post-quantum cryptography (PQC) for migrating classical information systems to quantum-resistant information systems using one or more of the PQC cryptographic techniques described herein. In some embodiments, the QC detection system provided herein solves the above problems by generating QC detection data (e.g., fictitious data), encrypting the QC detection data based on a cryptographic technique, and monitoring a set of data environments (e.g., internal networks, social media websites, the dark web) for electronic information related to the encrypted QC detection data. In some embodiments, the QC detection system provided herein further solves the above problems by detecting the electronic information related to the encrypted QC detection data (including, but not limited to, electronic information related to digitally-signed QC detection data or unencrypted QC detection data) and, in response, generating a QC detection alert control signal indicating that the cryptographic technique has been compromised by a quantum computer. By doing so, data owners and hosting services are able to avoid the traditional problems surrounding migrating classical information systems to quantum-resistant information systems. For instance, through performance of the above operations, data owners and hosting services can use the QC detection system described herein to detect realized QC threats and their capabilities and, in response, identify PQC cryptographic techniques for reducing the attack surface of their cryptographic operations, including, but not limited to, digital signatures and key transport mechanisms.

In one example embodiment, a system is provided for QC detection (e.g., detection of classic encryption compromise via QC). The system may comprise QC detection data generation circuitry configured to generate QC detection data. The system may further comprise cryptographic circuitry configured to generate a pair of asymmetric cryptographic keys comprising a public cryptographic key and a private cryptographic key, generate encrypted QC detection data based on the pair of asymmetric cryptographic keys, and destroy the private cryptographic key. The system may further comprise data monitoring circuitry configured to monitor a set of data environments for electronic information related to the encrypted QC detection data. In some embodiments, the data monitoring circuitry may be further configured to generate a QC detection alert control signal in response to detection of the electronic information related to the encrypted QC detection data.

In one example embodiment, an apparatus is provided for QC detection. The apparatus may comprise QC detection data generation circuitry configured to generate QC detection data. The apparatus may further comprise cryptographic circuitry configured to generate a pair of asymmetric cryptographic keys comprising a public cryptographic key and a private cryptographic key, generate encrypted QC detection data based on the pair of asymmetric cryptographic keys, and destroy the private cryptographic key. The apparatus may further comprise data monitoring circuitry configured to monitor a set of data environments for electronic information related to the encrypted QC detection data. In some embodiments, the data monitoring circuitry may be further configured to generate a QC detection alert control signal in response to detection of the electronic information related to the encrypted QC detection data.

In another example embodiment, a method is provided for QC detection. The method may comprise generating, by QC detection data generation circuitry, QC detection data. The method may further comprise generating, by cryptographic circuitry, a pair of asymmetric cryptographic keys comprising a public cryptographic key and a private cryptographic key. The method may further comprise generating, by the cryptographic circuitry, encrypted QC detection data based on the pair of asymmetric cryptographic keys. The method may further comprise destroying, by the cryptographic circuitry, the private cryptographic key. The method may further comprise monitoring, by data monitoring circuitry, a set of data environments for electronic information related to the encrypted QC detection data. In some embodiments, the method may further comprise generating, by the data monitoring circuitry, a QC detection alert control signal in response to detecting the electronic information related to the encrypted QC detection data.

In another example embodiment, a computer program product is provided for QC detection. The computer program product comprises at least one non-transitory computer-readable storage medium storing program instructions that, when executed, may cause a system to generate QC detection data. The program instructions, when executed, may further cause the system to generate a pair of asymmetric cryptographic keys comprising a public cryptographic key and a private cryptographic key. The program instructions, when executed, may further cause the system to generate encrypted QC detection data based on the pair of asymmetric cryptographic keys. The program instructions, when executed, may further cause the system to destroy the private cryptographic key. The program instructions, when executed, may further cause the system to monitor a set of data environments for electronic information related to the encrypted QC detection data.

The foregoing brief summary is provided merely for purposes of summarizing some example embodiments illustrating some aspects of the present disclosure. Accordingly, it will be appreciated that the above-described embodiments are merely examples and should not be construed to narrow the scope of the present disclosure in any way. It will be appreciated that the scope of the present disclosure encompasses many potential embodiments in addition to those summarized herein, some of which will be described in further detail below.

BRIEF DESCRIPTION OF THE FIGURES

The accompanying figures, which are not necessarily drawn to scale, illustrate embodiments and features of the present disclosure. Together with the specification, including the brief summary above and the detailed description below, the accompanying figures serve to explain the embodiments and features of the present disclosure. The components illustrated in the figures represent components that may or may not be present in various embodiments or features of the disclosure described herein. Accordingly, some embodiments or features of the present disclosure may include fewer or more components than those shown in the figures while not departing from the scope of the disclosure.

DETAILED DESCRIPTION

Figure 1:
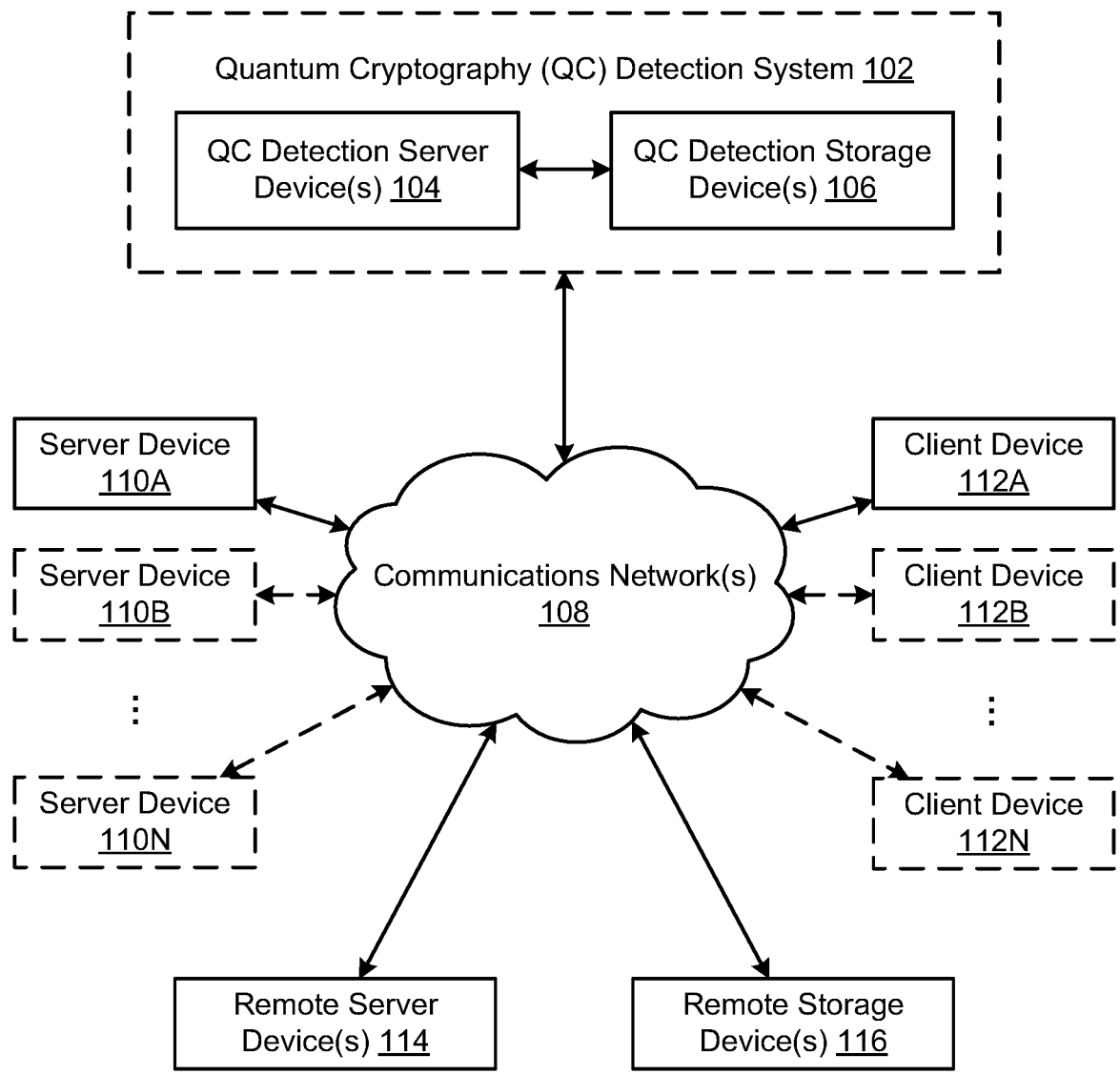
FIG. 1 illustrates a system diagram of a set of devices that may be involved in some example embodiments described herein.

Some embodiments of the present disclosure will now be described more fully hereinafter with reference to the accompanying figures, in which some, but not all embodiments of the disclosures are shown. Indeed, these disclosures may be embodied in many different forms and should not be construed as limited to the embodiments set forth herein; rather, these embodiments are provided so that this disclosure will satisfy applicable legal requirements. Like numbers refer to like elements throughout.

Overview

As noted above, methods, apparatuses, systems, and computer program products are described herein that provide for QC detection for use in migrating classical information systems to quantum-resistant information systems using one or more of the PQC cryptographic techniques described herein. Traditionally, data owners and third-party hosting services use hybrid cryptosystems to safeguard the confidentiality, integrity, and authenticity of enormous volumes of protected data and complex IT systems. These hybrid cryptosystems typically use a combination of asymmetric cryptography (e.g., public key cryptography), such as the Rivest-Shamir-Adleman (RSA) cryptosystem, and symmetric cryptography (e.g., secret key cryptography), such as the Advanced Encryption Standard (AES). One example of a modern hybrid cryptosystem is the Transport Layer Security (TLS) protocol, which relies on asymmetric cryptography for authentication and key management to establish session keys, and symmetric cryptography for session encryption and integrity validation.

However, these cryptosystems are vulnerable to quantum algorithms implemented on quantum computers. For instance, asymmetric encryption, key exchange, and digital signature rely on mathematical problems such as the integer factorization problem (e.g., as used in RSA) and the discrete logarithm problem (e.g., as used in Digital Signature Algorithm (DSA), Elliptic Curve DSA (ECDSA), Diffie-Hellman (DH), and Elliptic Curve DH (ECDH)). It is widely believed that a large-scale fault tolerant quantum computer could effectively break modern public key cryptosystems by solving instances of the integer factorization problem and the discrete logarithm problem quickly enough that keys reverse engineered based on those solutions would still be valid.

In one illustrative example, a quantum computer implementing Shor's algorithm could determine the private keys used for current public-key systems in a relatively short time because Shor's algorithm provides a faster cryptanalysis method for solving integer factorization than a brute force method (e.g., guessing prime numbers). For instance, Shor's algorithm uses the quantum Fourier transform (QFT) instead of its slower classical counterpart, the fast Fourier transform (FFT). Further, Shor's algorithm can be modified to compute discrete logarithms, including discrete logarithms used for elliptic-curve cryptography (ECC).

In another illustrative example, a quantum computer implementing Grover's algorithm could effectively perform an exhaustive key search because Grover's algorithm provides quadratic speedup and thereby could brute-force attack an N-bit symmetric cryptographic key in only about $2^{(N/2)}$ iterations. In some instances, for symmetric cryptographic techniques that support a doubled key length (e.g., AES supports doubling a 128-bit key to 256 bits), doubling the key length of the symmetric cryptographic key may provide sufficient protection against Grover's algorithm because a brute-force attack on a 2N-bit symmetric cryptographic key would require about $2^N$ iterations. For example, a 256-bit symmetric cryptographic key (e.g., AES-256) may only provide 128 bits of security in a quantum computing environment. However, any migration plan that involves doubling the key length of the symmetric cryptographic key must also evaluate the impact of the doubled key length on the performance of related applications and the additional requirements of computational resources.

Although quantum computers capable of such feats are still believed to be several years away, the threat of a "harvest now and decrypt later attack" makes quantum computing an immediate real threat, even if the threat will not be actionable until a sufficiently robust quantum computer is developed in the future. The "harvest now and decrypt later attack" is a long-game attack where a bad actor scrapes, collects, or harvests (e.g., records and stores) encrypted data, such as data streaming through the Internet or cloud, by the way of breaches or passive interception and then hoard the encrypted data, waiting for the day when quantum computers can determine the cryptographic keys to the harvested data. This bad actor could be storing data to or from a specific website, server, email client, or other target of attack or, given sufficient motivation and resources, recording petabytes of data each hour from general internet traffic. Once quantum computers are capable of determining the cryptographic keys associated with the harvested encrypted data, the bad actor might use those cryptographic keys to decrypt the previously encrypted data. For instance, persistent data, such as mortgage information and financial records, encrypted or digitally signed with today's cryptographic algorithms will be at risk even if the necessary quantum computing technology is not available for seven to ten years or even later. Subsequently, with advancements in artificial intelligence and machine learning and the exponential increase in data processing compute power, a bad actor could attack a data vault to extract meaningful information from the decrypted petabytes of data.

These risks are amplified by the lengthy data retention requirements (e.g., security shelf-life) mandated by government agencies, such as the U.S. Federal Deposit Insurance Corporation (FDIC). Example data retention requirements for various classes of data records listed in the FDIC's Records Retention Schedule are shown below in Table 1.

TABLE 1

Example data retention requirements for various classes of data records listed in the FDIC's Records Retention Schedule.

| Record Class | Data Retention Requirement (also referred to as "security shelf-life") |
| --- | --- |
| Tax Information | 7 years |
| Mortgages | 30 Years |
| Auto Loans | 6 years |
| Equal Credit Opportunity Act | 25 months |
| Truth in Lending Act | 2 years |
| Bank Secrecy Act | 5 years |
| FDIC Activities | Permanent |
| Personnel Management (PER4100) | 56 years |
| Non-Judicial Matters (LAW1330) | Close of Matter + 10 years |
| Judicial Matters (LAW1400) | Entry of Criminal Restitution + 20 years |

Given that data is a highly valuable asset, especially in the financial industry, there is an urgent need for data owners and hosting services to initiate the process of protecting their valuable customer information and digital assets even before quantum computing capabilities are realized. This process primarily involves migrating data and systems to algorithms that are thought to be quantum-resistant. In an attempt to promulgate quantum-resistant algorithms, the National Institute of Standards and Technology (NIST), a federal agency within the U.S. Department of Commerce, has initiated the NIST Post-Quantum Cryptography Standardization Process to solicit, evaluate, and standardize one or more quantum-resistant public-key cryptographic algorithms. At present, there are many different candidate cryptographic algorithms believed to be quantum-resistant. However, because the standardization process is not yet complete, migration of classical systems to any one of NIST's candidate cryptographic algorithms could later compound the computational and resource burden on data owners and hosting services if NIST does not select that particular cryptographic algorithm as the standard or makes changes to the proposed cryptographic algorithms.

Although some quantum-resistant cryptographic algorithms are available today, those algorithms may not be the algorithm, or a variant of the algorithm, that eventually is approved as part of the NIST Post-Quantum Cryptography Standardization Process. Moreover, the adoption of these algorithms will, in some instances, be an overly complex and time-consuming process. First, this migration process is challenging due to the sheer volume of data consumed by these systems, as well as the general complexity of the systems. For example, financial services providers and their partners each may have data for millions of customers and trillions of transactions stored in various databases. In addition, these providers are processing millions of transactions on a daily basis and adding new customer data to their systems. Second, data is stored in more places than ever before and must be encrypted using different cryptographic keys depending upon whether the data is going to be protected while in transit, while at rest in-cloud, or while at rest on-premises. Governmental regulations, NIST recommendations, and industry standards and best practices will, in some instances, drive the cryptographic techniques that are used to encrypt the data. Third, many organizations use several types of encryption, hashing, and other cryptographic algorithms with varying security architecture depending on the needs of the data owner or hosting service. Fourth, as shown in Table 1 above, there is the need to protect data for varying durations to manage legal and regulatory risk, sometimes as long as twenty to thirty years, and even in some cases for over fifty years. Fifth, the deployment of fundamental changes to infrastructure might take a decade or more, and there is very little tolerance for incurring risk while deploying changes. All of these considerations introduce additional levels of complexity, and thus data owners and hosting services must methodically migrate their cryptographic infrastructure to quantum-resistant cryptography. In addition, the cryptography transition is challenging because it is not restricted only to algorithms and key lengths. Rather, the cryptography transition is impacted by several other details of security infrastructure, such as interoperability, integration with existing systems and security architectures, scalability, compliance and regulatory requirements, maintenance, and backward compatibility requirements.

In contrast to conventional cryptographic systems, the present disclosure relates to a post-quantum cryptography (PQC) system that mitigates the vulnerability of traditional cryptographic algorithms by providing techniques for migrating enormous volumes of data and complex IT systems to PQC technologies and platforms that are not vulnerable to attack by a quantum computer. The term "PQC" refers to cryptosystems which are, or are considered to be, resistant to attacks that use a quantum computer for cryptanalysis. In some embodiments, PQC cryptographic techniques include PQC communications channel-based cryptographic techniques, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, other suitable techniques, and combinations thereof (e.g., combinations of PQC communications channel-based cryptographic techniques with hash-based, lattice-based, isogeny-based, code-based, multivariate-based, or zero-knowledge proof PQC cryptographic techniques).

Hash-based PQC cryptographic techniques (e.g., hash-based PQC cryptographic signatures) are suitable for one-time use, wherein a tuning parameter provides a trade-off between signature size and key generation, signing, and verification speed, and can be can be used with any secure hashing function. Hash-based PQC cryptographic techniques may be used to provide digital signatures, such as Leighton-Micali Signature (LMS), eXtended Merkle Signature Scheme (XMSS), and SPHINCS+.

Lattice-based PQC cryptographic techniques are based on the shortest vector problem, the leading replacement for prime factorization and discrete logarithm, and typically are less computationally resource intensive in relation to isogeny-based and other PQC cryptographic techniques. In some instances, lattice-based PQC cryptographic techniques may be used to provide digital signatures, such as Dilithium and qTESLA. In some instances, lattice-based PQC cryptographic techniques may be used to provide key exchange by key encapsulation, such as NewHope, Frodo Key-Encapsulation Mechanisms (FrodoKEM), Nth degree-Truncated polynomial Ring Units (NTRU) Prime, and Kyber. In some instances, lattice-based PQC cryptographic techniques may be used to provide key exchange by key agreement, such as NewHope Classic, Frodo Diffie-Hellman (FrodoDH), and Ring Learning With Errors Key EXchange (RLWE-KEX).

Isogeny-based PQC cryptographic techniques use very small keys and typically are more computationally resource intensive in relation to lattice-based and other PQC cryptographic techniques. In some instances, isogeny-based PQC cryptographic techniques may be used to provide key exchange by key encapsulation, such as Supersingular Isogeny Key Encapsulation (SIKE). In some instances, isogeny-based PQC cryptographic techniques may be used to provide key exchange by key agreement, such as Supersingular isogeny Diffie-Hellman (SIDH) key exchange.

Code-based PQC cryptographic techniques use very large key sizes yet are typically the fastest PQC cryptographic techniques at the comparable security level (e.g., extremely fast in encryption and reasonably fast in decryption). In some instances, code-based PQC cryptographic techniques may be used to provide key exchange by key encapsulation, such as Classic McEliece, McEliece Quasi-Cyclic Moderate Density Parity Check (QC-MDPC), and Bit Flipping Key Encapsulation (BIKE).

Multivariate-based PQC cryptographic techniques use small public keys and fast verification yet, in some instances, are less efficient than other PQC cryptographic techniques. Multivariate-based PQC cryptographic techniques may be used to provide digital signatures, such as Rainbow.

Zero-knowledge proof PQC cryptographic techniques use very small key pairs and derive their security entirely from the security of symmetric-key primitives and are believed to be quantum-secure. In some instances, zero-knowledge proof PQC cryptographic techniques may be used to provide digital signatures, such as Picnic.

In some embodiments, the QC detection system may retrieve one or more of the hash-based PQC cryptographic techniques, lattice-based PQC cryptographic techniques, isogeny-based PQC cryptographic techniques, code-based PQC cryptographic techniques, multivariate-based PQC cryptographic techniques, and zero-knowledge proof PQC cryptographic techniques from a remote server or data storage device, such as the ISARA toolkit, the libOQS library, the libpqcrypto library, or a combination thereof.

PQC communications channel-based cryptographic techniques use PQC communications channels to secure transmission of sensitive or confidential message data, such as Society for Worldwide Interbank Financial Telecommunication (SWIFT) messages, International Organization for Standardization (ISO) 8583 messages, ISO 20022 messages, Internet of Things (IoT) data, Health Insurance Portability and Accountability Act (HIPAA) data (e.g., electronic medical records, protected health information), copyrighted content (e.g., electronic media, digital rights management (DRM)-protected data files), and other suitable messages. For example, the QC detection system may be configured to implement a PQC communications protocol that transmits a first portion of an electronic communication (e.g., message overhead data such as protocol overhead, header data, metadata) to a client device over a first classical communications channel (e.g. non-PQC communications channel) and transmits a second portion of the electronic communication (e.g., message payload data) to the client device over a second classical communications channel (e.g., a PQC back channel such as a PQC out-of-band communications channel). In some embodiments, the first classical communications channel and the second classical communications channel may utilize different classical communications channels (e.g., different communications networks, communications lines, communications circuitry, or a combination thereof). In some embodiments, the first classical communications channel and the second classical communications channel may utilize the same classical communications circuitry (e.g., the same communications network, lines, hardware, infrastructure) but a different protocol, communications mechanism, network connector, or combination thereof. For example, the QC detection system may implement the non-PQC communications channel as an in-band communications channel and the PQC communications channel as an out-of-band communications channel using the same communications infrastructure.

In one illustrative example, the electronic communication may be a SWIFT message, the first portion of an electronic communication may comprise SWIFT message overhead data, and the second portion of an electronic communication may comprise SWIFT message payload data. In another illustrative example, the first portion of the electronic communication may comprise a cryptographic data attribute indicative of a symmetric cryptographic technique, and the second portion of the electronic communication may comprise a symmetric cryptographic key, such as an AES symmetric cryptographic key. The QC detection system may be configured to authenticate a session (e.g., perform a cryptographic handshake) with the client device over the non-PQC communications channel based on the symmetric cryptographic key that was transmitted to the client device, or a PQC add-on device coupled to the client device, over the PQC communications channel.

In yet another illustrative example, the first portion of the electronic communication may comprise a PQC indicator data structure that identifies the PQC communications channel and indicates that a second portion of the electronic communication is to be transmitted over a PQC communications channel. The PQC indicator data structure may comprise a link or pointer to the PQC communications channel, a header that identifies the PQC communications channel as being out-of-band, other identification and routing information, or a combination thereof. In some embodiments, the PQC indicator data structure may comprise a link to the second portion of the electronic communication. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a PQC flag value. In another example, the PQC indicator data structure may comprise a link to a PQC electronic agreement (e.g., a bilateral agreement between the QC detection system and the client device to exchange confidential or sensitive data over a PQC communications channel) comprising the PQC indicator data structure.

In some embodiments, the PQC indicator data structure may comprise a link to a PQC shim configured to allow communication with the QC detection system (e.g., via PQC callback circuitry comprised by the QC detection system) over the PQC communications channel. For example, the PQC indicator data structure may further comprise a PQC shim automatic installation control signal indicative of an electronic instruction for the client device to automatically install the PQC shim based on the link. In another example, the PQC indicator data structure may further comprise a PQC shim manual installation control signal indicative of an electronic instruction for the client device to manually install the PQC shim based on the link. In another example, the first portion of the electronic communication may comprise a PQC smart contract comprising the PQC indicator data structure.

In some embodiments, the first portion of the electronic communication may comprise a PQC request data structure (e.g., a request for an acknowledgment or confirmation that the client device is configured to communicate over a PQC communications channel). The QC detection system may be configured to receive, in response to transmission of the PQC request data structure, a PQC acknowledgement data structure (e.g., an acknowledgment or confirmation that the client device is configured to communicate over a PQC communications channel) from the client device over the non-PQC communications channel. In response to receipt of the PQC acknowledgement data structure, to transmit the second portion of the electronic communication to the client device over the PQC communications channel.

In some embodiments, PQC indicator data structure may further identify a quantum communications channel and indicate that a quantum cryptographic key is to be transmitted over the quantum communications channel. The PQC indicator data structure may comprise a link or pointer to the quantum communications channel, a header that identifies the quantum communications channel and comprises other identification and routing information. In some embodiments, the PQC indicator data structure may comprise a link to the quantum cryptographic key. In some embodiments, the first portion of the electronic communication may comprise a TLS extension comprising the PQC indicator data structure. In another example, the first portion of the electronic communication may comprise an ISO 8583 extension comprising the PQC indicator data structure. In another example, the PQC indicator data structure may be, or comprise, or be indicated by, a quantum flag value. In another example, the PQC indicator data structure may comprise a link to a quantum electronic agreement (e.g., a bilateral agreement between the QC detection system and the client device to exchange quantum information over the quantum communications channel) comprising the PQC indicator data structure.

In some embodiments, the first portion of the electronic communication may comprise a quantum request data structure (e.g., a request for an acknowledgment or confirmation that the client device is configured to communicate over a quantum communications channel). The QC detection system may be configured to receive, in response to transmission of the quantum request data structure, a quantum acknowledgement data structure (e.g., an acknowledgment or confirmation that the client device is configured to communicate over a quantum communications channel) from the client device over the non-PQC communications channel. In response to receipt of the quantum acknowledgement data structure, the QC detection system may be configured to transmit the quantum cryptographic key to the client device over the quantum communications channel. Subsequently, the QC detection system may be configured to authenticate a session (e.g., perform a cryptographic handshake) with the client device over the non-PQC communications channel based on the quantum cryptographic key that was transmitted to the client device over the quantum communications channel.

It is to be understood that each PQC cryptographic technique may be implemented as a variant of a PQC cryptographic algorithm (e.g., based on NIST security level). For example, the libOQS implementation of Dilithium includes the variants Dilithium II (e.g., Dilithium_II_Medium), Dilithium III (e.g., Dilithium_III_Recommended), and Dilithium IV (e.g., Dilithium_IV_VeryHigh); and the ISARA Radiate Toolkit implementation of Dilithium includes the variants Dilithium 128 and Dilithium 160. Accordingly, the PQC cryptographic technique for the PQC cryptographic algorithm "Dilithium" may be Dilithium II, Dilithium III, Dilithium IV, Dilithium 128, or Dilithium 160. In yet another example, the ISARA Radiate Toolkit implementation of FrodoKEM includes the variants FrodoKEM-976-AES and FrodoKEM-976-C SHAKE. In yet another example, the ISARA Radiate Toolkit speed-optimized implementation of NewHope includes the variant Lattice-based Unique Key Exchange (LUKE).

In some embodiments, the present disclosure relates to a QC detection system configured to provide for QC detection for use in migration to systems that utilize PQC cryptographic techniques that mitigate vulnerabilities from quantum computers using Shor's algorithm or Grover's algorithm, identification of techniques to reduce the attack surface of cryptographic operations, and solutions to other cascading opportunities and challenges identified herein that stem from the vulnerability of today's common public-key encryption techniques to quantum computing. In some embodiments, the present disclosure relates to a QC detection system configured to provide for QC detection using, among other features described herein: (i) a QC detection technique based on a digital signature (e.g., an RSA digital signature), wherein the QC detection system destroys the private cryptographic key but retains the public cryptographic key; (ii) a QC detection technique based on a pair of asymmetric cryptographic keys (e.g., an RSA key pair) generated based on a symmetric cryptographic key (e.g., an AES key), wherein the QC detection system destroys the private cryptographic key but retains the public cryptographic key; (iii) a QC detection technique based on a symmetric cryptographic key (e.g., an AES key) generated based on a pair of asymmetric cryptographic keys (e.g., a DH key pair), wherein the QC detection system destroys both of the asymmetric cryptographic keys; (iv) a QC detection technique based on multiple different cryptographic techniques (e.g., RSA, DH, ECDH, AES) having staggered key sizes (e.g., RSA-2048, RSA-3072, DH-2048, DH-3072, ECDH-256, ECDH-521, AES-128, AES-256); any other suitable QC detection technique; or any combination thereof.

In some embodiments, the present disclosure relates to a QC detection system configured to provide for QC detection (e.g., the detection of a quantum computer and determination of its capabilities, such as its capability to compromise various cryptographic techniques) by, among other features disclosed herein, generating QC detection data (e.g., fictitious data), encrypting the QC detection data based on a cryptographic technique (e.g., a non-PQC cryptographic technique, or even a PQC cryptographic technique or a hybrid PQC cryptographic technique), and monitoring a set of data environments (e.g., internal data environments, external data environments) for electronic information related to the encrypted QC detection data. For example, the QC detection system may be configured to provide for generating a pair of asymmetric cryptographic keys comprising a public cryptographic key and a private cryptographic key, generating encrypted QC detection data based on the pair of asymmetric cryptographic keys, and destroying the private cryptographic key. In another example, the QC detection system may be configured to provide for generating encrypted QC detection data based on a PQC cryptographic technique that, in some instances, does not have public or private cryptographic keys. The QC detection system may use QC detection data encrypted based on the PQC cryptographic technique to detect new algorithms (e.g., other than Shor's algorithm or Grover's algorithm) that renders that PQC cryptographic technique breakable by a quantum computer or some yet-to-be-discovered technology.

In some embodiments, the QC detection system may be further configured to provide for monitoring a set of data environments for electronic information related to the encrypted QC detection data. The monitoring of the set of data environments may comprise internal monitoring of internal data environments (e.g., internal information systems, internal data networks, internal data storage devices), external monitoring of external data environments (e.g., content delivery networks (CDNs), cloud service platforms, social media platforms, dark websites), and hybrid monitoring of hybrid data environments (e.g., combinations of internal and external data networks).

In some embodiments, the QC detection system may be further configured to provide for monitoring the set of data environments in an electronically subtle and delicate way to preserve secrecy to mitigate or eliminate the risk that the monitoring will tip anyone off and render the fake data radioactive to QC hackers. In some embodiments, the QC detection system may be further configured to provide for monitoring the set of data environments using data monitoring circuitry that, in some instances, is not vulnerable to an attack that sets off a false alarm. For example, the QC detection system may generate and monitor a database of QC detection data. However, hacking of that database could enable the QC detection data to be used without compromising the cryptographic technique (e.g., RSA) with which the QC detection data was encrypted. As a result, the QC detection system might incorrectly assume that the cryptographic technique was compromised when in fact it was not. The QC detection system may solve this problem as shown in the following examples.

In one illustrative example embodiment, to detect the QC detection data without storing it anywhere, the QC detection system may encrypt the QC detection data using an asymmetric cryptographic technique, destroy the private cryptographic key, and then monitor for the subsequent use of the private cryptographic key. Because the QC detection system destroyed the private cryptographic key, the private cryptographic key could only be used again by using QC to reverse engineer the private cryptographic key from the public cryptographic key, proving the existence of a QC threat capable of compromising the cryptographic technique. In another illustrative example embodiment, to detect the QC detection data without storing it anywhere, the QC detection system may encrypt the QC detection data using a symmetric cryptographic technique and mitigate the risk of an attack that sets off a false alarm through heightened security of the database of QC detection data.

In some embodiments, the QC detection system may be further configured to provide for detecting the electronic information related to the encrypted QC detection data and generating a QC detection alert control signal in response detecting the electronic information related to the encrypted QC detection data.

In some embodiments, the present disclosure relates to a QC detection system configured to provide for adaptive PQC data encryption techniques. For example, the QC detection system may be configured to receive the QC detection alert control signal and, in response, dynamically upgrade a PQC cryptographic technique used to encrypt data based on the QC detection alert control signal. For example, if the QC detection alert control signal indicates that a particular cryptographic technique has been compromised by a quantum computer, the QC detection system may be configured to provide for re-encrypting data using a PQC cryptographic technique having a cryptostrength that cannot be compromised by that particular quantum computer.

In some instances, the QC detection system may be configured to dynamically optimize the PQC cryptographic parameters (e.g., dynamically select an optimal PQC cryptographic technique, key size, and mode of operation) to optimize for risk, performance, or information value and longevity, while satisfying temporal requirements (e.g., allowable transaction time, time not to exceed (NTE), time to live (TTL)). For example, during a first duration of time, the QC detection system may be configured to dynamically optimize the PQC cryptographic parameters to optimize for risk; and during a second duration of time, the QC detection system may be configured to dynamically optimize the PQC cryptographic parameters to optimize for performance; and during a third duration of time, the QC detection system may be configured to dynamically optimize the PQC cryptographic parameters to optimize for information value and longevity. In another example, the PQC encryption strength may increase or decrease based on the sensitivity (e.g., confidentiality, value, vulnerability, data classification level) of the data. In some embodiments, the QC detection system provided herein may utilize a hybrid PQC cryptographic technique (e.g., hybrid PQC cryptographic technique={PQC cryptographic technique, Non-PQC cryptographic technique}; a PQC cryptographic technique and non-PQC cryptographic technique coexisting in the data envelope). In some instances, the QC detection system provided herein may be configured to provide nested PQC cryptographic techniques by, for example, utilizing multiple levels of encryption on a data envelope's data as the encryption techniques evolve.

There are many advantages of these and other embodiments described herein, such as: detecting real world QC capabilities for use in facilitating adaptive migration to quantum-resistant information systems that utilize PQC cryptographic techniques that cannot be compromised by a realized quantum computer; facilitating faster, cheaper, and less computing resource and data intensive processes for providing identification of techniques to reduce the attack surface of cryptographic operations; and providing new ways to solve the cascading opportunities and challenges identified herein that stem from a sudden vulnerability to today's common public-key encryption techniques arising from the realization of quantum computing. Among other features, these and other embodiments described herein at least: reflect improvements in the functioning of computing systems or devices, such as QC detection systems (including but not limited to QC detection server devices and databases), server devices, client devices, and combinations thereof; reflect improvements to other technologies or technical fields as described herein (e.g., QC detection, PQC data transmission); and effect transformations or reductions of particular articles to different states or things, such as unencrypted data and data structures, encrypted data and data structures, electronic signals, quantum signals, other articles described herein, and combinations thereof.

Definitions

As used herein, the terms "data," "content," "information," "electronic information," "signal," "command," and similar terms may be used interchangeably to refer to data capable of being transmitted, received, and/or stored in accordance with embodiments of the present disclosure. Thus, use of any such terms should not be taken to limit the spirit or scope of embodiments of the present disclosure.

The term "comprising" means "including, but not limited to." The term comprising should be interpreted in the manner it is typically used in the patent context. Use of broader terms such as comprises, includes, and having should be understood to provide support for narrower terms such as consisting of, consisting essentially of, and comprised substantially of.

The phrases "in one embodiment," "according to one embodiment," and the like generally mean that the particular feature, structure, or characteristic following the phrase may be included in at least one embodiment of the present disclosure and may be included in more than one embodiment of the present disclosure (importantly, such phrases do not necessarily refer to the same embodiment).

The word "example" is used herein to mean "serving as an example, instance, or illustration." Any implementation described herein as "example" is not necessarily to be construed as preferred or advantageous over other implementations.

If the specification states a component or feature "may," "can," "could," "should," "would," "preferably," "possibly," "typically," "optionally," "for example," "often," or "might" (or other such language) be included or have a characteristic, that particular component or feature is not required to be included or to have the characteristic. Such component or feature may be optionally included in some embodiments, or it may be excluded.

The terms "processor" and "processing circuitry" are used herein to refer to any programmable microprocessor, microcomputer or multiple processor chip or chips that can be configured by software instructions (applications) to perform a variety of functions, including the functions of the various embodiments described above. In some devices, multiple processors may be provided, such as one processor dedicated to wireless communication functions and one processor dedicated to running other applications. Software applications may be stored in the internal memory before they are accessed and loaded into the processors. The processors may include internal memory sufficient to store the application software instructions. In many devices the internal memory may be a volatile or nonvolatile memory, such as flash memory, or a mixture of both. The memory may also be located internal to another computing resource (e.g., enabling computer readable instructions to be downloaded over the Internet or another wired or wireless connection).

For the purposes of this description, a general reference to "memory" refers to memory accessible by the processors including internal memory or removable memory plugged into the device, remote memory (e.g., cloud storage), and/or memory within the processors themselves. For instance, memory may be any non-transitory computer readable medium having computer readable instructions (e.g., computer program instructions) stored thereof that are executable by a processor.

The term "computing device" is used herein to refer to any one or all of programmable logic controllers (PLCs), programmable automation controllers (PACs), industrial computers, desktop computers, personal data assistants (PDAs), laptop computers, tablet computers, smart books, palm-top computers, personal computers, smartphone, headset, smartwatch, and similar electronic devices equipped with at least a processor configured to perform the various operations described herein. Devices such as smartphones, laptop computers, tablet computers, headsets, and smartwatches are generally collectively referred to as mobile devices.

The term "server" or "server device" is used to refer to any computing device capable of functioning as a server, such as a master exchange server, web server, mail server, document server, or any other type of server. A server may be a dedicated computing device or a computing device including a server module (e.g., an application which may cause the computing device to operate as a server). A server module (e.g., server application) may be a full function server module, or a light or secondary server module (e.g., light or secondary server application) that is configured to provide synchronization services among the dynamic databases on computing devices. A light server or secondary server may be a slimmed-down version of server type functionality that can be implemented on a computing device, such as a smart phone, thereby enabling it to function as an Internet server (e.g., an enterprise e-mail server) only to the extent necessary to provide the functionality described herein.

The term "post-quantum cryptography (PQC)" refers to cryptosystems which are, or are considered to be, resistant to quantum attacks. In some instances, the term PQC refers to cryptography that may or will be secure even after the development of large-scale error tolerant quantum computing devices. The related term "PQC migration" refers to the migration of data encrypted using classical systems to be encrypted using quantum-resistant algorithms and includes, but is not limited to, the updating of system software stacks and security infrastructure. In some embodiments, PQC migration includes migration of classical systems to PQC systems or hybrid PQC systems (e.g., a combination of classical and PQC). In some embodiments, PQC migration includes translations of networks. For example, today networks A, B, and C may only be able to utilize classic cryptography, but tomorrow network C may be able to utilize PQC so the QC detection system may drop in a PQC gateway to translate back and forth such that eventually network B is PQC enabled, but network A may never become PQC enabled so the QC detection system may determine that transactions to or from network A are a higher risk and implement the PQC cryptographic techniques described herein according to that higher risk.

The term "quantum computing (QC) detection data" refers to data configured to be used by the QC detection system to detect the existence and capabilities of quantum computing and, in some instances, the strength of that quantum computing. In some instances, the QC detection system may comprise fictitious data, such as fictitious account data, a fictitious code-signing certificate, any other suitable data, or any combination thereof. For example, the QC detection data may comprise fictitious financial account data, a fictitious electronic mortgage document, a fictitious electronic deed, a fictitious electronic loan document (e.g., a fictitious auto loan document, a fictitious personal loan document), a fictitious electronic stock transfer agreement, fictitious identity information, fictitious medical data, fictitious credit card data, any other suitable data, or any combination thereof. The fictitious identity information may comprise, for example, a fictitious name, address, phone number, email address, social security number, driver license number, any other suitable information, or a combination thereof. The fictitious credit card data may comprise, for example, a fictitious credit card number, credit card issuer (e.g., financial institution), cardholder name, cardholder billing address, expiration date, CVV security code, credit card network (e.g., Visa, MasterCard, American Express), EMV (originally Europay, Mastercard, and Visa) chip data, magnetic stripe data, etc.), any other suitable information, or a combination thereof. In another example, the QC detection data may comprise a fictitious code-signing certificate, a fictitious email certificate, a fictitious legally binding electronic signature certificate that represents the digital identity of a signer (e.g., a digital identification (ID) certificate, such as an X.509 certificate), any other suitable information, or a combination thereof.

The term "data environment" refers to internal data environments, external data environments, hybrid data environments, any other suitable environment, or any combination thereof. The internal data environments may comprise, for example, internal information systems, internal data networks, internal data storage devices, any other suitable data environment, or any combination thereof. The external data environments may comprise, for example, content delivery networks (CDNs), cloud service platforms, social media platforms, dark websites, any other suitable data environment, or any combination thereof. For example, the external data environments may comprise a set of websites, such as a set of social media platforms, public websites (e.g., document leaks websites), online repositories (e.g., online file storage and synchronization services, online file hosting services), P2P file sharing networks (e.g., BitTorrent), deep websites, dark websites (e.g., onion addresses that end in the top level domain ".onion"), the Mortgage Electronic Registration System (MERS), CDNs (including, but not limited to, meta-CDNs), cloud service platforms, any other suitable data environment, or any combination thereof.

The term "quantum basis" refers to sets of orthogonal quantum states, including, but not limited to, pairs of photonic polarization states. The pairs of photonic polarization states may comprise, for example, the rectilinear, diagonal, and circular photonic polarization states. The "rectilinear basis" refers to the pair of rectilinear photonic polarization states comprising the horizontal photon polarization state $|0\rangle$ and the vertical photon polarization state $|1\rangle$. The "diagonal basis" refers to the pair of diagonal photonic polarization states comprising the diagonal photon polarization state of 45 degrees and the diagonal photon polarization state 135 degrees. The "circular basis" refers to the pair of circular photonic polarization states comprising the left circular photon polarization state $|L\rangle$ and the right circular photon polarization state $|R\rangle$.

The term "quantum particle" refers to photons, atoms, electrons, molecules, ions, or other suitable particles or quasi-particles (e.g., composite fermions). The term "entangled quantum particle" refers to two or more photons, atoms, electrons, molecules, ions, or other suitable particles or quasi-particles entangled according to the principles of quantum entanglement.

The term "qubit" refers to a basic unit of quantum information comprising a two-state, or two-level, quantum mechanical system, such as: the polarization of a single photon (e.g., a photon encoded using a quantum basis as previously defined); the spin of a single electron (e.g., a spin qubit comprising the spin up state $|1\rangle$ and the spin down state $|0\rangle$); the energy level of a single atom (e.g., a superconducting qubit); the Hall conductance of electron systems (e.g., qubits based on a quantum Hall effect, such as an integer quantum Hall effect, a fractional quantum Hall effect, or a quantum spin Hall effect); the vibration state of a single carbon nanotube or nanoparticle (e.g., a carbon qubit, a carbon nanotube or nanoparticle coupled to a spin qubit, a carbon nanotube or nanoparticle coupled to a superconducting qubit); the electronic state of an ion (e.g., a trapped ion); a transmission line shunted plasma oscillation qubit (e.g., a fixed-frequency transmon qubit, a frequency-tunable transmon qubit); a charge qubit (e.g., a superconducting charge qubit); a defect (e.g., a vacancy, a dopant, or a combination thereof, such as a nitrogen-vacancy center or a silicon-vacancy center) in a diamond structure (e.g., a diamond qubit); or any other suitable qubit. Qubits may exist in multiple states simultaneously and can be made of any suitable quantum particle, including entangled quantum particles. Qubits may exist in multiple states simultaneously and may be made of quantum particles such as photons, atoms, electrons, molecules, ions, or other suitable particles, such as quasi-particles. In some embodiments, qubits may be entangled according to the principles of quantum entanglement. For example, a pair of entangled qubits may comprise a first entangled qubit and a second entangled qubit, where measurement of the first entangled qubit causes the collapse of the second entangled qubit such that the first entangled qubit and the second entangled qubit are equal (e.g., both "0" or both "1") when measured using the same quantum basis.

The term "optical line" refers to an optical communications path. For example, an optical line may comprise an optical fiber, an optical waveguide, a fiberoptic cable, a non-polarization maintaining optical fiber, an optical transmission line, a quantum line, or a combination thereof. The term optical line broadly encompasses on-chip optical lines.

The term "quantum line" refers to a quantum communications path. For example, a quantum line may comprise a polarization-maintaining (PM) optical fiber (PMF or PM fiber), photonic transmission lines, photonic crystals, photonic circuitry, free space (e.g., air, vacuum), or a combination thereof. In some embodiments, a PM fiber uses birefringence to maintain the polarization states of photons. This is normally done by causing consistent asymmetries in the PM fiber. Example PM fiber types include: panda fiber which is used in telecom; elliptical clad fiber; and bowtie fiber. Any of these three designs uses birefringence by adding asymmetries to the fiber through shapes and stresses introduced in the fiber. This causes two polarization states to have different phase velocities in the fiber. As such, an exchange of the overall energy of the two modes (polarization states) becomes practically impossible. The term optical line broadly encompasses on-chip quantum lines.

The term "on-chip encoder" and "on-chip decoder" is used herein to refer to any device that respectively encodes or decodes a qubit of information, or in time-bins of information, on a photon or an electron. In this regard, the qubit decoder may comprise an optoelectronic device as described below.

The terms "optoelectronic device," "optoelectronic component," "laser device," "light source," "single photon source," "particle source," and similar terms are used herein interchangeably to refer to any one or more of (including, but not limited to, combinations of): a polarized light modulator (PLM); a polarized light demodulator (PLD); a quantization circuit; a laser device, such as a diode laser, a vertical cavity surface emitting laser (VCSEL), a semiconductor laser, a fiberoptic laser, or an edge-emitting laser (e.g., a gallium arsenide (GaAs) edge-emitting laser comprising an indium gallium arsenide (InGaAs) quantum well); a light source; a single photon source; a modulator or modulating circuit; a photodetector device, such as a photodetector, an array of photodetectors, or a photodetector panel; a light emitting device, such as a light emitting diode (LED), an array of LEDs, an LED panel, or an LED display; a sensing device, such as one or more sensors; any other device equipped with at least one of the materials, structures, or layers described herein; an optical component, such as an optical lens, attenuator, deflector, phase shifter, filter, mirror, window, diffuser, prism, lenses, crystals (e.g., non-linear crystals), wave plates, beam splitter, bit manipulator, polarizer, or diffraction grating; an interferometer implemented as a Mach-Zehnder interferometer (MZI), Fabry-Perot interferometer, Michelson interferometer, any other suitable configuration, or any combination or permutation thereof; any device configured to function as any of the foregoing devices; or any combination thereof. In some embodiments, the laser device may use a VCSEL to generate photons, qubits (e.g., by modulating photons), or both. In some embodiments, a polarization pulse shaper may be integrated with the laser chip on the same laser device. In some embodiments, modulating circuitry (e.g., a modulating circuit) may be implemented on a board. Examples of a laser device may comprise a fiberoptic laser with a polarizing component, an edge-emitting laser, a VCSEL, a PLM, or any other suitable device. In some embodiments, the laser may generate photons, qubits, or both in the infrared or near-infrared range (e.g., 1550 nanometers (nm), 980 nm, 900 nm). For example, a laser device may be an edge-emitting laser chip having a footprint smaller than one square millimeter and a thickness less than a few micrometers (microns) and comprising a gallium arsenide (GaAs)-based edge-emitting laser, a modulating circuit, and an attenuator or deflector. Each of the MZIs disclosed herein may comprise a combination of mirrors, beam splitters, photodetectors fiberoptic cables, lenses, nonlinear crystals, wave plates, motors (e.g., servo motors), motion controllers (e.g., servo motor controllers), temperature controllers (e.g., thermoelectric devices), and any other suitable components arranged to perform the operations and functions disclosed herein, including, but not limited to, the controlling of optical path length. In some embodiments, a first optoelectronic device may include a particle source configured to generate single particles (e.g., photons or electrons) and transmit the generated particles through a double-slit structure to a first electron detector (e.g., "|1>") and a second electron detector (e.g., "|0>") as described herein.

The terms "security shelf-live," "migration time," and "collapse time" refer to the parameters shown below in Table 2:

TABLE 2

Example parameters that may be used by the QC detection system described herein to generate quantum computing threat assessments and electronic recommendations associated therewith.

| Parameter | Description | Definition |
|---|---|---|
| x | Security shelf-life (e.g., data retention requirement) | Duration (e.g., in years) to keep the cryptographic keys secure (e.g., "How long do you need your cryptographic keys to remain secure?") |
| y | PQC migration time | Estimated duration (e.g., in years) to migrate existing infrastructure to a QC detection system (e.g., "How long will it take to deploy a set of cryptography tools that are quantum-resistant?") |
| z | Collapse time (e.g., time to quantum computing threat) | Estimated duration (e.g., in years) to build a large-scale quantum computer (e.g., "How long will it be before a quantum computer, or some other method, compromises the currently deployed public-key cryptography tools?") |

The term "security shelf-life" includes, but is not limited to, data retention requirements. For example, in some instances the security shelf life x of a piece of data may be based on governmental risk and regulatory requirements, such as the FDIC's data retention requirements shown in Table 1.

The term "collapse time" includes, but is not limited to, time to quantum computing threat. The phrases "time to quantum computing threat" and "a time to a quantum computing threat" refer to an approximate time to a quantum computing threat. In some instances, the collapse time z may decrease when the QC detection system identifies, or receives, technological advancements relating to quantum computing; increased vulnerabilities to cryptographic techniques (e.g., one or more non-PQC cryptographic techniques, PQC cryptographic techniques, or hybrid PQC cryptographic techniques); or a QC detection alert control signal indicating that a particular cryptographic technique (e.g., a non-PQC cryptographic technique, a PQC cryptographic technique, a hybrid PQC cryptographic technique) has been compromised by quantum computing. In one illustrative, non-limiting example, the collapse time z may indicate an estimated 15% chance of compromising RSA-2048 by 2026 and an estimated 50% chance of compromising RSA-2048 by 2031.

The term "control signal" refers to an electronic alert, notification, flag, or control signal configured to instruct, or cause, the QC detection system to perform an automated process or function without user interactivity. For example, control signals as described herein may comprise QC detection alert control signals, leakage alert control signals, and tampering alert control signals. In some embodiments, a QC detection alert control signal may indicate, for example, that a particular cryptographic technique (e.g., a non-PQC cryptographic technique, a PQC cryptographic technique, a hybrid PQC cryptographic technique) used to encrypt or otherwise generate encrypted QC detection data has been compromised by quantum computing. In some embodiments, a leakage alert control signal may indicate, for example, the existence of a data leakage event associated with QC detection data stored in an internal data environment that was never transmitted outside of that internal data environment. In some embodiments, a tampering alert control signal may indicate, for example, the existence of a data tampering event associated with QC detection data, wherein the QC detection data has been altered but signed using the same digital signature. In some embodiments, the QC detection alert control signals, leakage alert control signals, tampering alert control signals, or a combination thereof may instruct, or cause, the QC detection system to initiate automated analyses and processes to mitigate the quantum computing threat within a duration of time. In some instances, the QC detection system may generate a control signal in accordance with the criteria discussed below with reference to Table 3.

The term "non-PQC cryptographic technique" refers to a cryptographic technique that is not quantum-resistant. Non-PQC cryptographic techniques may comprise, for example, RSA, DH, and other such non-PQC cryptographic algorithms. In some instances, a non-PQC cryptographic technique may be a variant of a non-PQC cryptographic algorithm. For example, a first non-PQC cryptographic technique may be RSA-2048, a second non-PQC cryptographic technique may be RSA-3072, and a third non-PQC cryptographic technique may be RSA-4096, each of which is a different variant of the same non-PQC cryptographic algorithm (e.g., RSA). In another example, a first non-PQC cryptographic technique may be AES-128, and a second non-PQC cryptographic technique may be DH-2048, each of which is a variant of a different non-PQC cryptographic algorithm (e.g., AES, DH). In yet another example, a first non-PQC cryptographic technique may encrypt overhead data based on RSA-2048 and transmit the encrypted data over a non-PQC communications channel (e.g., an in-band communications channel), and a second non-PQC cryptographic technique may transmit overhead data over a non-PQC communications channel as clear text, each of which is a different variant of a non-PQC communications channel-based cryptographic technique.

The term "PQC cryptographic technique" refers to a quantum-resistant cryptographic technique. Generally, the families of PQC cryptographic techniques include key management and signature. PQC cryptographic techniques may comprise, for example, hash-based PQC cryptographic techniques, lattice-based PQC cryptographic techniques, isogeny-based PQC cryptographic techniques, code-based PQC cryptographic techniques, multivariate-based PQC cryptographic techniques, zero-knowledge proof PQC cryptographic techniques, PQC communications channel-based cryptographic techniques, and other suitable techniques. In some instances, a PQC cryptographic technique may be a variant of a PQC cryptographic algorithm. For example, a first PQC cryptographic technique may be Dilithium II, a second PQC cryptographic technique may be Dilithium II, and a third PQC cryptographic technique may be Dilithium 128, each of which is a different variant of the same PQC cryptographic algorithm (e.g., Dilithium). In another example, a first PQC cryptographic technique may be LUKE, and a second PQC cryptographic technique may be Dilithium II, each of which is a variant of a different PQC cryptographic algorithm (e.g., NewHope, Dilithium). In yet another example, a first PQC cryptographic technique may encrypt payload data based on Dilithium II and transmit the encrypted data over a PQC communications channel (e.g., a PQC back channel), and a second PQC cryptographic technique may generate a secret key that is used to encrypt payload data based on AES-256 and transmit the encrypted data over a PQC communications channel, each of which is a different variant of a PQC communications channel-based cryptographic technique.

The term "hybrid PQC cryptographic technique" refers to a cryptographic technique that comprises a non-PQC cryptographic technique and a PQC cryptographic technique. For example, a hybrid PQC cryptographic technique may comprise a PQC cryptographic technique and non-PQC cryptographic technique coexisting in a data envelope, as defined by the statement "hybrid PQC cryptographic technique={PQC cryptographic technique, Non-PQC cryptographic technique}." In some embodiments, a hybrid PQC cryptographic technique may comprise a hybrid PQC cryptographic mode, such as a signature-based hybrid PQC cryptographic mode consisting of a non-PQC cryptographic signature and a PQC cryptographic signature. In some embodiments, the hybrid PQC cryptographic mode is valid only if both the non-PQC cryptographic signature and the PQC cryptographic signature are valid. For example, the QC detection system may (i) validate the non-PQC cryptographic signature according to the Federal Information Processing Standard (FIPS) publication 140 (e.g., 140-1, 140-2, 140-3); and (ii) validate the PQC cryptographic signature using multiple public-key algorithms for X.509 certificates, such as quantum-resistant X.509 Multiple Public Key Algorithm Certificates.

The term "quantum cryptographic technique" refers to a quantum particle-based cryptographic technique. Quantum cryptographic techniques may comprise, for example, quantum key distribution (QKD) techniques, quantum coin flipping protocols, quantum commitment protocols, quantum oblivious transfer protocols, and other suitable techniques. In some instances, a quantum cryptographic technique may be a variant of a quantum cryptographic algorithm. For example, a first quantum cryptographic technique may be a BB84-based QKD technique, a second quantum cryptographic technique may be an E91-based QKD technique, and a third quantum cryptographic technique may be a KMB09-based QKD technique, each of which is a different variant of the same quantum cryptographic algorithm (e.g., QKD).

The term "non-PQC communications channel" refers to a communications channel (e.g., a wired or wireless communications channel) over which non-quantum data and signals are exchanged using one or more non-PQC cryptographic techniques that do not themselves directly rely on quantum properties. For example, the QC detection system described herein may implement a non-PQC communications channel by encrypting data based on a non-PQC cryptographic technique (e.g., RSA) and then transmitting the encrypted data over a non-PQC communications channel (e.g., an "in-band" communications channel) or, in some instances, by transmitting unencrypted, clear text data over the non-PQC communications channel. In some embodiments, a non-PQC communications channel may be a classical communications channel derived from a shared secret that is derived using a non-PQC cryptographic technique, such as a shared secret generated using DH.

The term "PQC communications channel" refers to a communications channel (e.g., a wired or wireless communications channel) over which non-quantum data and signals are exchanged using one or more PQC cryptographic techniques (e.g., for authentication, encryption, or both) that do not themselves directly rely on quantum properties. For example, the QC detection system described herein may implement a PQC communications channel by encrypting data based on a PQC cryptographic technique (e.g., Dilithium II) and then transmitting the encrypted data over a classical back channel (e.g., an "out-of-band" communications channel). In some embodiments, a PQC communications channel may be based on an underlying Key Encapsulation Mechanism or Key Agreement Scheme. In some embodiments, a PQC communications channel may use a Key Encapsulation Mechanism (e.g., SIKE, NTRUPrime, Kyber) to encapsulate a shared secret and ensure its safe transmission between Alice and Bob. This shared secret subsequently will either (i) be used as a Symmetric Key (e.g., for Symmetric Key encryption) or (ii) be handed over to a Key Derivation Function to generate a shared encryption key. In some embodiments, a PQC communications channel may use a Key Agreement Scheme (e.g., SIDH, NewHopeDH) may allow both Alice and Bob to calculate the shared secret based on public parameters and public key that they exchange. Unlike Key Encapsulation Mechanisms, Key Agreement Schemes do not encapsulate the calculated shared secret with cipher text. Key Agreement Schemes may be extended to generate Ephemeral keys. In some instances, after the shared secret is calculated, the keys are destroyed to preserve perfect forward secrecy. In some embodiments, a PQC communications channel may be a classical communications channel derived from a shared secret that is derived using a Key Encapsulation Mechanism or a Key Agreement Scheme.

The term "quantum communications channel" refers to a quantum communications channel (e.g., an optical line, a quantum line) over which quantum data and particles, such as qubits, are exchanged using one or more quantum cryptographic techniques (e.g., QKD) that directly rely on quantum properties, such as quantum uncertainty, quantum entanglement, or both.

Having set forth a series of definitions called-upon throughout this application, an example system architecture is described below for implementing example embodiments and features of the present disclosure.

System Architecture

Methods, systems, apparatuses, and computer program products of the present disclosure may be embodied by any of a variety of devices. For example, the method, system, apparatus, and computer program product of an example embodiment may be embodied by one or more networked devices, such as one or more servers, remote servers, cloud-based servers (e.g., cloud utilities), or other network entities, and configured to communicate with one or more devices, such as one or more server devices, client devices, database server devices, remote server devices, other suitable devices, or a combination thereof.

In some instances, the method, system, apparatus, and computer program product of an example embodiment may be embodied by one or more quantum communications circuitries, such as one or more quantum particle encoders, quantum particle decoders, laser devices, quantum lines, quantum particle storage devices, other suitable quantum communications devices or components, or a combination thereof.

Example embodiments of the client devices include any of a variety of stationary or mobile computing devices, such as a mobile telephone, smartphone, smartwatch, smart speaker, portable digital assistant (PDA), tablet computer, laptop computer, desktop computer, kiosk computer, automated teller machine (ATM), point of sale (PoS) device, electronic workstation, any other suitable computing device, or any combination of the aforementioned devices.

FIG. 1 illustrates a system diagram of a set of devices that may be involved in some example embodiments described herein. In this regard, FIG. 1 discloses an example environment 100 within which embodiments of the present disclosure may operate to provide for QC detection (including, but not limited to, data leakage detection and data tampering detection) and PQC. As illustrated in FIG. 1, a QC detection system 102 may be connected to one or more QC detection server devices 104 in communication with one or more QC detection databases 106. The QC detection system 102 may be connected to one or more server devices 110A-110N, one or more client devices 112A-112N, one or more database server devices 114, and one or more remote server devices 116 through one or more communications networks 108. One or more communications networks 108 may include any suitable network or combination of networks, such as a virtual network, the Internet, a local area network (LAN), a Wi-Fi network, a Worldwide Interoperability for Microwave Access (WiMAX) network, a home network, a cellular network, a near field communications (NFC) network, other types of networks, or a combination thereof. In some embodiments, the QC detection system 102 may be configured to provide QC detection and PQC and monitor changes therein as described in further detail below.

The QC detection system 102 may be embodied as one or more specialized circuitries, computers, or computing systems and may comprise one or more QC detection server devices 104 and one or more QC detection databases 106. The one or more QC detection server devices 104 may be embodied as one or more servers, remote servers, cloud-based servers (e.g., cloud utilities), processors, any other suitable server devices, or any combination thereof. The one or more QC detection server devices 104 may be configured to receive, process, generate, and transmit data, signals, and electronic information to facilitate the operations of the QC detection system 102. The one or more QC detection databases 106 may be embodied as one or more data storage devices, such as Network Attached Storage (NAS) devices or separate databases or servers. The one or more QC detection databases 106 may be configured to store and provide access to data and information used by the QC detection system 102 to facilitate the operations of the QC detection system 102. For example, the one or more QC detection databases 106 may store user account credentials for users of one or more server devices 110A-110N, one or more client devices 112A-112N, one or more database server devices 114, one or more remote server devices 116, or a combination thereof. In another example, the one or more QC detection databases 106 may store data regarding device characteristics for the one or more server devices 110A-110N, one or more client devices 112A-112N, one or more database server devices 114, one or more remote server devices 116, or a combination thereof. In some embodiments, the one or more QC detection server devices 104, the one or more QC detection databases 106, or both may include or store various data and electronic information associated with one or more data, data attributes, data envelopes, enveloped data structures, policy information, policy attributes, risk profile data structures, QC detection data, QC detection techniques (including, but not limited to, detection of quantum computing capabilities; data leakage detection techniques; and data tampering detection techniques), QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, graphical user interface (GUI) data, any other suitable data or electronic information, any links or pointers thereto, or combinations thereof. In some embodiments, the one or more QC detection server devices 104, the one or more QC detection databases 106, or both may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more server devices 110A-110N may be embodied by one or more computing devices. In some embodiments, the one or more server devices 110A-110N may be embodied as one or more servers, remote servers, cloud-based servers (e.g., cloud utilities), processors, or any other suitable devices, or any combination thereof. In some embodiments, the one or more server devices 110A-110N may receive, process, generate, and transmit data, signals, and electronic information to facilitate the operations of the QC detection system 102. Information received by the QC detection system 102 from one or more server devices 110A-110N may be provided in various forms and via various methods. In some embodiments, the one or more server devices 110A-110N may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more server devices 110A-110N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more client devices 112A-112N may be embodied by one or more computing devices. Information received by the QC detection system 102 from the one or more client devices 112A-112N may be provided in various forms and via various methods. For example, the one or more client devices 112A-112N may be smartphones, laptop computers, netbooks, tablet computers, wearable devices, desktop computers, ATMs, PoS devices, electronic workstations, or the like, and the information may be provided through various modes of data transmission provided by these client devices. In some embodiments, the one or more client devices 112A-112N may include or store various data and electronic information associated with one or more users. For example, the one or more client devices 112A-112N may include or store user information (including, but not limited to, user profile information), any other suitable data, or any combination thereof. In some embodiments, the one or more client devices 112A-112N may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more client devices 112A-112N may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In embodiments where a client device 112 is a mobile device, such as a smartphone or tablet, the mobile device may execute an "app" (e.g., a thin-client application) to interact with the QC detection system 102, one or more server devices 110A-110N, one or more database server devices 114, one or more remote server devices 116, or a combination thereof. Such apps are typically designed to execute on mobile devices, such as tablets or smartphones. For example, an app may be provided that executes on mobile device operating systems such as Apple Inc.'s iOS, Google LLC's Android®, or Microsoft Corporation's Windows®. These platforms typically provide frameworks that allow apps to communicate with one another and with particular hardware and software components of mobile devices. For example, the mobile operating systems named above each provide frameworks for interacting with camera circuitry, microphone circuitry, sensor circuitry, location services circuitry, wired and wireless network interfaces, user contacts, and other applications in a manner that allows for improved interactions between apps while also preserving the privacy and security of individual users. In some embodiments, a mobile operating system may also provide for improved communication interfaces for interacting with external devices (e.g., server devices, client devices, database server devices, remote server devices). Communication with hardware and software modules executing outside of the app is typically provided via APIs provided by the mobile device operating system.

The one or more database server devices 114 may be embodied by one or more computing devices, server devices, servers, data storage devices, databases, or a combination thereof. In some embodiments, the one or more database server devices 114 may be embodied as one or more data storage devices, such as one or more NAS devices, or as one or more separate databases or database servers. In some embodiments, the one or more database server devices 114 may be embodied as one or more servers, remote servers, cloud-based servers (e.g., cloud utilities), processors, or any other suitable devices, or any combination thereof. In some embodiments, the one or more database server devices 114 may receive, process, generate, and transmit data, signals, and electronic information to facilitate the operations of the QC detection system 102. Information received by the QC detection system 102 from one or more database server devices 114 may be provided in various forms and via various methods. It will be understood, however, that in some embodiments, the one or more database server devices 114 need not themselves be databases or database servers but may be peripheral devices communicatively coupled to databases or database servers.

In some embodiments, the one or more database server devices 114 may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, any other suitable data or electronic information, any links or pointers thereto, or combinations thereof. In some embodiments, the one or more database server devices 114 may include or store exogenous data. The exogenous data may comprise, for example, public sentiment data structures (e.g., a widespread data breach at a third-party system, such as a merchant; a stock market crash; a geopolitical event), news articles, FDIC data, NIST data, company intranet data, technological advancements, scientific publications, financial data (e.g., stock market data, commodity market data, money market data), legal data (e.g., lawsuit data, regulatory data), any other suitable exogenous data, or any combination thereof. In some embodiments, the one or more database server devices 114 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

The one or more remote server devices 116 may be embodied by one or more computing devices, server devices, servers, data storage devices, databases, or a combination thereof. In some embodiments, the one or more remote server devices 116 may be embodied as one or more data storage devices, such as one or more NAS devices, or as one or more separate databases or database servers. In some embodiments, the one or more remote server devices 116 may be embodied as one or more servers, remote servers, cloud-based servers (e.g., cloud utilities), processors, or any other suitable devices, or any combination thereof. In some embodiments, the one or more remote server devices 116 may receive, process, generate, and transmit data, signals, and electronic information to facilitate the operations of the QC detection system 102. Information received by the QC detection system 102 from one or more remote server devices 116 may be provided in various forms and via various methods. It will be understood, however, that in some embodiments, the one or more remote server devices 116 need not themselves be servers but may be peripheral devices communicatively coupled to servers.

In some embodiments, the one or more remote server devices 116 may include or store various data and electronic information associated with one or more data, data attributes, data envelopes, enveloped data structures, policy information, policy attributes, risk profile data structures, QC detection data, QC detection techniques, QC detection alert control signals, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, machine learning techniques, GUI data, exogenous data, any other suitable data or electronic information, any links or pointers thereto, or combinations thereof. In some embodiments, the one or more remote server devices 116 may include or store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, or combinations thereof.

In some embodiments, the one or more server devices 110A-110N, the one or more client devices 112A-112N, the one or more database server devices 114, the one or more remote server devices 116, or any combination thereof may interact with the QC detection system 102 over one or more communications networks 108. As yet another example, the one or more server devices 110A-110N, the one or more client devices 112A-112N, the one or more database server devices 114, the one or more remote server devices 116, or a combination thereof may include various hardware or firmware designed to interface with the QC detection system 102. For example, an example server device 110A may be a session authentication server modified to communicate with the QC detection system 102, and another example server device 110B may be a purpose-built session authentication server offered for the primary purpose of communicating with the QC detection system 102. As another example, an example client device 112A may be a user's smartphone and may have an application stored thereon facilitating communication with the QC detection system 102, whereas another example client device 112B may be a purpose-built device offered for the primary purpose of communicating with the QC detection system 102.

In some embodiments, the one or more server devices 110A-110N, the one or more client devices 112A-112N, the one or more database server devices 114, the one or more remote server devices 116, or any combination thereof may interact with the QC detection system 102 over one or more PQC communications channels. The PQC communications channel may be, for example, a communications channel over which data is transmitted and received using a PQC cryptographic technique, such as a PQC back channel (e.g., a PQC out-of-band communications channel). In some embodiments, the QC detection system 102 may upgrade the application software in a server device 110, client device 112, database server device 114, or remote server device 116 so that the upgraded application software is configured to recognize a PQC communications channel and allow communication with the QC detection system 102 over the PQC communications channel. In some embodiments, where a server device 110, client device 112, database server device 114, or remote server device 116 is a non-PQC device (e.g., a computing device that is not configured to interact with, or capable of interacting with, the QC detection system 102 over a PQC communications channel), that non-PQC device may interact with the QC detection system 102 over a PQC communications channel using a PQC shim or PQC add-on device configured to allow communication with the QC detection system 102 over the PQC communications channel. In one example, the QC detection system 102 may determine that a server device 110, client device 112, database server device 114, or remote server device 116 is a non-PQC device and transmit a PQC shim to that non-PQC device for installation (e.g., automatic installation, manual installation) in the protocol stack of that device. The PQC shim may be embodied as, for example, computer program instructions (e.g., software, firmware). In another example where the server device 110, client device 112, database server device 114, or remote server device 116 is a non-PQC device, a PQC add-on device may be communicatively coupled to the non-PQC device. The PQC add-on device may be embodied as, for example, a PQC peripheral device communicatively coupled (e.g., via a wired communications path, wireless communications path, or both) to the non-PQC device. Additionally, or alternatively, the PQC add-on device may be embodied as, for example, a PQC application specific integrated circuit (ASIC) installed within a housing of the non-PQC device, or any other suitable device or circuitry. In some embodiments, the PQC-shim may comprise a set of routines with network capability and a PQC endpoint.

As a foundation for some embodiments, the QC detection system 102 may provide for detecting the existence and capabilities of quantum computing assets by generating QC detection data and encrypting the QC detection data based on a cryptographic technique (including, but not limited to, signing the QC detection data with a digital signature). In one example, the QC detection system 102 may provide for generating a pair of asymmetric cryptographic keys comprising a public cryptographic key and a private cryptographic key, encrypting the QC detection data based on the pair of asymmetric cryptographic keys, and destroying the private cryptographic key. In some embodiments, the QC detection system 102 may further provide for monitoring a set of data environments for electronic information related to the encrypted QC detection data. For example, the QC detection system 102 may provide for monitoring internal and external data environments implemented by one or more of the one or more client devices 112A-112N, the one or more server devices 110A-110N, the one or more database server devices 114, any other suitable device, or any combination thereof. In some embodiments, the QC detection system 102 may be further configured to generate a QC detection alert control signal in response to detection of the electronic information related to the encrypted QC detection data. In some embodiments, the QC detection system 102 may be further configured to generate a leakage alert control signal, a tampering alert control signal, any other suitable control signal, or any combination thereof.

In some embodiments, the QC detection system 102 may provide for detecting the realization of a quantum computer based on various QC detection techniques. For example, the QC detection system 102 may provide for a digital signature-based QC detection technique configured to detect a fraudulent document signed using a destroyed RSA private key. In another example, the QC detection system 102 may provide for an encryption-based QC detection technique configured to detect disclosed information encrypted using a random AES key encrypted using a destroyed RSA private key (e.g., protecting cleartext against disclosure for verification). In another example, the QC detection system 102 may provide for a code-sign based QC detection technique configured to detect code-sign malware using a destroyed RSA private key. In another example, the QC detection system 102 may provide for a certificate-based QC detection technique configured to detect a fraudulent certificate signed by an issuer certificate authority using a destroyed RSA private key (e.g., using a fictitious email certificate or legal sign certificate as a honeypot). In another example, the QC detection system 102 may provide for a tamper seal-based QC detection technique configured to detect a fraudulent PDF with an embedded digital signed object.

In some embodiments, the QC detection system 102 may provide adaptive PQC by monitoring an enveloped data structure to identify a change in the enveloped data structure, such as a change associated with a QC detection alert control signal, a leakage alert control signal, or a tampering alert control signal. In response, the QC detection system 102 may determine whether to generate a set of PQC encryption attributes for encrypting (e.g., re-encrypting, double encrypting) data contained in the enveloped data structure. For example, the enveloped data structure may comprise a data envelope and data. The data envelope may comprise a set of data attributes about the data and a risk profile data structure indicative of a vulnerability of the data in a PQC data environment. The data may have been encrypted based on a first set of encryption attributes (e.g., non-PQC encryption attributes, PQC encryption attributes).

In some embodiments, the QC detection system 102 may further provide for receiving a QC detection alert control signal, a leakage alert control signal, or a tampering alert control signal and, in response, generating an electronic indication of a change in the enveloped data structure based on the QC detection alert control signal, the leakage alert control signal, or the tampering alert control signal. In some embodiments, the QC detection system 102 may further provide for, in response to generating the electronic indication of the change in the enveloped data structure, retrieving PQC cryptographic performance information associated with a set of PQC cryptographic techniques. The PQC cryptographic performance information may comprise a set of PQC cryptographic performance attributes for each PQC cryptographic technique in the set of PQC cryptographic techniques. In some embodiments, the QC detection system 102 may further provide for generating a second set of encryption attributes (e.g., PQC encryption attributes) for encrypting the data based on the set of data attributes, the risk profile data structure, the change in the enveloped data structure, and the PQC cryptographic performance information.

In some embodiments, the QC detection system 102 may further provide for encrypting the data based on the second set of encryption attributes. In some embodiments, the QC detection system 102 may provide for storing the encrypted data in a data storage device. The data storage device may be, for example, one or more of the one or more database server devices 114, the one or more QC detection databases 106, the one or more client devices 112, the one or more server devices 110, or a combination thereof.

In some embodiments, the QC detection system 102 may further provide for generating a portfolio view (e.g., GUI) of existing business applications for modeling what the impact of applying a specific PQC cryptographic technique would be across an entire portfolio. In one illustrative example, if the QC detection system 102 determines that it must use PQC cryptographic technique Z to generate a symmetric key to encrypt data, the QC detection system 102 may be further configured to generate portfolio GUI data and transmit that portfolio GUI data to a client device 112 to show users which applications would be suitable for implementing PQC cryptographic technique Z (e.g., the additional encryption overhead would not exceed application transaction time limits), which applications would be borderline, and which applications would be "in the red" and would exceed transaction time limits.

Example Implementing Apparatuses

The QC detection system 102 described with reference to FIG. 1 may be embodied by one or more computing systems, such as apparatus 200 shown in FIG. 2. In some embodiments, apparatus 200 shown in FIG. 2 may represent an example QC detection system 102, a QC detection server device 104, a QC detection database, or a combination thereof.

Figure 2:
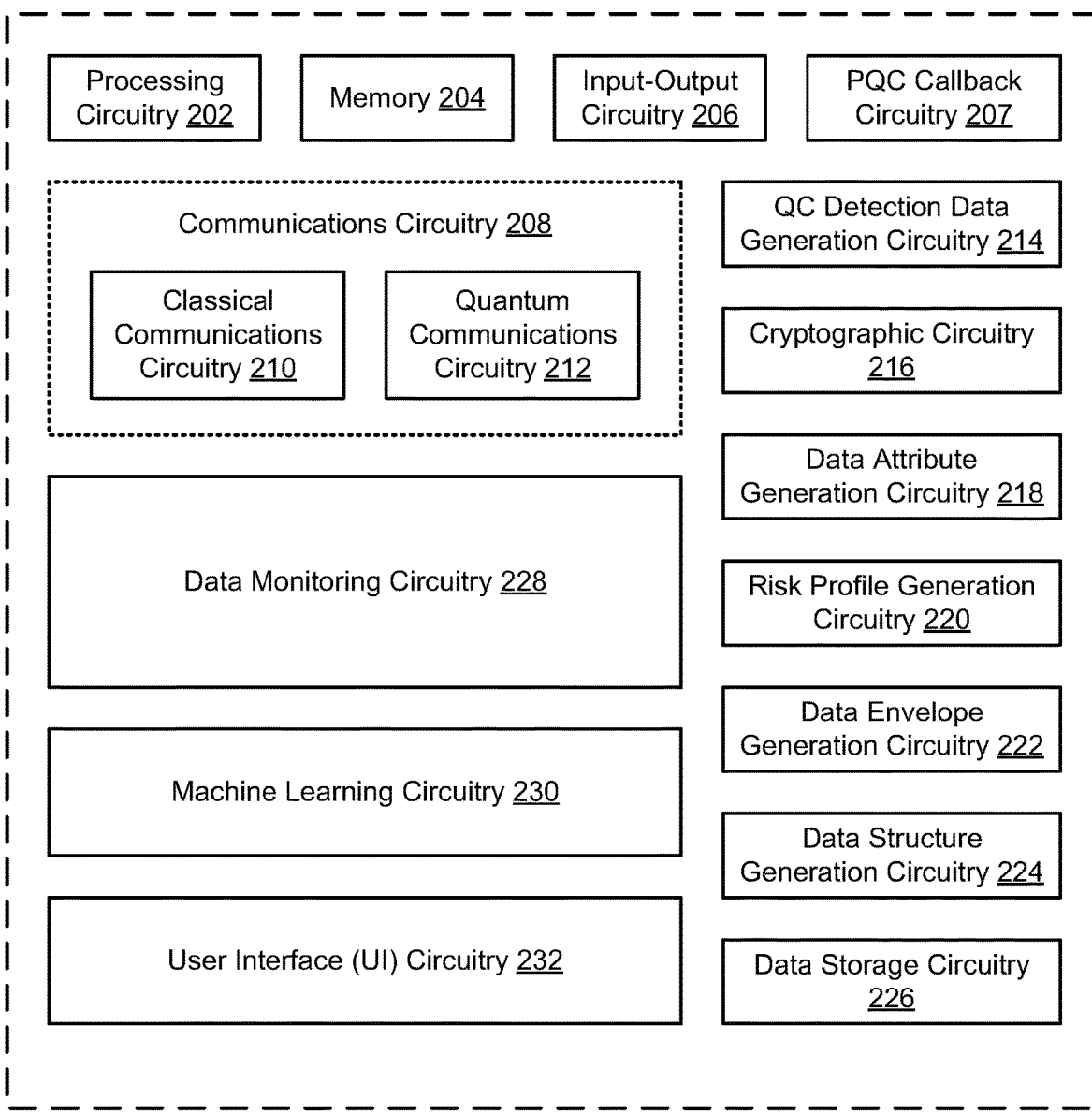
FIG. 2 illustrates a schematic block diagram of example circuitries that may perform various operations in accordance with some example embodiments described herein.

As illustrated in FIG. 2, the apparatus 200 may include one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, user interface (UI) circuitry 232, any other suitable circuitry, or any combination thereof. The apparatus 200 may be configured to execute the operations described above with respect to FIG. 1 and below with respect to FIGS. 3-7.

In some embodiments, the processing circuitry 202 (and/or co-processor or any other processing circuitry assisting or otherwise associated with the processor) may be in communication with the memory 204 via a bus for passing information among components of the apparatus 200. The memory 204 may be non-transitory and may include, for example, one or more volatile and/or non-volatile memories. For example, the memory may be an electronic storage device (e.g., a computer readable storage medium). The memory 204 may be configured to store information, data, data structures, content, control signals, applications, instructions, or the like, for enabling the apparatus to carry out various functions in accordance with example embodiments of the present disclosure. In some instances, the memory 204 may be configured to store data, data structures, data elements, and electronic information associated with one or more data (e.g., unencrypted data, encrypted data, decrypted data, re-encrypted data, double encrypted data, data access control information, bitstreams of data, QC detection data, links or pointers thereto), data attributes, data envelopes, enveloped data structures, policy information, policy attributes, risk profile data structures, QC detection techniques (including, but not limited to, detection of quantum computing capabilities; data leakage detection techniques; and data tampering detection techniques), control signals (e.g., QC detection alert control signals), non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, any other suitable data or electronic information, or combinations thereof. It will be understood that the memory 204 may be configured to store any data, data structures, electronic information, requests, control signals, embodiments, examples, figures, techniques, processes, operations, methods, systems, apparatuses, or computer program products described herein, or any combination thereof.

The processing circuitry 202 may be embodied in a number of different ways and may, for example, include one or more processing devices configured to perform independently. Additionally, or alternatively, the processing circuitry 202 may include one or more processors configured in tandem via a bus to enable independent execution of instructions, pipelining, multithreading, or a combination thereof. The use of the term "processing circuitry" may be understood to include a single core processor, a multi-core processor, multiple processors internal to the apparatus, remote or "cloud" processors, or a combination thereof.

In an example embodiment, the processing circuitry 202 may be configured to execute instructions stored in the memory 204 or otherwise accessible to the processor. Alternatively, or additionally, the processing circuitry 202 may be configured to execute hard-coded functionality. As such, whether configured by hardware or software methods, or by a combination of hardware with software, the processor may represent an entity (e.g., physically embodied in circuitry) capable of performing operations according to an embodiment of the present disclosure while configured accordingly. As another example, when the processor is embodied as an executor of software instructions, the instructions may specifically configure the processor to perform the functionalities and operations described herein when the instructions are executed.

In some embodiments, the apparatus 200 may include input-output circuitry 206 that may, in turn, be in communication with processing circuitry 202 to provide output to the user and, in some embodiments, to receive an indication of a user input such as a command provided by a user. The input-output circuitry 206 may comprise a user interface (e.g., a user interface generated by user interface circuitry included in the apparatus 200) comprising a display that may include a web user interface, a mobile application, a client device, a display device, a display screen, or any other suitable hardware or software. In some embodiments, the input-output circuitry 206 may also include a keyboard, a mouse, a joystick, a touch screen, touch areas, soft keys, a microphone, a speaker, or other input-output mechanisms. The processing circuitry 202, the input-output circuitry 206 (which may utilize the processing circuitry 202), or both may be configured to control one or more functions of one or more user interface elements through computer program instructions (e.g., software, firmware) stored on a memory (e.g., memory 204). Input-output circuitry 206 is optional and, in some embodiments, the apparatus 200 may not include input-output circuitry. For example, where the apparatus 200 does not interact directly with the user, the apparatus 200 may be configured to generate (e.g., by UI circuitry 232) user interface data (e.g., data attribute GUI data, risk profile GUI data, PQC optimization GUI data, data monitoring GUI data, QC detection GUI data) for display by one or more other devices with which one or more users directly interact and transmit the generated user interface data to one or more of those devices.

In some embodiments, the apparatus 200 may include PQC callback circuitry 207 that includes hardware components designed or configured to provide for communication with: the cryptographic circuitry of a client device; a PQC shim circuitry installed in a network layer of a client device; a PQC add-on device communicatively coupled to a client device; any other suitable circuitry or device; or any combination thereof. For example, PQC callback circuitry 207 may be configured to provide PQC communications channel-based cryptographic techniques, such as the transmission and receipt of sensitive portions (e.g., payloads) of electronic communications to a PQC shim or a PQC add-on device over one or more PQC communications channels.

In some embodiments, the PQC callback circuitry 207 may be configured to establish a non-PQC communications channel based on one or more non-PQC cryptographic algorithms (e.g., as provided by cryptographic circuitry 216). In some embodiments, the PQC callback circuitry 207 may be configured to establish a PQC communications channel based on one or more PQC cryptographic algorithms (e.g., as provided by cryptographic circuitry 216). In some embodiments, the PQC callback circuitry 207 may be configured to establish a hybrid PQC communications channel based on one or more hybrid PQC cryptographic algorithms (e.g., as provided by cryptographic circuitry 216).

In one illustrative example, the PQC callback circuitry 207 may be configured to establish a PQC communications channel using a PQC cryptographic algorithm. The cryptographic circuitry 216 may be further configured to generate a secret key (e.g., an AES symmetric cryptographic key). Thereafter, the PQC callback circuitry 207 may transmit the secret key to a remote device over the PQC communications channel for use in the subsequent exchange of encrypted communications.

In some embodiments, the PQC callback circuitry 207 may be configured to generate (e.g., dynamically generate) the PQC communications channel based on a set of data attributes about the electronic communication, a risk profile data structure indicative of a vulnerability of the electronic communication in a PQC data environment, and PQC performance information associated with a set of PQC cryptographic techniques, wherein the PQC performance information comprises a set of PQC performance attributes for each PQC cryptographic technique in the set of PQC cryptographic techniques. In some embodiments, the PQC callback circuitry 207 may be configured to generate the PQC communications channel based on a machine learning technique, such as a machine learning technique provided or performed by the machine learning circuitry 230.

The communications circuitry 208 may be any device or circuitry embodied in either hardware or a combination of hardware and software that is configured to receive and/or transmit classical data, quantum information, or both from or to a network and/or any other device, circuitry, or module in communication with the apparatus 200. In this regard, the communications circuitry 208 may include, for example, classical communications circuitry 210 and quantum communications circuitry 212.

The classical communications circuitry 210 may be any device or circuitry embodied in either hardware or a combination of hardware and software that is configured to receive and/or transmit data from or to a network and/or any other device, circuitry, or module in communication with the apparatus 200. In this regard, the classical communications circuitry 210 may include, for example, a network interface for enabling communications with a wired or wireless communications network. For example, the classical communications circuitry 210 may include one or more network interface cards, antennae, buses, switches, routers, modems, and supporting hardware and/or software, or any other device suitable for enabling communications via a network. In some embodiments, the communication interface may include the circuitry for interacting with the antenna(s) to cause transmission of signals via the antenna(s) or to handle receipt of signals received via the antenna(s). These signals may be transmitted by the apparatus 200 using any of a number of wireless personal area network (PAN) technologies, such as Bluetooth® v1.0 through v5.0, Bluetooth Low Energy (BLE), infrared wireless (e.g., IrDA), ultra-wideband (UWB), induction wireless transmission, or any other suitable technologies. In addition, it should be understood that these signals may be transmitted using Wi-Fi, NFC, WiMAX or other proximity-based communications protocols.

The quantum communications circuitry 212 may be any device or circuitry embodied in either hardware or a combination of hardware and software that is configured to receive and/or transmit quantum particles, such as photons, electrons, or both from or to any other device, circuitry, or module in communication with the apparatus 200. In this regard, the quantum communications circuitry 212 may include, for example, optical components such as an optical communications interface for enabling optical communications over a quantum line. In some embodiments, the quantum communications circuitry 212 may include encoding circuitry (e.g. an on-chip encoder) to generate a set of entangled quantum particles (e.g., qubits, qutrits, qudits) and decoding circuitry (e.g., an on-chip decoder) to receive (e.g., directly or indirectly, such as via switching circuitry), store, and measure a set of entangled quantum particles. In some embodiments, the quantum communications circuitry 212 may further include quantum basis determination circuitry configured to determine the quantum bases, or sets of quantum bases, for encoding and decoding of a given set of quantum particles. In some embodiments, the quantum communications circuitry 212 may include or be communicatively coupled to one or more quantum storage devices configured to store various quantum information, such as one or more quantum particles (e.g., pairs of entangled quantum particles, one entangled quantum particle in a pair of entangled quantum particles), quantum cryptographic keys, quantum one-time pads, any other suitable quantum information, any links or pointers thereto, and combinations thereof.

In some embodiments, the communications circuitry 208 may be configured to receive, retrieve, or obtain data. In some embodiments, the data may comprise data access control information, a link or pointer to the data (e.g., a link to a credit card number), a bitstream, a binary large object (BLOB), any other suitable data, or any combination thereof. In some embodiments, the data may have been encrypted based on a set of encryption attributes, such as a set of non-PQC encryption attributes, a set of PQC encryption attributes, or both (e.g., double encryption where the data has been encrypted based on a set of non-PQC encryption attributes and then double encrypted based on a set of PQC encryption attributes). In some embodiments, the communications circuitry 208 may be configured to receive, retrieve, or obtain the data from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a set of data attributes about the data. In some embodiments, the communications circuitry 208 may be configured to receive, retrieve, or obtain the set of data attributes from another circuitry, such as processing circuitry 202, data attribute generation circuitry 218, any other suitable circuitry, or a combination thereof. In some embodiments, the communications circuitry 208 may be configured to receive, retrieve, or obtain the set of data attributes from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the set of data attributes, the communications circuitry 208 may be configured to receive, retrieve, or obtain the set of data attributes by extracting the set of data attributes from the data envelope.

In some embodiments, the communications circuitry 208 may be configured to receive, retrieve, or obtain policy information associated with the data. In some embodiments, the communications circuitry 208 may be configured to receive, retrieve, or obtain the policy information from another circuitry, such as processing circuitry 202, risk profile generation circuitry 220, any other suitable circuitry, or a combination thereof. In some embodiments, the communications circuitry 208 may be configured to receive, retrieve, or obtain the policy information from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the communications circuitry 208 may be configured to receive, retrieve, or obtain a risk profile data structure indicative of a vulnerability of the data in a PQC data environment. In some embodiments, the communications circuitry 208 may be configured to receive, retrieve, or obtain the risk profile data structure from another circuitry, such as processing circuitry 202, risk profile generation circuitry 220, any other suitable circuitry, or a combination thereof. In some embodiments, the communications circuitry 208 may be configured to receive, retrieve, or obtain the risk profile data structure from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, where the data is included in an enveloped data structure comprising the data and a data envelope that comprises the risk profile data structure, the communications circuitry 208 may be configured to receive, retrieve, or obtain the risk profile data structure by extracting the risk profile data structure from the data envelope.

In some embodiments, the communications circuitry 208 may be configured to receive, retrieve, or obtain PQC cryptographic performance information associated with a set of PQC cryptographic techniques. In some embodiments, the communications circuitry 208 may be configured to receive, retrieve, or obtain the PQC cryptographic performance information from another circuitry, such as processing circuitry 202, any other suitable circuitry, or a combination thereof. In some embodiments, the communications circuitry 208 may be configured to receive, retrieve, or obtain the PQC cryptographic performance information from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

The QC detection data generation circuitry 214 includes hardware components designed or configured to request, receive, process, generate, and transmit data, data structures, control signals, and electronic information for use in QC detection and PQC. In some embodiments, the QC detection data generation circuitry 214 may be configured to generate QC detection data. In some embodiments, the QC detection data may comprise fictitious data, a fictitious code-signing certificate, any other suitable data, or any combination thereof. In some embodiments, the QC detection data generation circuitry 214 may be configured to generate the QC detection data based on a machine learning technique, such as a machine learning technique provided or performed by the machine learning circuitry 230.

The cryptographic circuitry 216 includes hardware components designed or configured to request, receive, process, generate, and transmit data, data structures, control signals, and electronic information for use in QC detection and PQC. In some embodiments, the cryptographic circuitry 216 may be configured to generate a pair of asymmetric cryptographic keys comprising a public cryptographic key and a private cryptographic key. In some embodiments, the pair of asymmetric cryptographic keys may comprise a pair of RSA cryptographic keys comprising an RSA public cryptographic key and an RSA private cryptographic key. In some embodiments, the pair of asymmetric cryptographic keys may comprise a pair of DH cryptographic keys comprising a DH public cryptographic key and a DH private cryptographic key. In some embodiments, the cryptographic circuitry 216 may be configured to generate encrypted QC detection data based on the pair of asymmetric cryptographic keys.

In some embodiments, the cryptographic circuitry 216 may be configured to destroy the private cryptographic key. For example, the apparatus 200 may be configured to destroy the private cryptographic key by overwriting, or zeroizing, all instances of the private cryptographic key. In some embodiments, the cryptographic circuitry 216 may be configured to destroy the private cryptographic key less than about one second after generation of the encrypted QC generation data. In some embodiments, the cryptographic circuitry 216 may be configured to destroy the private cryptographic key less than about one minute after generation of the pair of asymmetric cryptographic keys. In some embodiments, the cryptographic circuitry 216 may be configured to not transmit the private cryptographic key. For instance, the cryptographic circuitry 216 may generate the private cryptographic key and never thereafter transmit the private cryptographic key, information about the private cryptographic key, or both. In some embodiments, the cryptographic circuitry 216 may be configured to generate an electronic confirmation signal indicating that the private cryptographic key has been destroyed and transmit the electronic confirmation signal to memory 204, a QC detection storage device, a remote device (e.g., a server device 110, a client device 112, a database server device 114, or a remote server device 116), any other suitable device, or a combination thereof.

In other embodiments, the cryptographic circuitry 216 may be further configured to destroy the public cryptographic key (e.g., as discussed below with reference to FIG. 5). For example, the cryptographic circuitry 216 may be configured to destroy the public cryptographic key by overwriting, or zeroizing, all instances of the public cryptographic key. In some embodiments, the cryptographic circuitry 216 may be configured to destroy the public cryptographic key less than about one second after generation of the encrypted QC generation data. In some embodiments, the cryptographic circuitry 216 may be configured to destroy the public cryptographic key less than about one minute after generation of the pair of asymmetric cryptographic keys. In some embodiments, the cryptographic circuitry 216 may be configured to not transmit the public cryptographic key. For instance, the cryptographic circuitry 216 may generate the public cryptographic key and never thereafter transmit the public cryptographic key, information about the public cryptographic key, or both. In some embodiments, the cryptographic circuitry 216 may be configured to generate an electronic confirmation signal indicating that public cryptographic key, or the pair of asymmetric cryptographic keys, has been destroyed and transmit the electronic confirmation signal to memory 204, a QC detection storage device, a remote device (e.g., a server device 110, a client device 112, a database server device 114, or a remote server device 116), any other suitable device, or a combination thereof.

In some embodiments, the cryptographic circuitry 216 may be configured to generate the encrypted QC detection data based on a digital signature-based QC detection technique configured to allow for detection, by the data monitoring circuitry 228, of QC detection data (e.g., a fictitious electronic document) digitally signed using a destroyed RSA private key. In some embodiments, the cryptographic circuitry 216 may be configured to generate the encrypted QC detection data based on an encryption-based QC detection technique configured to allow for detection, by the data monitoring circuitry 228, of QC detection data (e.g., disclosed QC detection data that has been transmitted to a remote device) encrypted using a random AES key encrypted using a destroyed RSA private key. In some embodiments, the cryptographic circuitry 216 may be configured to generate the encrypted QC detection data based on a code-sign based QC detection technique configured to allow for detection, by the data monitoring circuitry 228, of malware code-signed using a destroyed RSA private key. In some embodiments, the cryptographic circuitry 216 may be configured to generate the encrypted QC detection data based on a certificate-based QC detection technique configured to allow for detection, by the data monitoring circuitry 228, of QC detection data (e.g., a fictitious email certificate or legal sign certificate) signed by an issuer certificate authority using a destroyed RSA private key. In some embodiments, the cryptographic circuitry 216 may be configured to generate the encrypted QC detection data based on a tamper seal-based QC detection technique configured to allow for detection, by the data monitoring circuitry 228, of QC detection data (e.g., a fraudulent PDF document) with an embedded digital signed object.

In some embodiments, the cryptographic circuitry 216 may be configured to re-encrypt or double encrypt the encrypted QC detection data based on a second cryptographic technique, such as a PQC cryptographic technique. For example, the cryptographic circuitry 216 may be configured to encrypt the QC detection data based on a non-PQC cryptographic technique, such as RSA-2048, to generate first encrypted QC detection data, and then encrypt the first encrypted QC detection data based on a PQC cryptographic technique, such as AES-512, that is quantum-resistant to generate second encrypted QC detection data (e.g., double encrypted QC detection data). In another example, the cryptographic circuitry 216 may be configured to encrypt the QC detection data based on a first PQC cryptographic technique, such as Dilithium II to generate first encrypted QC detection data, and then encrypt the first encrypted QC detection data based on a stronger, second PQC cryptographic technique, such as Dilithium IV, to generate second encrypted QC detection data (e.g., double encrypted QC detection data). In some embodiments, the cryptographic circuitry 216 may be configured to transmit the first encrypted QC detection data, the second encrypted QC detection data (e.g., the double encrypted QC detection data, the re-encrypted QC detection data) to the data storage circuitry 226 for storage in a QC detection storage device.

In some embodiments, the cryptographic circuitry 216 may be configured to encrypt data using various recommended cryptographic techniques, such as non-PQC cryptographic techniques and hybrid PQC cryptographic techniques (e.g., hybrid PQC cryptographic technique={PQC cryptographic technique, Non-PQC cryptographic technique}). For example, the recommended cryptographic technique may comprise a hybrid PQC cryptographic mode, such as a signature-based hybrid PQC cryptographic mode consisting of a non-PQC cryptographic signature and a PQC cryptographic signature, where the hybrid PQC cryptographic mode is valid only if both the non-PQC cryptographic signature and the PQC cryptographic signature are valid (e.g., the QC detection system may perform validation of the non-PQC cryptographic signature according to FIPS 140-3; the QC detection system may perform validation of the PQC cryptographic signature using multiple public-key algorithms for X.509 certificates, such as quantum-resistant X.509 Multiple Public Key Algorithm Certificates).

In some embodiments, the cryptographic circuitry 216 may recommend different cryptographic techniques for encrypting data used by different lines of business (LOBs) or entities. For example, the cryptographic circuitry 216 may recommend a first PQC cryptographic technique for encrypting data used by a first LOB; a second PQC cryptographic technique for encrypting data used by a second LOB; a non-PQC cryptographic technique for encrypting data used by a third LOB; and a hybrid PQC cryptographic technique for encrypting data used by a fourth LOB.

In some embodiments, the cryptographic circuitry 216 may be configured to transmit the encrypted QC detection data to an internal data storage device (e.g., an internal data environment such as internal data network) at a first time and not transmit the encrypted QC detection data at any time after the first time. For example, the cryptographic circuitry 216 may transmit the QC detection data to an internal data storage device and never thereafter transmit QC detection data. In some embodiments, the cryptographic circuitry 216 may be configured to transmit the encrypted QC detection data to a remote device (e.g., an external data environment such as a CDN or online repository) at a first time and not transmit the encrypted QC detection data at any time after the first time. For example, the cryptographic circuitry 216 may transmit the QC detection data to a remote device and never thereafter transmit QC detection data. In some embodiments, the cryptographic circuitry 216 may be configured to not transmit the encrypted QC detection data at any time.

In some embodiments, the cryptographic circuitry 216 may be configured to retrieve cryptographic performance information associated with a set of non-PQC cryptographic techniques, a set of PQC cryptographic techniques, a set of hybrid PQC cryptographic techniques, or a combination thereof. For example, the cryptographic circuitry 216 may be configured to generate and retrieve non-PQC cryptographic performance information associated with a set of non-PQC cryptographic techniques. In another example, the cryptographic circuitry 216 may be configured to generate and retrieve PQC cryptographic performance information associated with a set of PQC cryptographic techniques. In some embodiments, the cryptographic circuitry 216 may be configured to retrieve the cryptographic performance information from one or more of the one or more QC detection server devices 104, the one or more QC detection databases 106, any other suitable device, or any combination thereof.

In some embodiments, the cryptographic circuitry 216 may be configured to generate the cryptographic performance information. For example, the cryptographic circuitry 216 may be configured to generate information indicative of the algorithm and implementation scale for each cryptographic technique in the set of cryptographic techniques. In another example, the cryptographic circuitry 216 may be configured to generate electronic information indicative of the efficiency, performance, and deterministic operation of each cryptographic technique in the set of cryptographic techniques. In another example, the cryptographic circuitry 216 may be configured to perform a cryptanalysis for each cryptographic technique in the set of cryptographic techniques and generate, based on the cryptanalysis, a confidence data structure comprising a confidence score for each cryptographic technique in the set of cryptographic techniques. In yet another example, the cryptographic circuitry 216 may be configured to generate electronic information indicative of the usability and interoperability of each cryptographic technique in the set of cryptographic techniques. In some embodiments, the cryptographic circuitry 216 may be configured to generate the cryptographic performance information by capturing performance metrics reflecting the performance of the various cryptographic technique implementations.

In some embodiments, the cryptographic circuitry 216 may be configured to generate the cryptographic performance information based on a machine learning technique, such as a machine learning technique provided or performed by the machine learning circuitry 230. The cryptographic circuitry 216 may use the cryptographic performance information and the various data components thereof to improve machine understanding of how these cryptographic techniques may can be used the QC detection system 102. In some instances, the cryptographic circuitry 216 may use the captured performance metrics to evaluate other implementations of these or other cryptographic techniques.

In some embodiments, the cryptographic performance information may comprise a set of cryptographic performance attributes for each cryptographic technique in the set of cryptographic techniques. In some embodiments, each cryptographic technique in the set of cryptographic techniques may be a variant of a cryptographic algorithm. In some embodiments, the set of cryptographic performance attributes may comprise a central processing unit (CPU) utilization for each cryptographic technique in the set of cryptographic techniques. In some embodiments, the set of cryptographic performance attributes may comprise a memory utilization for each cryptographic technique in the set of cryptographic techniques. In some embodiments, the set of cryptographic performance attributes may comprise an encryption time (e.g., a determined processing time needed to encrypt a unit of data, such as seconds per megabyte of data) for each cryptographic technique in the set of cryptographic techniques. In some embodiments, the set of cryptographic performance attributes may comprise a decryption time (e.g., a determined processing time needed to decrypt a unit of encrypted data, such as seconds per megabyte of data) for each cryptographic technique in the set of cryptographic techniques. In some embodiments, the set of cryptographic performance attributes may comprise a verification time (e.g., a determined processing time needed to verify a unit of encrypted data, such as seconds per megabyte of data) for each cryptographic technique in the set of cryptographic techniques. In some embodiments, the set of cryptographic performance attributes may comprise a key length (e.g., key size) for each cryptographic technique in the set of cryptographic techniques. In some embodiments, the set of cryptographic performance attributes may comprise a payload size for each cryptographic technique in the set of cryptographic techniques. In some embodiments, the set of cryptographic performance attributes may comprise a payload longevity for each cryptographic technique in the set of cryptographic techniques. In some embodiments, the set of cryptographic performance attributes may comprise a set of policy attributes for each cryptographic technique in the set of cryptographic techniques. In some embodiments, the set of cryptographic performance attributes may comprise an information classification for each cryptographic technique in the set of cryptographic techniques. In some embodiments, the set of cryptographic performance attributes may comprise a mode of operation for each cryptographic technique in the set of cryptographic techniques.

In some embodiments, the cryptographic circuitry 216 may be configured to generate a set of encryption attributes for encrypting the data. In some embodiments, the cryptographic circuitry 216 may be configured to generate the set of encryption attributes based on the set of data attributes, the risk profile data structure, and the cryptographic performance information. In some embodiments, the cryptographic circuitry 216 may be configured to receive, retrieve, or obtain the set of data attributes from another circuitry, such as processing circuitry 202, data attribute generation circuitry 218, any other suitable circuitry, or any combination thereof. In some embodiments, the cryptographic circuitry 216 may be configured to extract, directly or indirectly, the set of policy attributes from an enveloped data structure, such as from a data envelope included in the enveloped data structure. In some embodiments, the cryptographic circuitry 216 may be configured to receive, retrieve, or obtain the risk profile data structure from another circuitry, such as processing circuitry 202, risk profile generation circuitry 220, any other suitable circuitry, or any combination thereof. In some embodiments, the cryptographic circuitry 216 may be configured to extract, directly or indirectly, the risk profile data structure from an enveloped data structure, such as from a data envelope included in the enveloped data structure. In some embodiments, the cryptographic circuitry 216 may be configured to generate the set of encryption attributes based on based on a machine learning technique, such as a machine learning technique provided or performed by the machine learning circuitry 230. In some embodiments, the cryptographic circuitry 216 may be configured to generate an allowable transaction time for encryption of the data. In some embodiments, the cryptographic circuitry 216 may be configured to generate the set of encryption attributes further based on the allowable transaction time.

In some embodiments, the cryptographic circuitry 216 may be configured to generate a set of encryption attributes for encrypting the data. For instance, the cryptographic circuitry 216 may be configured to generate a set of PQC cryptographic performance attribute weightage values based on the set of data attributes, the risk profile data structure, and the PQC cryptographic performance information. The set of PQC cryptographic performance attribute weightage values may comprise a PQC cryptographic performance attribute weightage value $w_i$ for each cryptographic performance attribute in the set of PQC cryptographic performance attributes for a particular PQC cryptographic technique, where i is an integer ranging from 1 to N, and where N is an integer that is greater than or equal to 1. In some embodiments, each PQC cryptographic performance attribute weightage value $w_i$ in the set of PQC cryptographic performance attribute weightage values may correspond to a respective PQC cryptographic performance attribute in the set of PQC cryptographic performance attributes. For example, the set of PQC cryptographic performance attributes may comprise N PQC cryptographic performance attributes, and the set of PQC cryptographic performance attribute weightage values may comprise N PQC cryptographic performance attribute weightage values, where each PQC cryptographic performance attribute weightage value $w_i$ in the set of N PQC cryptographic performance attributes corresponds to a respective cryptographic performance attribute in the set of N PQC cryptographic performance attributes for the particular PQC cryptographic technique.

In some embodiments, the cryptographic circuitry 216 may be configured to generate a set of PQC cryptographic performance attribute scores for each PQC cryptographic performance attribute in the set of PQC cryptographic performance attributes and each PQC cryptographic technique in the set of PQC cryptographic techniques based on the set of data attributes, the risk profile data structure, and the PQC cryptographic performance information. The set of PQC cryptographic performance attribute scores may comprise a PQC cryptographic performance attribute score $s_{i,j,k}$ for each cryptographic performance attribute in the set of PQC cryptographic performance attributes for a particular PQC cryptographic technique, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the cryptographic circuitry 216 may be configured to generate a set of weighted PQC cryptographic performance attribute scores based on the set of PQC cryptographic performance attribute scores and the set of PQC cryptographic performance attribute weightage values. In some embodiments, the cryptographic circuitry 216 may be configured to generate the set of weighted PQC cryptographic performance attribute scores according to equation 1 below:

$$S_{i,j,k} = w_i \times s_{i,j,k} \qquad (1)$$

where $w_i$ is the PQC cryptographic performance attribute weightage value for each cryptographic performance attribute in the set of PQC cryptographic performance attributes; $s_{i,j,k}$ is the PQC cryptographic performance attribute score for each cryptographic performance attribute; and $S_{i,j,k}$ is the weighted PQC cryptographic performance attribute score, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the cryptographic circuitry 216 may be configured to generate a set of PQC cryptographic technique scores based on the set of weighted PQC cryptographic performance attribute scores. In some embodiments, each PQC cryptographic technique score in the set of PQC cryptographic technique scores may correspond to a respective PQC cryptographic technique in the set of PQC cryptographic techniques. In some embodiments, the cryptographic circuitry 216 may be configured to generate set of PQC cryptographic technique scores according to equation 2 below:

$$T_{j,k} = \sum_{i=1}^{N} S_{i,j,k} \qquad (2)$$

where $T_{j,k}$ is the PQC cryptographic technique score for each PQC cryptographic technique (e.g., each variant of each PQC cryptographic algorithm); and $S_{i,j,k}$ is the weighted PQC cryptographic performance attribute score, where i refers to the i-th PQC cryptographic performance attribute in the set of PQC cryptographic performance attributes, where i is an integer ranging from 1 to N, and where N is an integer that is greater than or equal to 1; where j refers to the j-th variant of a PQC cryptographic algorithm in the set of PQC cryptographic techniques, where j is an integer ranging from 1 to M, and where M is an integer that is greater than or equal to 1; and where k refers to the k-th PQC cryptographic algorithm in the set of PQC cryptographic techniques, where k is an integer ranging from 1 to P, and where P is an integer that is greater than or equal to 1.

In some embodiments, the set of PQC cryptographic technique scores may comprise a PQC cryptographic technique score range comprising a minimum PQC cryptographic technique score, a maximum PQC cryptographic technique score, a median PQC cryptographic technique score, a mean PQC cryptographic technique score, a first quartile PQC cryptographic technique score, a third quartile PQC cryptographic technique score, an interquartile PQC cryptographic technique score range between the first quartile PQC cryptographic technique score and the third quartile PQC cryptographic technique score, any other suitable value, metric, or range, or any combination thereof.

In some embodiments, the cryptographic circuitry 216 may be configured to generate the set of PQC encryption attributes for encrypting the data based on the set of PQC cryptographic technique scores. For example, the set of PQC cryptographic technique scores may comprise a maximum PQC cryptographic technique score, and the cryptographic circuitry 216 may be configured to generate the set of PQC encryption attributes for encrypting the data based on an optimal PQC cryptographic technique that corresponds to the maximum PQC cryptographic technique score. In another example, the set of PQC cryptographic technique scores may comprise subset of high PQC cryptographic technique scores (e.g., the top three PQC cryptographic technique scores), and the cryptographic circuitry 216 may be configured to generate the set of PQC encryption attributes for encrypting the data based on an optimal PQC cryptographic technique that corresponds to a PQC cryptographic technique score in the subset of high PQC cryptographic technique scores having the highest cryptostrength. In another example, the set of PQC cryptographic technique scores may comprise a median PQC cryptographic technique score, the set of PQC cryptographic technique scores may comprise a subset of PQC cryptographic technique scores above the median PQC cryptographic technique score, and the cryptographic circuitry 216 may be configured to generate the set of PQC encryption attributes for encrypting the data based on an optima; PQC cryptographic technique that corresponds to a PQC cryptographic technique score in the subset of PQC cryptographic technique scores above the median PQC cryptographic technique score having the lowest transaction time. In yet another example, the set of PQC cryptographic technique scores may comprise a third quartile subset of PQC cryptographic technique scores, and the cryptographic circuitry 216 may be configured to generate the set of PQC encryption attributes for encrypting the data based on an optimal PQC cryptographic technique that corresponds to a PQC cryptographic technique score in the third quartile subset of PQC cryptographic technique scores above the median PQC cryptographic technique score having the lowest CPU utilization, the lowest memory utilization, the lowest latency, the lowest time for operation, or a combination thereof.

In some embodiments, the cryptographic circuitry 216 may be configured to encrypt data based on a set of encryption attributes, such as a set of non-PQC encryption attributes, a set of PQC encryption attributes, or both (e.g., a set of hybrid encryption attributes). In some embodiments, the cryptographic circuitry 216 may be configured to encrypt the QC detection data based on the set of encryption attributes. In some embodiments, the cryptographic circuitry 216 may be configured to encrypt other data based on the set of encryption attributes.

In some embodiments, the data may have been encrypted using a non-PQC cryptographic technique, and the cryptographic circuitry 216 may be configured to determine a PQC cryptographic technique based on a control signal (e.g., a QC detection alert control signal, a leakage alert control signal, a tampering alert control signal), a set of data attributes, a risk profile data structure, PQC cryptographic performance information associated with a set of PQC cryptographic techniques, or a combination thereof. The cryptographic circuitry 216 may be configured to encrypt the data using the PQC cryptographic technique.

In some embodiments, the data may have been encrypted using a first PQC cryptographic technique, and the cryptographic circuitry 216 may be configured to determine a PQC cryptographic technique based on a control signal (e.g., a QC detection alert control signal, a leakage alert control signal, a tampering alert control signal), a set of data attributes, a risk profile data structure, PQC cryptographic performance information associated with a set of PQC cryptographic techniques, or a combination thereof. The cryptographic circuitry 216 may be configured to encrypt the data using the second PQC cryptographic technique.

The data attribute generation circuitry 218 includes hardware components designed or configured to request, receive, process, generate, and transmit data, data structures, control signals, and electronic information for use in QC detection and PQC. In some embodiments, the data attribute generation circuitry 218 may be configured to generate a set of data attributes about the QC detection data or other data, such as data received by the communications circuitry 208. In some embodiments, the data attribute generation circuitry 218 may be configured to generate the set of data attributes based on the data itself, overhead data (e.g., protocol overhead, header, metadata) associated with the data, any other suitable data or electronic information, or any combination thereof. In some embodiments, the data attribute generation circuitry 218 may be configured to generate the set of data attributes about the data based on a machine learning technique, such as a machine learning technique provided or performed by the machine learning circuitry 230.

In some embodiments, the set of data attributes about the data may comprise a data lineage data attribute indicative of a data lineage of the data. For example, the data attribute generation circuitry 218 may be configured to generate a data lineage data attribute indicative of a data lineage of the QC detection data, wherein the set of data attributes comprises the data lineage data attribute.

In some embodiments, the set of data attributes about the data may comprise an entity relationship data attribute indicative of an entity relationship of the QC detection data. For example, the set of data attributes about the data may comprise a first entity relationship data attribute indicative of a first entity relationship of the QC detection data, and the data attribute generation circuitry 218 may be configured to generate a second entity relationship data attribute indicative of a second entity relationship of the electronic information related to the encrypted QC detection data, wherein the second entity relationship is indicative of the first entity relationship (e.g., indicating a fraudulent electronic document).

In some embodiments, the set of data attributes about the data may comprise a cryptographic data attribute indicative of a cryptographic technique used to encrypt the data. In some instances, the data attribute generation circuitry 218 may be configured to generate, without user interactivity, the cryptographic data attribute based on an automated analysis of a bitstream of the data. For example, the data may comprise a bitstream, and the data attribute generation circuitry 218 may be configured to generate, based on an automated analysis of the bitstream and without user interactivity, a cryptographic data attribute indicative of a cryptographic technique used to encrypt the data, wherein the set of data attributes comprises the cryptographic data attribute.

In some embodiments, the set of data attributes about the data may comprise a cryptographic spawn log indicative of a set of cryptographic techniques used to encrypt the data. For example, the data attribute generation circuitry 218 may be configured to generate a cryptographic spawn log comprising a set of timestamps and information indicative of sets of PQC encryption attributes used to encrypt the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data attribute generation circuitry 218 may be configured to generate a cryptographic spawn log comprising a set of encryption identification numbers and information indicative of sets of PQC encryption attributes used to encrypt the data over an amount of encryptions (e.g., all encryptions; the last five encryptions, or any other suitable amount of encryptions), wherein each encryption identification number in the set of encryption identification numbers corresponds to a set of PQC encryption attributes used to encrypt the data at the time associated with the encryption identification number. In some embodiments, the data attribute generation circuitry 218 may be configured to generate a cryptographic spawn log comprising a timestamp and information indicative of the set of PQC encryption attributes used to encrypt the data. In some embodiments, the data attribute generation circuitry 218 may be configured to generate an updated cryptographic spawn log comprising a second timestamp and information indicative of a second set of PQC encryption attributes used to encrypt the data.

In some embodiments, the set of data attributes about the data may comprise a data access log indicative of a set of data activity monitoring information (e.g., database activity monitoring information, access credentials, user identification information, machine identification information) associated with electronic access to the data. For example, the data attribute generation circuitry 218 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In some embodiments, the set of data attributes about the data may comprise a determination that the data has been accessed. For example, the data attribute generation circuitry 218 may be configured to receive the determination that the data has been accessed from the data monitoring circuitry 228.

In some embodiments, the set of data attributes about the data may comprise a data zone data attribute indicative of a data zone associated with the data. For example, the data attribute generation circuitry 218 may be configured to generate a data zone data attribute indicative of a data zone associated with the data, wherein the set of data attributes comprises the data zone data attribute. In some embodiments, the set of data attributes about the data may comprise a determination that the data has transitioned from a first data zone to a second data zone. For example, the data attribute generation circuitry 218 may be configured to receive the determination that the data has transitioned from a first data zone to a second data zone from the data monitoring circuitry 228.

The risk profile generation circuitry 220 includes hardware components designed or configured to request, receive, process, generate, and transmit data, data structures, control signals, and electronic information for use in QC detection and PQC. In some embodiments, the risk profile generation circuitry 220 may be configured to receive, retrieve, or obtain policy information associated with the data. In some embodiments, the risk profile generation circuitry 220 may be configured to retrieve the policy information from a data storage device, such as memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof.

In some embodiments, the policy information may comprise a set of technological advancements, such as advancements in materials science related to quantum computing (e.g., room temperature superconductors), advancements in quantum computing capabilities (e.g., the number of qubits in a scalable quantum computing architecture, advancements related to Rose's law), any other suitable data, or any combination thereof. In some embodiments, the risk profile generation circuitry 220 may be configured to decrease the collapse time z described above with reference to Table 2 in accordance with the amount and significance of technological advancements, and thereby decrease the approximate time to quantum computing threat.

In some embodiments, the policy information may comprise data retention policy information, such as data retention requirements (e.g., also referred to as "security shelf-life") for various classes of data records listed in the FDIC's Records Retention Schedule discussed above with reference to Table 1. In some embodiments, the policy information may comprise compliance information indicative of a set of compliance requirements for the data.

In some embodiments, the risk profile generation circuitry 220 may be configured to generate a set of policy attributes about the data based on the data and the policy information. In some embodiments, the risk profile generation circuitry 220 may be configured to receive a data envelope comprising a set of data attributes about the data and generate the set of policy attributes about the data further based on a set of data attributes about the data. In some embodiments, the risk profile generation circuitry 220 may be configured to receive, retrieve, or obtain the set of data attributes from another circuitry, such as processing circuitry 202, data attribute generation circuitry 218, any other suitable circuitry, or any combination thereof. In some embodiments, the risk profile generation circuitry 220 may be configured to extract, directly or indirectly, the set of policy attributes from an enveloped data structure, such as from a data envelope included in the enveloped data structure. In some embodiments, the risk profile generation circuitry 220 may be configured to generate the set of policy attributes about the data based on a machine learning technique, such as a machine learning technique provided or performed by the machine learning circuitry 230.

In some embodiments, the set of policy attributes may comprise a temporal PQC threat policy attribute indicative of an approximate time to a quantum computing threat (e.g., collapse time). In some embodiments, the risk profile generation circuitry 220 may be configured to generate the temporal PQC threat policy attribute based on a set of technological advancements included in the policy information. For example, the risk profile generation circuitry 220 may be configured to decrease the collapse time z described above with reference to Table 2 in accordance with the amount and significance of the technological advancements.

In some embodiments, the risk profile generation circuitry 220 may be configured to generate the temporal PQC threat policy attribute based on a quantum computing threat assessment data structure. The quantum computing threat assessment data structure may comprise, for example, a quantum computing threat assessment risk level and an electronic recommendation based on the quantum computing threat assessment risk level. In some embodiments, the risk profile generation circuitry 220 may be configured to generate the quantum computing threat assessment data structure based on security shelf-life, PQC migration time, collapse time, any other suitable parameter, or any combination thereof. For example, the risk profile generation circuitry 220 may be configured to generate a quantum computing threat assessment data structure in accordance with the quantum computing threat assessment inequalities shown below in Table 3:

TABLE 3

Example quantum computing threat assessment inequalities that may be used by the QC detection system described herein to generate quantum computing threat assessment risk levels and electronic recommendations associated therewith.

| Quantum Computing Threat Assessment Inequality | Quantum Computing Threat Assessment Risk Level | Electronic Recommendation based on Quantum Computing Threat Assessment |
|---|---|---|
| $(x + y) < z$ | Risk Level I: Low Risk | Generate electronic notification indicative of quantum computing threat assessment risk level I and transmit to client device. |
| $(x + y) = z$ | Risk Level II: Medium Risk | Generate electronic notification indicative of quantum computing threat assessment risk level II and transmit to client device. |
| $(x + y) > z$ | Risk Level III: High Risk | Initiate automated analysis and processes to mitigate the quantum computing threat because data protected by quantum vulnerable algorithms at the end of the next y years may be compromised by attacks using quantum computers in less than x years from that time; generate electronic notification indicative of quantum computing threat assessment risk level III and transmit to client device. |

TABLE 3-continued

Example quantum computing threat assessment inequalities that may be used by the QC detection system described herein to generate quantum computing threat assessment risk levels and electronic recommendations associated therewith.

| Quantum Computing Threat Assessment Inequality | Quantum Computing Threat Assessment Risk Level | Electronic Recommendation based on Quantum Computing Threat Assessment |
|---|---|---|
| $x > z$ or $y > z$ | Risk Level IV: Immediate Remediation | Generate control signal configured to instruct information security system to perform immediate remediation, such as disconnecting network connections; generate electronic notification indicative of quantum computing threat assessment risk level IV and transmit to client device. | where x is the security shelf-life (e.g., data retention requirement); where y is the PQC migration time; and where z is the collapse time (e.g., time to quantum computing threat). For example, if the security shelf-life x is five years and the migration time y is seven years, while the collapse time z is nine years, the risk profile generation circuitry 220 may determine that the parameters x, y, and z satisfy the quantum computing threat assessment inequality $(x+y)>z$ and generate a quantum computing threat assessment risk level "Risk Level III: High Risk" indicating that the cryptographic keys (e.g., secret keys) will be compromised for a duration of three years. The risk profile generation circuitry 220 may be further configured to generate an electronic recommendation based on the quantum computing threat assessment risk level "Risk Level III: High Risk," wherein the electronic recommendation comprises an alert, notification, or control signal configured to instruct the QC detection system to initiate automated analysis and planning to mitigate the quantum computing threat now, since data protected by quantum vulnerable tools at the end of the next seven years may be compromised by quantum attacks in less than five years from that time.

In some embodiments, the set of policy attributes may comprise a value of the data. In some embodiments, the set of policy attributes may comprise a longevity of the data. For example, the risk profile generation circuitry 220 may be configured to generate the longevity of the data based on data retention policy information included in the policy information. In some embodiments, the set of policy attributes may comprise a cryptostrength of the data. In some embodiments, the set of policy attributes may comprise a set of vulnerability scan results. For example, the risk profile generation circuitry 220 may receive the set of vulnerability scan results from a remote device via the communications circuitry 208.

In some embodiments, the risk profile generation circuitry 220 may be configured to generate a risk profile data structure indicative of a vulnerability of the data in a PQC data environment. In some embodiments, the risk profile generation circuitry 220 may be configured to generate the risk profile data structure based on the set of policy attributes. In some embodiments, the risk profile data structure may comprise a plurality of risk profile data elements indicative of a vulnerability of the data in a PQC data environment. In some embodiments, the risk profile data structure may comprise a vulnerability score data structure, a vulnerability score explanation data structure, a compliance score data structure, a compliance score explanation data structure, any other suitable data, or any combination thereof. In some embodiments, the risk profile generation circuitry 220 may be configured to update the threat in response to receipt of a quantum computing detection alert control signal (e.g., indicating that: a quantum computer has compromised RSA-512; a quantum computer has compromised RSA-1024; a quantum computer has compromised RSA-2048), a leakage alert control signal, a tampering alert control signal, any other suitable signal or data, or any combination thereof.

In some embodiments, the risk profile generation circuitry 220 may be configured to provide vulnerability identification, vulnerability assessment, vulnerability management, application scanning, any other suitable functionality, and any combination thereof. For example, the risk profile generation circuitry 220 may comprise, or be communicatively coupled to, one or more hardware scanners (e.g., scanner appliances), software scanners (e.g., virtual scanners), cloud-based scanners (e.g., cloud agents, Internet scanners, cloud connectors), passive scanners, out-of-band sensors, container sensors, APIs, any other suitable components, or any combinations thereof. In some embodiments, the risk profile generation circuitry 220 may be configured to locate, identify, assess, prioritize, and mitigate vulnerabilities. These vulnerabilities include, but are not limited to, structured query language (SQL) injection, cross-site scripting (XSS), cross-site request forgery (CSRF), and uniform resource locator (URL) redirection.

In some embodiments, the risk profile generation circuitry 220 may be configured to perform a vulnerability scan of the data; and generate a set of vulnerability scan results, wherein the set of policy attributes comprises the set of vulnerability scan results. For example, the risk profile generation circuitry 220 may be configured to perform a vulnerability scan of the data and generate the set of vulnerability scan results based on the performance of the vulnerability scan. In some embodiments, the risk profile generation circuitry 220 may be configured to: transmit, to a third-party circuitry or service provider, a request to perform a vulnerability scan of the data; receive a set of vulnerability scan results from the third-party circuitry or service provider; and generate the set of vulnerability scan results based on the set of vulnerability scan results.

In some embodiments, the risk profile generation circuitry 220 may be configured to generate a vulnerability score data structure based on the set of policy attributes, wherein the risk profile data structure comprises the vulnerability score data structure. In some embodiments, the vulnerability score data structure may comprise a vulnerability score value indicative of a percentage of vulnerability of the data in the PQC data environment. In some embodiments, the risk profile generation circuitry 220 may be configured to generate a normalized vulnerability score value based on a normalization of the vulnerability score value to a common scale (e.g., 0.0 to 1.0; 0.00 to 100.00; 0.0% to 100.0%).

In some embodiments, the vulnerability score data structure may comprise a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof. In some embodiments, the risk profile generation circuitry 220 may be configured to generate a normalized vulnerability score range based on a normalization of the vulnerability score range to a common scale.

In some embodiments, the risk profile generation circuitry 220 may be configured to generate a vulnerability score explanation data structure indicative of an explanation of the vulnerability score data structure, wherein the risk profile data structure comprises the vulnerability score explanation data structure. In some embodiments, the vulnerability score explanation data structure may be a local interpretable model-agnostic explanations (LIME) data structure indicative of one or more identified vulnerabilities, where those vulnerabilities were located (e.g., at the time of identification), how and why those vulnerabilities were identified, how and why those vulnerabilities were assessed, how and why those vulnerabilities where prioritized, and how and why those vulnerabilities were mitigated.

In some embodiments, the risk profile generation circuitry 220 may be configured to generate a compliance score data structure. For example, the risk profile generation circuitry 220 may be configured to receive policy information comprising compliance information indicative of a set of compliance requirements for the data. In some embodiments, the risk profile generation circuitry 220 may be configured to generate a compliance score data structure based on the vulnerability score data structure and the compliance information, wherein the risk profile data structure comprises the compliance score data structure.

In some embodiments, the compliance score data structure comprises a compliance score value indicative of a percentage of compliance of the data to the set of compliance requirements. In some embodiments, the risk profile generation circuitry 220 may be configured to generate a normalized compliance score value based on a normalization of the compliance score value to a common scale (e.g., 0.0 to 1.0; 0.00 to 100.00; 0.0% to 100.0%). In some embodiments, the normalized compliance score value may be different from the normalized vulnerability score value.

In some embodiments, the compliance score data structure may comprise a compliance score range comprising a minimum compliance score value, a maximum compliance score value, a median compliance score value, a mean compliance score value, a first quartile compliance score value, a third quartile compliance score value, an interquartile compliance score range between the first quartile compliance score value and the third quartile compliance score value, any other suitable value, metric, or range, or any combination thereof. In some embodiments, the risk profile generation circuitry 220 may be configured to generate a normalized compliance score range based on a normalization of the compliance score range to a common scale. In some embodiments, the normalized compliance score range may be different from the normalized vulnerability score range.

In some embodiments, the compliance score generation circuitry 234 may be configured to generate a compliance score explanation data structure indicative of an explanation of the compliance score data structure, wherein the risk profile data structure comprises the compliance score explanation data structure. In some embodiments, the compliance score explanation data structure may be a LIME data structure indicative of one or more identified compliance attributes, where those compliance attributes were located (e.g., at the time of identification), how and why those compliance attributes were identified, how and why those compliance attributes were assessed, how and why those compliance attributes where prioritized, and how and why those compliance attributes were mitigated.

The data envelope generation circuitry 222 includes hardware components designed or configured to request, receive, process, generate, and transmit data, data structures, control signals, and electronic information for use in QC detection and PQC. In some embodiments, the data envelope generation circuitry 222 may be configured to generate a data envelope based on the set of data attributes. In some embodiments, the data envelope generation circuitry 222 may be configured to generate the data envelope based on the set of data attributes. In some embodiments, the data envelope may comprise the set of data attributes. In some embodiments, the data envelope generation circuitry 222 may be configured to generate the data envelope based on the set of data attributes, a risk profile data structure, any other suitable data, or any combination thereof. In some embodiments, the data envelope may comprise the set of data attributes, a risk profile data structure, any other suitable data, or any combination thereof. In some embodiments, each piece of QC detection data or other data may have a data envelope, wherein the data envelope comprises one or more attributes about the data. In some embodiments, the data and its envelope may be referred to as a "data BLOB." In some instances, the data envelope will keep track of who accessed the data, such as who took an encrypted snapshot of the data and when that encrypted snapshot was taken.

The data structure generation circuitry 224 includes hardware components designed or configured to request, receive, process, generate, and transmit data, data structures, control signals, and electronic information for use in QC detection and PQC. In some embodiments, the data structure generation circuitry 224 may be configured to generate an enveloped data structure based on the data envelope and the QC detection data or other data. In some embodiments, the enveloped data structure comprises the data envelope and the data. In some embodiments, the enveloped data structure comprises the data envelope (e.g., set of data attributes, risk profile data structure, any other suitable data, or any combination thereof) and the data (e.g., QC detection data, data access control information, link or pointer to the data, bitstream, BLOB, any other suitable data, or any combination thereof). For example, the enveloped data structure may comprise the data enveloped by the data envelope.

In some embodiments, a first enveloped data structure may comprise data and a first data envelope comprising a set of data attributes. The data envelope generation circuitry 222 may be configured to generate a second data envelope comprising the set of data attributes and the risk profile data structure generated by the risk profile generation circuitry 220. The data structure generation circuitry 224 may be configured to generate a second enveloped data structure comprising the second data envelope and the data.

The data storage circuitry 226 includes hardware components designed or configured to request, receive, process, generate, store, and transmit data, data structures, control signals, and electronic information for use in QC detection and PQC. In some embodiments, the data storage circuitry 226 may be configured to store QC detection data (e.g., encrypted QC detection data, re-encrypted QC detection data, double encrypted QC detection data, unencrypted QC detection data), other data (e.g., unencrypted data, encrypted data, decrypted data, re-encrypted data, double encrypted data, data access control information, bitstreams of data, links or pointers thereto), data attributes, data envelopes, enveloped data structures, policy information, policy attributes, risk profile data structures, QC detection techniques, non-PQC cryptographic techniques, non-PQC cryptographic performance information, non-PQC encryption attributes, PQC cryptographic performance information, PQC cryptographic techniques, PQC encryption attributes, symmetric cryptographic keys, asymmetric cryptographic keys, any other suitable data or electronic information, or combinations thereof in a data storage device, a database management system, any other suitable storage device or system, or any combination thereof.

For example, the data storage circuitry 226 may be configured to store an enveloped data structure in a QC detection storage device (e.g., a data storage device storing QC detection data, QC detection techniques, and other data related thereto), a data storage device, a database management system, or a combination thereof. In some embodiments, the data storage circuitry 226 may be configured to store the data, data structures, control signals, and electronic information in the QC detection storage device, the data storage device, the database management system, or both in real-time and without user interactivity.

In some embodiments, the QC detection storage device, the data storage device, or both may comprise, or be implemented as, memory 204, one or more of the one or more QC detection databases 106, the one or more database server devices 114 (including, but not limited to, one or more data storage devices communicatively coupled, either directly or indirectly, to the one or more database server devices 114), the one or more remote server devices 116, the one or more server devices 110A-110N, the one or more client devices 112A-112N, any other suitable device or circuitry, or a combination thereof. In some embodiments, the database management system may comprise, or be implemented as, a database management system (DBMS), such as a relational DMBS (RDBMS) data warehouse, a first non-relational DBMS (e.g., Hadoop distributed file system (HDFS), Hbase), a second non-relational DBMS (e.g., content management systems), a data visualization device, a data mart (e.g., online analytical processing (OLAP) cube), a real-time analytical RDBMS, any other suitable device or circuitry, or a combination thereof. In some embodiments, the QC detection storage device, the data storage device, the database management system, or both may comprise, or be implemented as, one or more decentralized storage devices, such as a cloud storage device or system.

In some embodiments, the data storage circuitry 226 may be configured to store the QC detection data in a QC detection storage device. In some embodiments, the data storage circuitry 226 may be configured to keep the QC detection data completely and totally secret with no possibility of its release through other means other than a QC attack such that if the data monitoring circuitry 220 detects the QC detection data on the Internet, the data monitoring circuitry 220 may have full confidence that the QC detection data was not simply obtained through an insider attack by someone that had access to the unencrypted QC detection data. Otherwise, the data monitoring circuitry 220 may generate false alarms. Further, in some embodiments, the operations by which the data monitoring circuitry 220 monitors and searches for the QC detection data must be protected so that the search itself does not reveal the QC detection data. In these embodiments, the data monitoring circuitry may use a pattern search technique rather than simple search strings that could be exposed to third parties.

In some embodiments, the data storage circuitry 226 may be configured to store the encrypted QC detection data in a QC detection storage device. In some embodiments, the data attribute generation circuitry 218 may be configured to generate a set of data attributes about the encrypted QC detection data, and the data storage circuitry 226 may be configured to store the set of data attributes in the QC detection storage device in association with the stored encrypted QC detection data. In some embodiments, the data envelope generation circuitry 222 may be configured to generate a data envelope comprising the set of data attributes; the data structure generation circuitry 224 may be configured to generate an enveloped data structure comprising the data envelope and the encrypted QC detection data; and the data storage circuitry 226 may be configured to store the enveloped data structure in the QC detection storage device. In some embodiments, the set of data attributes may comprise a cryptographic data attribute indicative of a cryptographic technique used to encrypt the encrypted QC detection data. In some embodiments, the set of data attributes may comprise a key length for the cryptographic technique used to encrypt the encrypted QC detection data. In some embodiments, wherein the set of data attributes comprises a first data lineage data attribute indicative of a first data lineage of the QC detection data, the data attribute generation circuitry 218 may be configured to: generate a second data lineage data attribute indicative of a second data lineage of the electronic information related to the encrypted QC detection data; and generate a differential data lineage explanation data structure indicative of an explanation of a set of differences between the first data lineage data attribute and the second data lineage data attribute (e.g., to determine where data is being transferred and decrypted for use both in QC detection and in better planting the next QC detection data).

The data monitoring circuitry 228 includes hardware components designed or configured to request, receive, process, generate, and transmit data, data structures, control signals, and electronic information for use in QC detection and PQC. In some embodiments, the data monitoring circuitry 228 may be configured to monitor QC detection data, other data, enveloped data structures, any other suitable data or electronic information, or any combination thereof.

In some embodiments, the data monitoring circuitry 228 may be configured to monitor a set of data environments for electronic information related to the encrypted QC detection data and, in some instances, detect electronic information related to the encrypted QC detection data. For example, the data monitoring circuitry 228 may be configured to monitor a set of internal data environments (e.g., internal information systems, internal data networks, internal data storage devices) and, in some instances, flag uses of the QC detection data, the private cryptographic key used to encrypt the QC detection data, or any other suitable data that made its way into the internal data environment. In another example, the data monitoring circuitry 228 may be configured to monitor a set of external data environments (e.g., content delivery networks (CDNs), cloud service platforms, social media platforms, dark websites) and, in some instances, flag uses of the unencrypted QC detection data or any other suitable data that made its way into the external data environment.

In some embodiments, the data monitoring circuitry 228 may be further configured to generate a QC detection alert control signal in response to detection of the electronic information related to the encrypted QC detection data. For example, the data monitoring circuitry 228 may be further configured to generate a QC detection alert control signal when the detected electronic information related to the encrypted QC detection data comprises decrypted QC detection data that is the same as the QC detection data. In another example, the detected electronic information related to the encrypted QC detection data may comprise a detected digital signature. The data monitoring circuitry 228 may be configured to verify the detected digital signature based on the public cryptographic key and generate the QC detection alert control signal in response to verification of the detected digital signature.

In some embodiments, the QC detection alert control signal may indicate, for example, that the cryptographic technique used to encrypt the QC detection data has been compromised by quantum computing. In some embodiments, the QC detection alert control signal may be configured to instruct, or cause, the cryptographic circuitry 216 to encrypt or re-encrypt data (e.g., enveloped data structures stored in one or more internal or third-party data storage devices) using a PQC cryptographic technique having a cryptostrength that cannot be compromised by that particular quantum computer. In some embodiments, the QC detection alert control signal may be configured to instruct, or cause, the UI circuitry 232 to generate QC detection alert GUI data (e.g., an electronic notification, e-mail, pop-up display, audible alarm) and transmit the generated QC detection alert GUI data to the input-output circuitry 206, and the input-output circuitry 206 may be configured to receive the QC detection alert GUI data and display the received QC detection alert GUI data on one or more display screens.

In some embodiments, wherein the cryptographic circuitry 216 is configured to not transmit the encrypted QC detection data, the data monitoring circuitry 228 may be configured to generate a leakage alert control signal in response to detection of the electronic information related to the encrypted QC detection data. In some embodiments, the leakage alert control signal may indicate, for example, that the QC detection data was leaked from an internal data environment, when the QC detection data was leaked from the internal data environment, who leaked the QC detection data from the internal data environment (e.g., based on the data lineage of the QC detection data), how the QC detection data was leaked from the internal data environment, any other suitable information, or any combination thereof. In some embodiments, the leakage alert control signal may be configured to instruct, or cause, the communications circuitry 208 to disallow any data to be transmitted out of the internal data environment associated with the leaked QC detection data. In some embodiments, the leakage alert control signal may be configured to instruct, or cause, the UI circuitry 232 to generate leakage alert GUI data (e.g., an electronic notification, e-mail, pop-up display, audible alarm) and transmit the generated leakage alert GUI data to the input-output circuitry 206, and the input-output circuitry 206 may be configured to receive the leakage alert GUI data and display the received leakage alert GUI data on one or more display screens.

In some embodiments, when the detected electronic information related to the encrypted QC detection data comprises a detected digital signature, the data monitoring circuitry 228 may be further configured to verify the detected digital signature based on the public cryptographic key. In some embodiments, the data monitoring circuitry 228 may be further configured to generate a tampering alert control signal when the detected electronic information related to the encrypted QC detection data further comprises detected payload data that has been digitally signed based on the detected digital signature, the detected digital signature is the same as the QC detection digital signature, and the detected payload data is different from the QC detection data.

In some embodiments, the tampering alert control signal may indicate, for example, that the QC detection data has been altered but signed using the same digital signature. For example, the encrypted QC detection data may comprise QC detection data that has been digitally signed based on a digital signature (e.g., RSA, such as RSA Probabilistic Signature Scheme (RSA-PSS); DSA and its elliptic curve variant ECDSA), and the electronic information related to the encrypted QC detection data may comprise payload data that has been digitally signed based on the digital signature. In some instances, the payload data may be different from the QC detection data, such as a different fraudulent document digitally signed by the same digital signature. In some instances, a subset of the payload data may be the same as a subset of the QC detection data, such as an altered document digitally signed by the same digital signature. For example, the QC detection data may comprise a fictitious stock transfer agreement comprising a first stock transfer attribute indicative of a first amount of transferred shares (e.g., 10 transferred shares), the detected payload data may comprise a detected stock transfer agreement comprising a second stock transfer attribute indicative of a second amount of transferred shares (e.g., 10,000 transferred shares) different from the first amount of transferred shares, and the tampering alert control signal may comprise an indication that the fictitious stock transfer agreement has been tampered with. In other examples, the detected payload data may comprise different buyer or seller information on a digitally signed fictitious electronic mortgage; different owner information on a digitally signed fictitious financial account; different payee or payment amount on a digitally signed fictitious financial transaction (e.g., a fictitious wire transfer, mobile deposit, or electronic check); or any other suitable information.

In some embodiments, the tampering alert control signal may be configured to instruct, or cause, the UI circuitry 232 to generate tampering alert GUI data (e.g., an electronic notification, e-mail, pop-up display, audible alarm) and transmit the generated tampering alert GUI data to the input-output circuitry 206, and the input-output circuitry 206 may be configured to receive the tampering alert GUI data and display the received tampering alert GUI data on one or more display screens.

In some embodiments, the data monitoring circuitry 228 may be configured to monitor an enveloped data structure and identify changes in the enveloped data structure. In some embodiments, the enveloped data structure may comprise a data envelope and data. In some embodiments, the data envelope may comprise a set of data attributes about the data and a risk profile data structure indicative of a vulnerability of the data in a PQC data environment. In some embodiments, the data has been encrypted based on a set of non-PQC encryption attributes or a set of PQC encryption attributes. For example, the data monitoring circuitry 228 may be configured to generate an electronic indication of the change in the enveloped data structure, such as a control signal, metadata, or flag indicative of the change. In some embodiments, the data monitoring circuitry 228 may be configured to automatically monitor the enveloped data structure in real-time and without user interactivity; automatically identify the change in the enveloped data structure in real-time and without user interactivity; and generate the electronic indication of the change in the enveloped data structure in real-time and without user interactivity.

In some embodiments, the change in the enveloped data structure may be a change in the risk profile data structure, such as a change in a value of the data, a change in a longevity of the data, a change in a cryptostrength of the data, a change in a result of a vulnerability scan of the data, a change in a vulnerability score value (e.g., any value associated with a vulnerability score data structure comprising a vulnerability score range comprising a minimum vulnerability score value, a maximum vulnerability score value, a median vulnerability score value, a mean vulnerability score value, a first quartile vulnerability score value, a third quartile vulnerability score value, an interquartile vulnerability score range between the first quartile vulnerability score value and the third quartile vulnerability score value, any other suitable value, metric, or range, or any combination thereof) indicative of a percentage of vulnerability of the data in the PQC data environment, a change in a compliance score value indicative of a percentage of compliance of the data to a set of compliance requirements, a change in an approximate time to a quantum computing threat (e.g., changes in collapse time, changes in vulnerabilities to existing algorithms, receipt of a QC detection alert control signal), a change in exogenous data associated with the data, wherein the exogenous data comprises a public sentiment data structure (e.g., a widespread data breach at a third-party system, such as a merchant; a stock market crash; a geopolitical event), a change in any other suitable data, data structure, or data element, or any combination thereof. In some embodiments, the change in the enveloped data structure may be a determination that the data has been accessed and by whom (e.g., user, entity, location). In some embodiments, the change in the enveloped data structure may be a determination that the data has transitioned to a different data zone (e.g., from a first data zone to a second data zone).

In some embodiments, the data monitoring circuitry 228 may be configured to monitor the access of data, enveloped data structures, any other suitable data or electronic information, or any combination thereof. For example, the data monitoring circuitry 228 may be configured to determine that the data has been accessed, generate a determination that the data has been accessed, and transmit the determination that the data has been accessed to any suitable circuitry, such as the data attribute generation circuitry 218.

In some embodiments, the data monitoring circuitry 228 may be configured to generate a data access log indicative of a set of data activity monitoring information (e.g., database activity monitoring information, access credentials, user identification information, machine identification information) associated with electronic access to the data. For example, the data monitoring circuitry 228 may be configured to generate a data access log comprising a set of timestamps and information indicative of sets of data activity monitoring information the data over a period of time (e.g., lifetime of the data; the last three years, or any other suitable period or duration of time), wherein each timestamp in the set of timestamps corresponds to a set of PQC encryption attributes used to encrypt the data at the time associated with the timestamp. In another example, the data monitoring circuitry 228 may be configured to generate the set of data activity monitoring information and transmit the set of data activity monitoring information to the data attribute generation circuitry 218, which may be configured to receive the set of data activity monitoring information and generate a data access log based on the set of data activity monitoring information.

In some embodiments, the communications circuitry 208 may be configured to receive the data at a first time, the set of data attributes may be a first set of data attributes, the data envelope may be a first data envelope, the enveloped data structure may be a first enveloped data structure, and the data monitoring circuitry 228 may be configured to determine that the data has been accessed at a second time later than the first time. In some embodiments, the data monitoring circuitry 228 may be configured to generate an electronic indication, control signal, metadata, or flag indicating that the data has been accessed at the second time. In response to the determination (e.g., the electronic indication, control signal, metadata, or flag generated by the data monitoring circuitry 228) that the data has been accessed at the second time, the data attribute generation circuitry 218 may be configured to generate a second set of data attributes about the data based on the data and the determination that the data has been accessed at the second time, the data envelope generation circuitry 222 may be configured to generate a second data envelope based on the second set of data attributes, and the data structure generation circuitry 224 may be configured to generate a second enveloped data structure based on the second data envelope and the data. For example, the first set of data attributes may comprise a first data lineage data attribute indicative of a first data lineage of the data, the second set of data attributes may comprise a second data lineage data attribute indicative of a second data lineage of the data, and the first data lineage data attribute may be different from the second data lineage data attribute.

In some embodiments, the data monitoring circuitry 228 may be configured to monitor the data zone associated with data, enveloped data structures, any other suitable data or electronic information, or any combination thereof. For example, the data monitoring circuitry 228 may be configured to determine that the data has transitioned from a first data zone to a second data zone, generate a determination that the data has transitioned from the first data zone to the second data zone, and transmit the determination that the data has transitioned from the first data zone to the second data zone to any suitable circuitry, such as the data attribute generation circuitry 218.

In some embodiments, the communications circuitry 208 may be configured to receive the data at a first time, the set of data attributes may be a first set of data attributes comprising a first data zone data attribute indicative of a first data zone associated with the data, the data envelope may be a first data envelope, the enveloped data structure may be a first enveloped data structure, and the data monitoring circuitry 228 may be configured to determine that the data has transitioned from the first data zone to a second data zone at a second time later than the first time. In some embodiments, the data monitoring circuitry 228 may be configured to generate an electronic indication, control signal, metadata, or flag indicating that the data has transitioned from the first data zone to the second data zone at the second time. In response to the determination (e.g., the electronic indication, control signal, metadata, or flag generated by the data monitoring circuitry 228) that the data has transitioned from the first data zone to the second data zone at the second time, the data attribute generation circuitry 218 may be configured to generate a second set of data attributes about the data based on the data and the determination that the data has transitioned from the first data zone to the second data zone at the second time. The second set of data attributes may comprise a second data zone data attribute indicative of the second data zone associated with the data, and the second data zone data attribute may be different from the first data zone data attribute. The data envelope generation circuitry 222 may be configured to generate a second data envelope based on the second set of data attributes. The data structure generation circuitry 224 may be configured to generate a second enveloped data structure based on the second data envelope and the data.

The machine learning circuitry 230 includes hardware components designed or configured to request, receive, process, generate, and transmit data, data structures, control signals, and electronic information for use in QC detection and PQC. In some embodiments, the machine learning circuitry 230 may be configured to provide machine learning techniques, any other suitable functionality, or any combination thereof. For example, the machine learning circuitry 230 may be configured to provide a machine learning technique, machine learning functionality, or both to the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, UI circuitry 232, any other circuitry, or any combination thereof. In some embodiments, the machine learning circuitry 230 may be configured to determine the machine learning technique from among a set of machine learning techniques. In some embodiments, the machine learning circuitry 230 may be configured to determine (e.g., predict) which cryptographic technique (e.g., non-PQC cryptographic technique, PQC cryptographic technique, or hybrid PQC cryptographic technique) to use for data encryption based on test data, production data, and any of the parameters described herein.

In some embodiments, the machine learning circuitry 230 may be configured to provide a machine learning technique, machine learning functionality, or both to the QC detection data generation circuitry 214 for use in generation of the QC detection data. In some embodiments, the machine learning circuitry 230 may be configured to provide a machine learning technique, machine learning functionality, or both to the data monitoring circuitry 228 for use in detection of the electronic information related to the encrypted QC detection data. In some embodiments, the machine learning circuitry 230 may be configured to provide a machine learning technique, machine learning functionality, or both to the data attribute generation circuitry 218 for use in generation of the QC detection alert control signal. In some embodiments, the machine learning circuitry 230 may be configured to provide a machine learning technique, machine learning functionality, or both to the data attribute generation circuitry 218 for use in generation of the set of data attributes about the data. In some embodiments, the machine learning circuitry 230 may be configured to provide a machine learning technique, machine learning functionality, or both to the risk profile generation circuitry 220 for use in generation of the set of policy attributes about the data. In some embodiments, the machine learning circuitry 230 may be configured to provide a machine learning technique, machine learning functionality, or both to the cryptographic circuitry 216 for use in generation of the PQC cryptographic performance information, the set of PQC encryption attributes, or both.

The UI circuitry 232 includes hardware components designed or configured to generate graphical user interface (GUI) data configured to be displayed by a display device. For instance, the UI circuitry 232 may include hardware components designed or configured to generate GUI data based on any embodiment or combination of embodiments described with reference to FIGS. 1-7. In some embodiments, the UI circuitry 232 may be configured to generate GUI data and transmit the generated GUI data to the input-output circuitry 206, and the input-output circuitry 206 may be configured to receive the GUI data and display the received GUI data on one or more display screens. In some embodiments, the UI circuitry 232 may include hardware components designed or configured to generate the GUI data based on one or more portions of the data; data attributes; data envelopes; enveloped data structures; policy information; policy attributes; risk profile data structures; QC detection data; QC detection techniques (including, but not limited to, detection of quantum computing capabilities; data leakage detection techniques; and data tampering detection techniques); QC detection alert control signals; non-PQC cryptographic techniques; non-PQC cryptographic performance information; non-PQC encryption attributes; PQC cryptographic performance information; PQC cryptographic techniques; PQC encryption attributes; symmetric cryptographic keys; asymmetric cryptographic keys; quantum particles; quantum cryptographic keys; quantum one-time pads; any other suitable data, data structures, electronic information, or quantum information; any links or pointers thereto; and any combinations thereof. The GUI data may comprise, for example, data attribute GUI data generated based on the set of data attributes; risk profile GUI data generated based on the risk profile data structure; PQC optimization GUI data generated based on the PQC cryptographic performance information (including, but not limited to, the set of PQC cryptographic performance attributes), the set of PQC encryption attributes, or both; data monitoring GUI data generated based on the monitoring of enveloped data structures, electronic indications of changes in the monitored enveloped data structures; QC detection GUI data generated based on the QC detection alert control signal; any other suitable data; or any combination thereof.

In some embodiments, the UI circuitry 232 may be configured to generate a data attribute GUI based on the set of data attributes. In some embodiments, the UI circuitry 232 may be configured to generate a risk profile GUI data based on the risk profile data structure. In some embodiments, the UI circuitry 232 may be configured to generate a PQC optimization GUI based on the PQC cryptographic performance information (including, but not limited to, the set of PQC cryptographic performance attributes), the set of PQC encryption attributes, or both. In some embodiments, the UI circuitry 232 may be configured to generate a data monitoring GUI based on the monitoring of enveloped data structures, electronic indications of changes in the monitored enveloped data structures, any other suitable data, or any combination thereof. In some embodiments, the UI circuitry 232 may be configured to generate a QC detection GUI based on the QC detection data, the QC detection alert control signal, any other suitable data, or any combination thereof. In some embodiments, the communications circuitry 208 may be configured to transmit the data attribute GUI, risk profile GUI, PQC optimization GUI, data monitoring GUI, QC detection GUI, or a combination thereof to a client device for display by the client device.

It should also be appreciated that, in some embodiments, each of the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, and UI circuitry 232 may include a separate processor, specially configured field programmable gate array (FPGA), ASIC, or cloud utility to perform the above functions.

In some embodiments, the hardware components described above with reference to the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, and UI circuitry 232, may, for instance, utilize PQC callback circuitry 207, communications circuitry 208, or any suitable wired or wireless communications path to communicate with a server device (e.g., one or more of server devices 110A-110N), a client device (e.g., one or more of client devices 112A-112N), a database server device (e.g., one or more of database server devices 114), a remote server device (e.g., one or more of remote server devices 116), processing circuitry 202, memory 204, input-output circuitry 206, the PQC callback circuitry of another apparatus (e.g., the PQC callback circuitry 207 of a separate apparatus implementing one or more potions of apparatus 200), the PQC shim circuitry of another apparatus, the communications circuitry of another apparatus (e.g., the communications circuitry 208 of a separate apparatus implementing one or more portions of apparatus 200), each other, or any other suitable circuitry or device.

In some embodiments, one or more of the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, and UI circuitry 232 may be hosted locally by the apparatus 200.

In some embodiments, one or more of the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, and UI circuitry 232 may be hosted remotely (e.g., by one or more cloud servers) and thus need not physically reside on the apparatus 200. Thus, some or all of the functionality described herein may be provided by a third-party circuitry. For example, the apparatus 200 may access one or more third-party circuitries via a networked connection configured to transmit and receive data and electronic information between the apparatus 200 and the third-party circuitries. In turn, the apparatus 200 may be in remote communication with one or more of the QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, and UI circuitry 232.

Although some of these components of apparatus 200 are described with respect to their functional capabilities, it should be understood that the particular implementations necessarily include the use of particular hardware to implement such functional capabilities. It should also be understood that certain of these components may include similar or common hardware. For example, two sets of circuitries may both leverage use of the same processor, network interface, quantum communications interface, optoelectronic components, storage medium, machine learning circuitry, or the like to perform their associated functions, such that duplicate hardware is not required for each set of circuitries. It should also be appreciated that, in some embodiments, one or more of these components may include a separate processor, specially configured FPGA, ASIC, or cloud utility to perform its corresponding functions as described herein.

The use of the term "circuitry" as used herein with respect to components of apparatus 200 includes particular hardware configured to perform the functions associated with respective circuitry described herein. While the term "circuitry" should be understood broadly to include hardware, in some embodiments, circuitry may also include software for configuring the hardware. For example, in some embodiments, "circuitry" may include processing circuitry, storage media, network interfaces, quantum interfaces, input-output devices, optoelectronic components, and other components. In some embodiments, other elements of apparatus 200 may provide or supplement the functionality of particular circuitry. For example, the processing circuitry 202 may provide processing functionality, memory 204 may provide storage functionality, classical communications circuitry 210 may provide network interface functionality, and quantum communications circuitry 212 may provide quantum interface functionality among other features.

In some embodiments, various components of the apparatus 200 may be hosted remotely (e.g., by one or more cloud servers) and thus need not physically reside on the apparatus 200. Thus, some or all of the functionality described herein may be provided by third-party circuitry. For example, a given apparatus 200 may access one or more third-party circuitries via any sort of networked connection that facilitates transmission of data and electronic information between the apparatus 200 and the third-party circuitries. In turn, that apparatus 200 may be in remote communication with one or more of the other components described above as being comprised by the apparatus 200.

As will be appreciated, computer program instructions and/or other type of code may be loaded onto a computer, processor or other programmable apparatus's circuitry to produce a machine, such that the computer, processor, or other programmable circuitry that executes the code on the machine creates the means for implementing various functions described herein.

As described above and as will be appreciated based on this disclosure, embodiments of the present disclosure may be configured as systems, apparatuses, methods, optoelectronic devices, mobile devices, backend network devices, computer program products, other suitable devices, and combinations thereof. Accordingly, embodiments may comprise various means including entirely of hardware or any combination of software with hardware. Furthermore, embodiments may take the form of a computer program product on at least one non-transitory computer-readable storage medium having computer-readable program instructions (e.g., computer software) embodied in the storage medium. Any suitable computer-readable storage medium may be utilized including non-transitory hard disks, CD-ROMs, flash memory, optical storage devices, or magnetic storage devices. As will be appreciated, any computer-executable program code instructions, any other type of code described herein, and any combination thereof may be loaded onto a computer, processor or other programmable apparatus's circuitry to produce a machine, such that the computer, processor, or other programmable circuitry that executes the code on the machine creates the means for implementing various functions, including the functions described herein.

The one or more server devices 110A-110N, one or more client devices 112A-112N, one or more database server devices 114, and one or more remote server devices 116 described with reference to FIG. 1 may be embodied by one or more computing devices, servers, data storage devices, or systems that also may include processing circuitry, memory, input-output circuitry, and communications circuitry. For example, a server device 110 may be a database server on which computer code (e.g., C, C++, C#, java, an SQL, a data query language (DQL), a data definition language (DDL), a data control language (DCL), a data manipulation language (DML)) is running or otherwise being executed by processing circuitry. In another example, a client device 112 may be a smartphone on which an app (e.g., a mobile database app) is running or otherwise being executed by processing circuitry. As it relates to operations described in the present disclosure, the functioning of these devices may utilize components similar to the similarly named components described above with reference to FIG. 2. Additional description of the mechanics of these components is omitted for the sake of brevity. These device elements, operating together, provide the respective computing systems with the functionality necessary to facilitate the communication of data with the QC detection system described herein.

Use Cases

Having described example embodiments in general terms, the following example embodiments are provided to further illustrate a use case of some example embodiments. In some instances, the following example embodiments provide examples of how the QC detection system disclosed herein may provide QC detection.

Use Case 1: QC Detection Based on a Digital Signature

Figure 3:
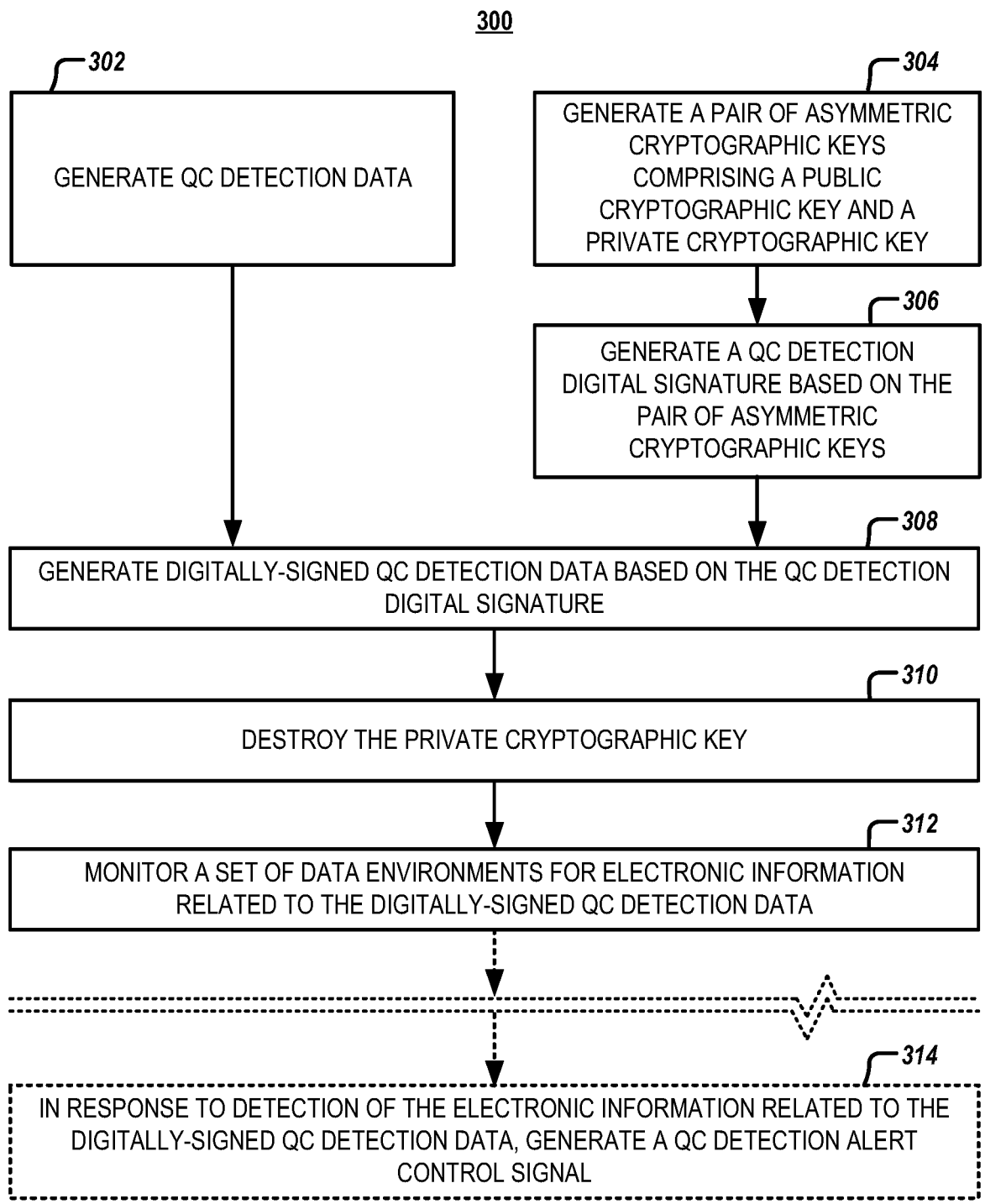
FIG. 3 illustrates an example flowchart for providing a first QC detection technique in accordance with some example embodiments described herein.

FIG. 3 illustrates an example flowchart 300 that contains example operations for providing a first QC detection technique based on a digital signature (e.g., an RSA digital signature) in accordance with some example embodiments described herein. For example, the example flowchart 300 may contain, among other operations, example operations for using a pair of RSA cryptographic keys to generate an RSA digital signature, destroying the RSA private key, and retaining the RSA public key. The operations illustrated in FIG. 3 may, for example, be performed by one or more components described with reference to QC detection system 102 shown in FIG. 1; by a server device 110, a client device 112, a database server device 114, or a remote server device 116 in communication with QC detection system 102; by apparatus 200 shown in FIG. 2; or by any combination thereof. In some embodiments, the various operations described in connection with FIG. 3 may be performed by the apparatus 200 by or through the use of one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, UI circuitry 232, any other suitable circuitry, and any combination thereof.

As shown by operation 302, the apparatus 200 includes means, such as the QC detection data generation circuitry 214 or the like, for generating QC detection data. In some embodiments, the apparatus 200 may generate the QC detection data as described in more detail with reference to FIGS. 1, 2, and 7.

As shown by operation 304, the apparatus 200 includes means, such as the cryptographic circuitry 216 or the like, for generating a pair of asymmetric cryptographic keys comprising a public cryptographic key and a private cryptographic key. In some embodiments, the pair of asymmetric cryptographic keys may be a pair of RSA, RSA-PSS, DSA, or ECDSA cryptographic keys. In some embodiments, the apparatus 200 may generate the pair of asymmetric cryptographic keys as described in more detail with reference to FIGS. 1, 2, and 7.

As shown by operation 306, the apparatus 200 includes means, such as the cryptographic circuitry 216 or the like, for generating a QC detection digital signature based on the pair of asymmetric cryptographic keys. In some embodiments, the QC detection digital signature may be a fictitious digital signature, such as a fictitious RSA, RSA-PSS, DSA, or ECDSA digital signature, and the pair of asymmetric cryptographic keys may be a pair of RSA asymmetric cryptographic keys. For example, the QC detection digital signature may be an RSA digital signature, and the pair of asymmetric cryptographic keys may be a pair of RSA cryptographic keys. In some embodiments, the apparatus 200 may generate the QC detection digital signature as described in more detail with reference to FIGS. 1, 2, and 7.

As shown by operation 308, the apparatus 200 includes means, such as the cryptographic circuitry 216 or the like, for generating digitally-signed QC detection data based on the QC detection digital signature. In some embodiments, the apparatus 200 may generate the digitally-signed QC detection data by signing the QC detection data with the QC detection digital signature. In some embodiments, the apparatus 200 may generate the digitally-signed QC detection data as described in more detail with reference to FIGS. 1, 2, and 7.

As shown by operation 310, the apparatus 200 includes means, such as the cryptographic circuitry 216 or the like, for destroying the private cryptographic key. In some embodiments, the apparatus 200 may be configured to destroy the private cryptographic key by overwriting, or zeroizing, all instances of the private cryptographic key. In some embodiments, the apparatus 200 may be configured to generate an electronic confirmation signal indicating that the private cryptographic key has been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy the private cryptographic key as described in more detail with reference to FIGS. 1, 2, and 7.

As shown by operation 312, the apparatus 200 includes means, such as the data monitoring circuitry 228 or the like, for monitoring a set of data environments for electronic information related to the digitally-signed QC detection data. In some embodiments, the apparatus 200 may monitor the set of data environments for the electronic information related to the digitally-signed QC detection data as described in more detail with reference to FIGS. 1, 2, and 7.

Optionally, as shown by optional operation 314, the apparatus 200 includes means, such as the data monitoring circuitry 228 or the like, for generating a QC detection alert control signal in response to detection of the electronic information related to the digitally-signed QC detection data. In some embodiments, the data monitoring circuitry 228 may be configured to detect electronic information related to the digitally-signed QC detection data, wherein the detected electronic information related to the digitally-signed QC detection data comprises a detected digital signature. In some embodiments, the data monitoring circuitry 228 may be configured to verify the detected digital signature based on the public cryptographic key. In some embodiments, the data monitoring circuitry 228 may be configured to generate the QC detection alert control signal in response to verification of the detected digital signature. In some embodiments, the data monitoring circuitry 228 may be further configured to generate a tampering alert control signal when the detected electronic information related to the digitally-signed QC detection data further comprises detected payload data that has been digitally signed based on the detected digital signature, the detected digital signature is the same as the QC detection digital signature, and the detected payload data is different from the QC detection data. In some embodiments, the tampering alert control signal may indicate, for example, that the QC detection data has been altered but signed using the same digital signature (e.g., in an instance in which the detected digital signature is correct, but the detected data is different from the QC detection data). For example, when the QC detection data comprises a fictitious stock transfer agreement comprising a first stock transfer attribute indicative of a first amount of transferred shares (e.g., 10 transferred shares), but the detected payload data comprises a detected stock transfer agreement comprising a second stock transfer attribute indicative of a second amount of transferred shares (e.g., 10,000 transferred shares) different from the first amount of transferred shares, the tampering alert control signal may indicate that the fictitious stock transfer agreement has been tampered with. In some embodiments, the apparatus 200 may generate the QC detection alert control signal as described in more detail with reference to FIGS. 1, 2, and 7.

Optionally, the apparatus 200 includes means, such as the cryptographic circuitry 216 or the like, for generating a QC detection public cryptography key certificate (e.g., a fictitious public cryptography key certificate) based on the public cryptographic key and the QC detection digital signature. In some embodiments, the apparatus 200 may be configured to transmit the QC detection public cryptography key certificate to a remote device in an external data environment, such as a publicly accessible certificate authority, database, or content provider. In some embodiments, the apparatus 200 may be configured to receive a request for the QC detection public cryptography key certificate from a remote device, such as a remote client device or a remote server device. In response to receipt of the request for the QC detection public cryptography key certificate, the apparatus 200 may be configured to generate a flagged QC detection public cryptography key certificate comprising the QC detection public cryptography key certificate and an elevated monitoring flag that identifies the QC detection data for an elevated level of monitoring by the data monitoring circuitry 228.

In some embodiments, operations 302, 304, 306, 308, 310, 312, and 314 may not necessarily occur in the order depicted in FIG. 3, and in some cases one or more of the operations depicted in FIG. 3 may occur substantially simultaneously, or additional steps may be involved before, after, or between any of the operations shown in FIG. 3.

Use Case 2: QC Detection Based on a Symmetric Key

Encrypted Based on an Asymmetric Key Pair

Figure 4:
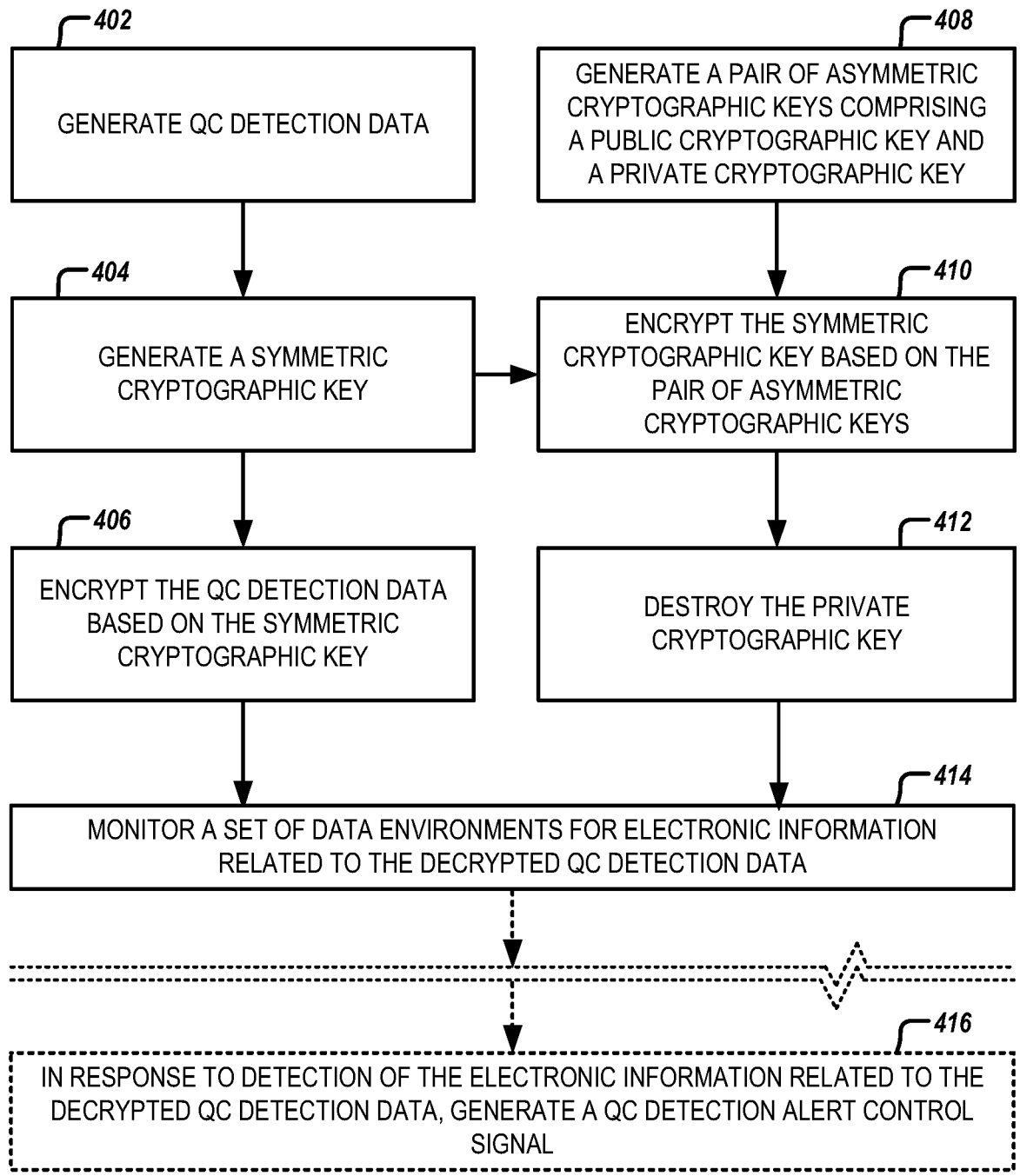
FIG. 4 illustrates an example flowchart for providing a second QC detection technique in accordance with some example embodiments described herein.

FIG. 4 illustrates an example flowchart 400 that contains example operations for providing a second QC detection technique based on a pair of asymmetric cryptographic keys (e.g., an RSA key pair) used to encrypt a symmetric cryptographic key (e.g., an AES key) in accordance with some example embodiments described herein. For example, the example flowchart 400 may contain, among other operations, example operations for using a pair of RSA cryptographic keys to encrypt an AES cryptographic key, destroying the RSA private key, and retaining the RSA public key. The operations illustrated in FIG. 4 may, for example, be performed by one or more components described with reference to QC detection system 102 shown in FIG. 1; by a server device 110, a client device 112, a database server device 114, or a remote server device 116 in communication with QC detection system 102; by apparatus 200 shown in FIG. 2; or by any combination thereof. In some embodiments, the various operations described in connection with FIG. 4 may be performed by the apparatus 200 by or through the use of one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, UI circuitry 232, any other suitable circuitry, and any combination thereof.

As shown by operation 402, the apparatus 200 includes means, such as the QC detection data generation circuitry 214 or the like, for generating QC detection data. In some embodiments, the apparatus 200 may generate the QC detection data as described in more detail with reference to FIGS. 1, 2, and 7.

As shown by operation 404, the apparatus 200 includes means, such as the cryptographic circuitry 216 or the like, for generating a symmetric cryptographic key. In some embodiments, the symmetric cryptographic key may be an AES cryptographic key. In some embodiments, the apparatus 200 may generate the symmetric cryptographic key as described in more detail with reference to FIGS. 1, 2, and 7.

As shown by operation 406, the apparatus 200 includes means, such as the cryptographic circuitry 216 or the like, for encrypting the QC detection data based on the symmetric cryptographic key. In some embodiments, the apparatus 200 may encrypt the QC detection data as described in more detail with reference to FIGS. 1, 2, and 7.

As shown by operation 408, the apparatus 200 includes means, such as the cryptographic circuitry 216 or the like, for generating a pair of asymmetric cryptographic keys comprising a public cryptographic key and a private cryptographic key. In some embodiments, the pair of asymmetric cryptographic keys may be a pair of RSA cryptographic keys. In some embodiments, the apparatus 200 may generate the pair of asymmetric cryptographic keys as described in more detail with reference to FIGS. 1, 2, and 7.

As shown by operation 410, the apparatus 200 includes means, such as the cryptographic circuitry 216 or the like, for encrypting the symmetric cryptographic key based on the pair of asymmetric cryptographic keys. In some embodiments, the apparatus 200 may encrypt an AES cryptographic key based on a pair of RSA cryptographic keys. In some embodiments, the apparatus 200 may encrypt the symmetric cryptographic key as described in more detail with reference to FIGS. 1, 2, and 7.

As shown by operation 412, the apparatus 200 includes means, such as the cryptographic circuitry 216 or the like, for destroying the private cryptographic key. In some embodiments, the apparatus 200 may be configured to destroy the private cryptographic key by overwriting, or zeroizing, all instances of the private cryptographic key. In some embodiments, the apparatus 200 may be configured to generate an electronic confirmation signal indicating that the private cryptographic key has been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy the private cryptographic key as described in more detail with reference to FIGS. 1, 2, and 7.

As shown by operation 414, the apparatus 200 includes means, such as the data monitoring circuitry 228 or the like, for monitoring a set of data environments for electronic information related to the decrypted QC detection data. In some embodiments, the apparatus 200 may monitor the set of data environments for the electronic information related to the decrypted QC detection data as described in more detail with reference to FIGS. 1, 2, and 7.

Optionally, as shown by optional operation 416, the apparatus 200 includes means, such as the data monitoring circuitry 228 or the like, for generating a QC detection alert control signal in response to detection of the electronic information related to the decrypted QC detection data. In some embodiments, the data monitoring circuitry 228 may be configured to detect electronic information related to the decrypted QC detection data, wherein the detected electronic information related to the decrypted QC detection data comprises decrypted QC detection data. In response to detection of decrypted QC detection data, the data monitoring circuitry 228 may be configured to generate a QC detection alert control signal indicating that a quantum computer having a particular set of capabilities was used to retrieve the symmetric cryptographic key (e.g., by implementing Shor's algorithm to retrieve the private key used to encrypt the symmetric cryptographic key) and decrypt the encrypted QC detection data. In some embodiments, the apparatus 200 may generate the QC detection alert control signal as described in more detail with reference to FIGS. 1, 2, and 7.

Optionally, the apparatus 200 includes means, such as the cryptographic circuitry 216 or the like, for generating a QC detection public cryptography key certificate (e.g., a fictitious public cryptography key certificate) based on the public cryptographic key. In some embodiments, the apparatus 200 may be configured to transmit the QC detection public cryptography key certificate to a remote device in an external data environment, such as a publicly accessible certificate authority, database, or content provider. In some embodiments, the apparatus 200 may be configured to receive a request for the QC detection public cryptography key certificate from a remote device, such as a remote client device or a remote server device. In response to receipt of the request for the QC detection public cryptography key certificate, the apparatus 200 may be configured to generate a flagged QC detection public cryptography key certificate comprising the QC detection public cryptography key certificate and an elevated monitoring flag that identifies the QC detection data for an elevated level of monitoring by the data monitoring circuitry 228.

In some embodiments, operations 402, 404, 406, 408, 410, 412, 414, and 416 may not necessarily occur in the order depicted in FIG. 4, and in some cases one or more of the operations depicted in FIG. 4 may occur substantially simultaneously, or additional steps may be involved before, after, or between any of the operations shown in FIG. 4.

Use Case 3: QC Detection Based on a Symmetric Key

Generated Based on an Asymmetric Key Pair

Figure 5:
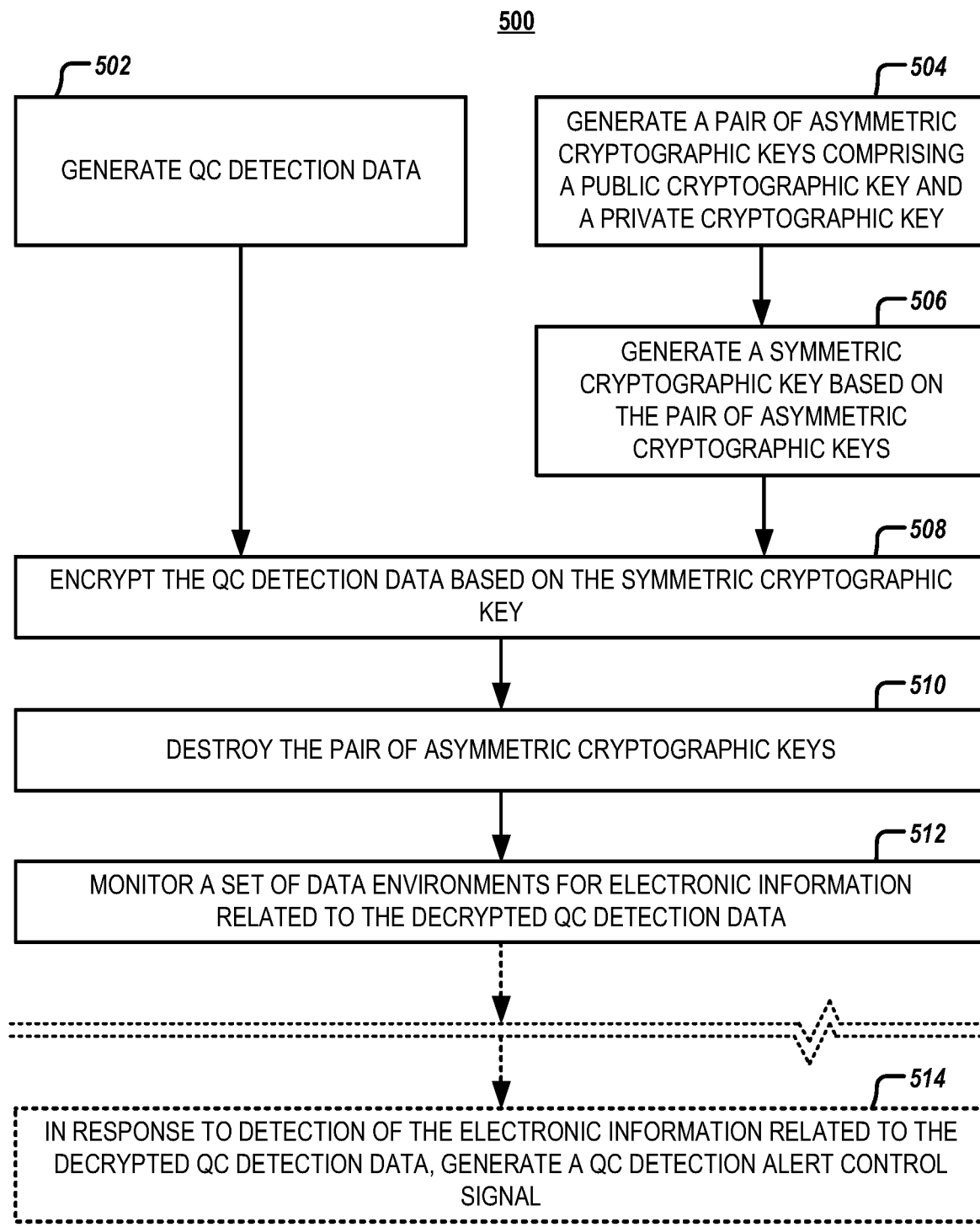
FIG. 5 illustrates an example flowchart for providing a third QC detection technique in accordance with some example embodiments described herein.

FIG. 5 illustrates an example flowchart 500 that contains example operations for providing a third QC detection technique based on a symmetric cryptographic key (e.g., an AES key) generated based on a pair of asymmetric cryptographic keys (e.g., a DH key pair) in accordance with some example embodiments described herein. For example, the example flowchart 500 may contain, among other operations, example operations for using a pair of DH cryptographic keys to generate an AES cryptographic key and destroying both the DH private key and the DH public key. The operations illustrated in FIG. 5 may, for example, be performed by one or more components described with reference to QC detection system 102 shown in FIG. 1; by a server device 110, a client device 112, a database server device 114, or a remote server device 116 in communication with QC detection system 102; by apparatus 200 shown in FIG. 2; or by any combination thereof. In some embodiments, the various operations described in connection with FIG. 5 may be performed by the apparatus 200 by or through the use of one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, UI circuitry 232, any other suitable circuitry, and any combination thereof.

As shown by operation 502, the apparatus 200 includes means, such as the QC detection data generation circuitry 214 or the like, for generating QC detection data. In some embodiments, the apparatus 200 may generate the QC detection data as described in more detail with reference to FIGS. 1, 2, and 7.

As shown by operation 504, the apparatus 200 includes means, such as the cryptographic circuitry 216 or the like, for generating a pair of asymmetric cryptographic keys comprising a public cryptographic key and a private cryptographic key. In some embodiments, the pair of asymmetric cryptographic keys may be a pair of DH cryptographic keys. In some embodiments, the apparatus 200 may generate the pair of asymmetric cryptographic keys as described in more detail with reference to FIGS. 1, 2, and 7.

As shown by operation 506, the apparatus 200 includes means, such as the cryptographic circuitry 216 or the like, for generating a symmetric cryptographic key based on the pair of asymmetric cryptographic keys. In some embodiments, the symmetric cryptographic key may be an AES cryptographic key. For example, the apparatus 200 may generate an AES cryptographic key based on a pair of DH cryptographic keys. In some embodiments, the apparatus 200 may generate the symmetric cryptographic key as described in more detail with reference to FIGS. 1, 2, and 7.

As shown by operation 508, the apparatus 200 includes means, such as the cryptographic circuitry 216 or the like, for encrypting the QC detection data based on the symmetric cryptographic key. In some embodiments, the apparatus 200 may encrypt the QC detection data as described in more detail with reference to FIGS. 1, 2, and 7.

As shown by operation 510, the apparatus 200 includes means, such as the cryptographic circuitry 216 or the like, for destroying the pair of asymmetric cryptographic keys. In some embodiments, the apparatus 200 may be configured to destroy the pair of asymmetric cryptographic keys by overwriting, or zeroizing, all instances of the private cryptographic key and the public cryptographic key. In some embodiments, the apparatus 200 may be configured to generate an electronic confirmation signal indicating that the pair of asymmetric cryptographic keys has been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy the private cryptographic key as described in more detail with reference to FIGS. 1, 2, and 7.

As shown by operation 512, the apparatus 200 includes means, such as the data monitoring circuitry 228 or the like, for monitoring a set of data environments for electronic information related to the decrypted QC detection data. In some embodiments, the apparatus 200 may monitor the set of data environments for the electronic information related to the encrypted QC detection data as described in more detail with reference to FIGS. 1, 2, and 7.

Optionally, as shown by optional operation 514, the apparatus 200 includes means, such as the data monitoring circuitry 228 or the like, for generating a QC detection alert control signal in response to detection of the electronic information related to the encrypted QC detection data. In some embodiments, the apparatus 200 may generate the QC detection alert control signal as described in more detail with reference to FIGS. 1, 2, and 7.

In some embodiments, operations 502, 504, 506, 508, 510, 512, and 514 may not necessarily occur in the order depicted in FIG. 5, and in some cases one or more of the operations depicted in FIG. 5 may occur substantially simultaneously, or additional steps may be involved before, after, or between any of the operations shown in FIG. 5.

Use Case 4: QC Detection Based on Multiple Cryptographic Techniques

Having Staggered Key Sizes

Figure 6:
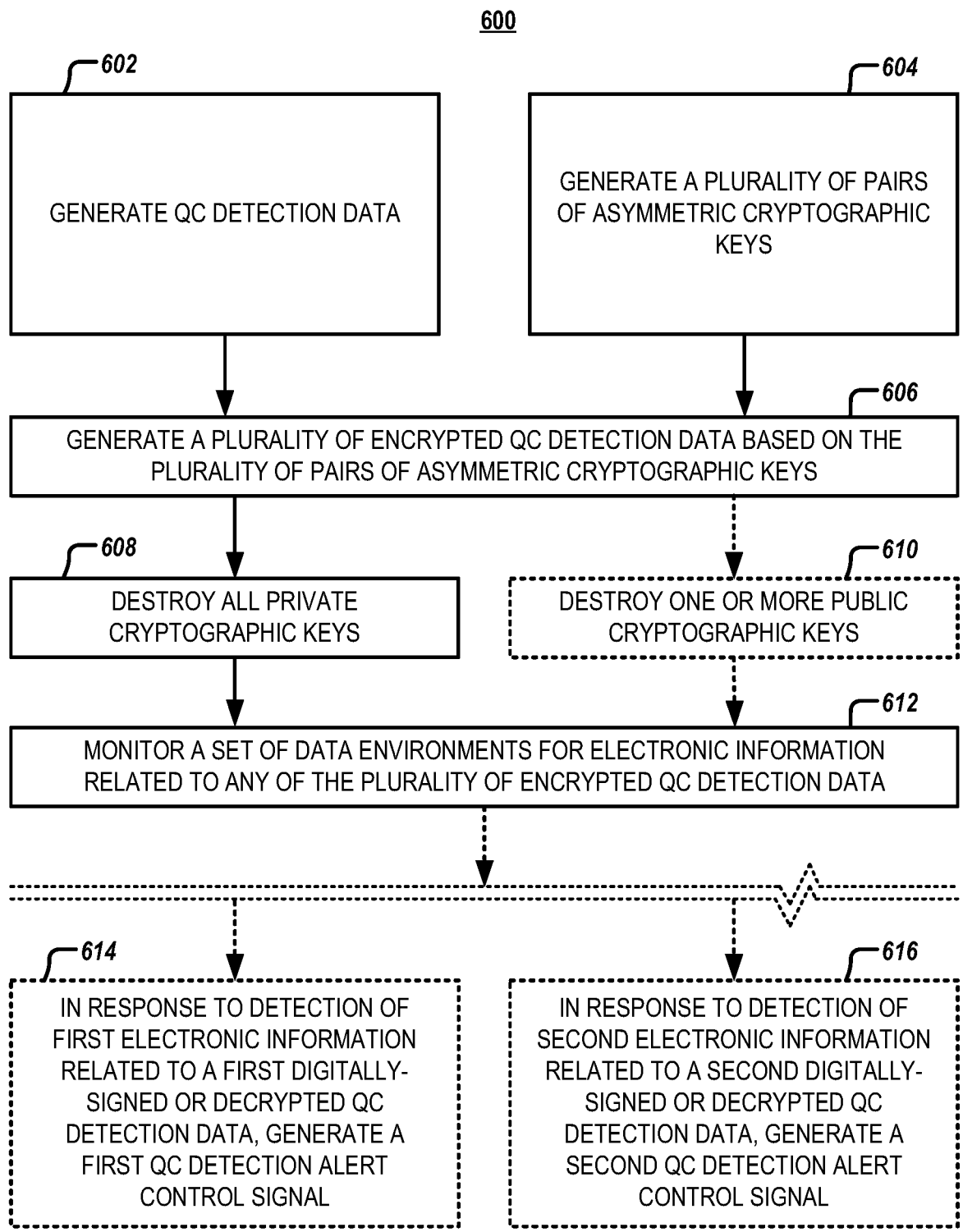
FIG. 6 illustrates an example flowchart for providing a fourth QC detection technique in accordance with some example embodiments described herein.

FIG. 6 illustrates an example flowchart 600 that contains example operations for providing a fourth QC detection technique based on multiple different cryptographic techniques (e.g., RSA as described with reference to FIGS. 3 and 4; DH, ECDH, or both as described with reference to FIG. 5; AES as described with reference to FIGS. 4 and 5) having staggered key sizes (e.g., RSA-2048, RSA-3072; RSA-4096; DH-2048, DH-3072, DH-4096; ECDH-256, ECDH-384, ECDH-521; AES-192, AES-256, AES-512) in accordance with some example embodiments described herein. The operations illustrated in FIG. 6 may, for example, be performed by one or more components described with reference to QC detection system 102 shown in FIG. 1; by a server device 110, a client device 112, a database server device 114, or a remote server device 116 in communication with QC detection system 102; by apparatus 200 shown in FIG. 2; or by any combination thereof. In some embodiments, the various operations described in connection with FIG. 6 may be performed by the apparatus 200 by or through the use of one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, UI circuitry 232, any other suitable circuitry, and any combination thereof.

As shown by operation 602, the apparatus 200 includes means, such as the QC detection data generation circuitry 214 or the like, for generating QC detection data. In some embodiments, the apparatus 200 may generate the QC detection data as described in more detail with reference to FIGS. 1-5 and 7.

As shown by operation 604, the apparatus 200 includes means, such as the cryptographic circuitry 216 or the like, for generating a plurality of pairs of asymmetric cryptographic keys, wherein each pair of asymmetric cryptographic keys in the plurality of pairs of asymmetric cryptographic keys comprises a respective public cryptographic key and a respective private cryptographic key. In some embodiments, each of the plurality of pairs of asymmetric cryptographic keys may correspond to a different cryptostrength, be associated with a different cryptographic technique, or both such that the apparatus 200 may determine the performance capabilities of a detected quantum computer. For example, the plurality of pairs of asymmetric cryptographic keys may comprise: a first pair of asymmetric cryptographic keys comprising a pair of 2048-bit RSA cryptographic keys; a second pair of asymmetric cryptographic keys comprising a pair of 3072-bit RSA cryptographic keys; a third pair of asymmetric cryptographic keys comprising a pair of 4096-bit RSA cryptographic keys; a fourth pair of asymmetric cryptographic keys comprising a pair of 2048-bit DH cryptographic keys; a fifth pair of asymmetric cryptographic keys comprising a pair of 3072-bit DH cryptographic keys; a sixth pair of asymmetric cryptographic keys comprising a pair of 4096-bit DH cryptographic keys; a seventh pair of asymmetric cryptographic keys comprising a pair of 256-bit ECDH cryptographic keys; an eighth pair of asymmetric cryptographic keys comprising a pair of 384-bit ECDH cryptographic keys; and a ninth pair of asymmetric cryptographic keys comprising a pair of 521-bit ECDH cryptographic keys. In some embodiments, the apparatus 200 may generate the plurality of pairs of asymmetric cryptographic keys as described in more detail with reference to FIGS. 1-5 and 7.

As shown by operation 606, the apparatus 200 includes means, such as the cryptographic circuitry 216 or the like, for generating a plurality of encrypted QC detection data based on the plurality of pairs of asymmetric cryptographic keys, wherein each encrypted QC detection data in the plurality of encrypted QC detection data is generated based on a respective pair of asymmetric cryptographic keys. In some embodiments, the apparatus 200 may generate the plurality of encrypted QC detection data based on: an RSA or RSA-PSS cryptographic technique as described with reference to FIGS. 3 and 4; a DH or ECDH cryptographic technique as described with reference to FIGS. 4 and 5; any other technique described herein; or any combination thereof. In some embodiments, as described with reference to FIGS. 4 and 5, the apparatus 200 may generate a subset of the plurality of encrypted QC detection data based on a plurality of symmetric cryptographic keys. In some embodiments, each of the plurality of symmetric cryptographic keys may correspond to a different cryptostrength, be associated with a different cryptographic technique, or both such that the apparatus 200 may determine the performance capabilities of a detected quantum computer. For example, the plurality of symmetric cryptographic keys may comprise: a first symmetric cryptographic key comprising a 192-bit AES cryptographic key; a second symmetric cryptographic key comprising a 256-bit AES cryptographic key; and a third symmetric cryptographic key comprising a 512-bit AES cryptographic key. In some embodiments, the apparatus 200 may generate the plurality of encrypted QC detection data as described in more detail with reference to FIGS. 1-5 and 7.

As shown by operation 608, the apparatus 200 includes means, such as the cryptographic circuitry 216 or the like, for destroying all of the private cryptographic keys in the plurality of pairs of asymmetric cryptographic keys. In some embodiments, the apparatus 200 may be configured to destroy all of the private cryptographic keys by overwriting, or zeroizing, all instances of the private cryptographic keys. In some embodiments, the apparatus 200 may be configured to generate an electronic confirmation signal indicating that all of the private cryptographic keys have been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy all of the private cryptographic keys as described in more detail with reference to FIGS. 1-5 and 7.

As shown by operation 610, the apparatus 200 includes means, such as the cryptographic circuitry 216 or the like, for destroying one or more of the public cryptographic keys in the plurality of pairs of asymmetric cryptographic keys. In some embodiments, the apparatus 200 may be configured to destroy one or more of the public cryptographic keys by overwriting, or zeroizing, all instances of the one or more public cryptographic keys. In some embodiments, the apparatus 200 may be configured to generate an electronic confirmation signal indicating that the one or more public cryptographic keys have been destroyed and transmit the electronic confirmation signal to a QC detection storage device, a remote device (e.g., a server device 110, a client device 112, a database server device 114, or a remote server device 116), any other suitable device, or a combination thereof. In some embodiments, the apparatus 200 may destroy one or more of the public cryptographic keys as described in more detail with reference to FIGS. 1-5 and 7.

As shown by operation 612, the apparatus 200 includes means, such as the data monitoring circuitry 228 or the like, for monitoring a set of data environments for electronic information related to any of the plurality of encrypted QC detection data. In some embodiments, the apparatus 200 may monitor the set of data environments for the electronic information related to any of the plurality of encrypted QC detection data as described in more detail with reference to FIGS. 1-5 and 7.

Optionally, as shown by optional operation 614, the apparatus 200 includes means, such as the data monitoring circuitry 228 or the like, for generating a first QC detection alert control signal in response to detection of first electronic information related to a first encrypted QC detection data. In some embodiments, the apparatus 200 may generate the first QC detection alert control signal as described in more detail with reference to FIGS. 1-5 and 7.

Optionally, as shown by optional operation 616, the apparatus 200 includes means, such as the data monitoring circuitry 228 or the like, for generating a second QC detection alert control signal in response to detection of second electronic information related to a second encrypted QC detection data. In one illustrative example, wherein the QC detection data is first QC detection data, the pair of asymmetric cryptographic keys is a first pair of asymmetric cryptographic keys having a first key length for a first cryptographic technique (e.g., RSA-3072), wherein the public cryptographic key is a first public cryptographic key, wherein the private cryptographic key is a first private cryptographic key, wherein the encrypted QC detection data is first encrypted QC detection data, wherein the electronic information related to the encrypted or unencrypted QC detection data is first electronic information related to the encrypted or unencrypted first QC detection data, and wherein the QC detection alert control signal is a first QC detection alert control signal, the cryptographic circuitry 216 may be configured to: generate a second pair of asymmetric cryptographic keys having a second key length for the first cryptographic technique (e.g., RSA-4096), wherein the second pair of asymmetric cryptographic keys comprises a second public cryptographic key and a second private cryptographic key, and wherein the second key length (e.g., 4096 bits) is different from the first key length (e.g., 3072 bits); generate second encrypted QC detection data based on the second pair of asymmetric cryptographic keys; and destroy the second private cryptographic key. Subsequently, the data monitoring circuitry 228 may be configured to monitor the set of data environments for second electronic information related to the second encrypted or unencrypted QC detection data and, in response to detection of the second electronic information related to the encrypted or unencrypted QC detection data, generate a second QC detection alert control signal (e.g., RSA-4096 has been compromised by a quantum computer and thus is now longer secure) different from the first QC detection alert control signal (e.g., RSA-3072 has been compromised by a quantum computer and thus is now longer secure). In some embodiments, the apparatus 200 may generate the second QC detection alert control signal as described in more detail with reference to FIGS. 1-5 and 7.

In some embodiments, operations 602, 604, 606, 608, 610, 612, 614, and 616 may not necessarily occur in the order depicted in FIG. 6, and in some cases one or more of the operations depicted in FIG. 6 may occur substantially simultaneously, or additional steps may be involved before, after, or between any of the operations shown in FIG. 6.

Having described specific components of example devices and circuitries involved in various embodiments contemplated herein, example procedures for data leakage, tampering, and QC detection are described below in connection with FIG. 7.

Example Operations for QC Detection

Figure 7:
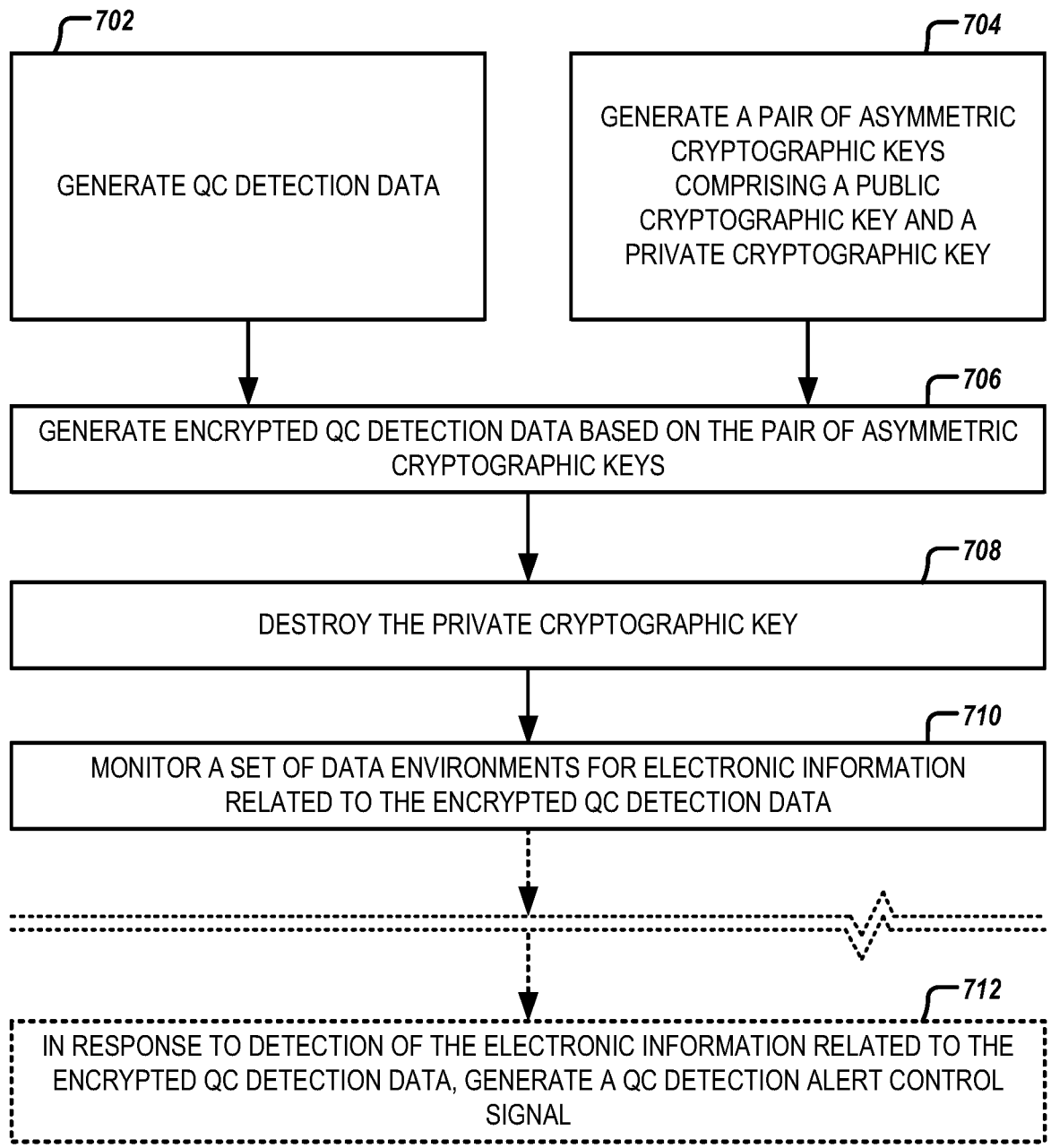
FIG. 7 illustrates an example flowchart for providing an example flowchart for providing QC detection in accordance with some example embodiments described herein.

FIG. 7 illustrates an example flowchart 700 that contains example operations for QC detection in accordance with some example embodiments described herein. The operations illustrated in FIG. 7 may, for example, be performed by one or more components described with reference to QC detection system 102 shown in FIG. 1; by a server device 110, a client device 112, a database server device 114, or a remote server device 116 in communication with QC detection system 102; by apparatus 200 shown in FIG. 2; or by any combination thereof. In some embodiments, the various operations described in connection with FIG. 7 may be performed by the apparatus 200 by or through the use of one or more of processing circuitry 202, memory 204, input-output circuitry 206, PQC callback circuitry 207, communications circuitry 208 (including, but not limited to, classical communications circuitry 210 and quantum communications circuitry 212), QC detection data generation circuitry 214, cryptographic circuitry 216, data attribute generation circuitry 218, risk profile generation circuitry 220, data envelope generation circuitry 222, data structure generation circuitry 224, data storage circuitry 226, data monitoring circuitry 228, machine learning circuitry 230, UI circuitry 232, any other suitable circuitry, and any combination thereof.

As shown by operation 702, the apparatus 200 includes means, such as the QC detection data generation circuitry 214 or the like, for generating QC detection data. In some embodiments, the apparatus 200 may generate the QC detection data as described in more detail with reference to FIGS. 1-6.

As shown by operation 704, the apparatus 200 includes means, such as the cryptographic circuitry 216 or the like, for generating a pair of asymmetric cryptographic keys comprising a public cryptographic key and a private cryptographic key. In some embodiments, the apparatus 200 may generate the pair of asymmetric cryptographic keys as described in more detail with reference to FIGS. 1-6.

As shown by operation 706, the apparatus 200 includes means, such as the cryptographic circuitry 216 or the like, for generating encrypted QC detection data based on the pair of asymmetric cryptographic keys. In some embodiments, the apparatus 200 may generate the encrypted QC detection data as described in more detail with reference to FIGS. 1-6.

As shown by operation 708, the apparatus 200 includes means, such as the cryptographic circuitry 216 or the like, for destroying the private cryptographic key. In some embodiments, the apparatus 200 may destroy the private cryptographic key as described in more detail with reference to FIGS. 1-6.

As shown by operation 710, the apparatus 200 includes means, such as the data monitoring circuitry 228 or the like, for monitoring a set of data environments for electronic information related to the encrypted QC detection data. In some embodiments, the apparatus 200 may monitor the set of data environments for the electronic information related to the encrypted QC detection data as described in more detail with reference to FIGS. 1-6.

Optionally, as shown by optional operation 712, the apparatus 200 includes means, such as the data monitoring circuitry 228 or the like, for generating a QC detection alert control signal in response to detection of the electronic information related to the encrypted QC detection data. In some embodiments, the apparatus 200 may generate the QC detection alert control signal as described in more detail with reference to FIGS. 1-6.

In some embodiments, operations 702, 704, 706, 708, 710, and 712 may not necessarily occur in the order depicted in FIG. 7, and in some cases one or more of the operations depicted in FIG. 7 may occur substantially simultaneously, or additional steps may be involved before, after, or between any of the operations shown in FIG. 7.

As noted above, methods, apparatuses, systems, and computer program products are described herein that provide for QC detection that, in some instances, provides for improved PQC for migrating classical information systems to quantum-resistant information systems using one or more of the PQC cryptographic techniques described herein. By doing so, data owners and hosting services are able to avoid the traditional problems surrounding migrating classical information systems to quantum-resistant information systems. For instance, through performance of the above operations, data owners and hosting services can use the QC detection system described herein to detect realized QC threats and, in response, identify PQC cryptographic techniques for reducing the attack surface of their cryptographic operations. Further, example embodiments described herein provide for migration of large volumes of data to quantum-resistant information systems that utilize PQC cryptographic techniques in a faster, cheaper, and less computing resource and data intensive manner. Accordingly, example embodiments described herein facilitate and streamline these migration processes so that data owners and hosting services may more quickly and easily migrate and maintain their data in a quantum-resistant data storage system as increasing quantum computing capabilities are realized. Moreover, in some embodiments, example embodiments described herein facilitate the upgrading of complex, high volume data storage systems to use quantum-resistant PQC cryptographic techniques in a faster, cheaper, and less data and resource intensive manner.

FIGS. 3-7 thus illustrate flowcharts describing the operation of various systems (e.g., QC detection system 102 described with reference to FIG. 1), apparatuses (e.g., apparatus 200 described with reference to FIG. 2), methods (e.g., flowchart 300 described with reference to FIG. 3; flowchart 400 described with reference to FIG. 4; flowchart 500 described with reference to FIG. 5; flowchart 600 described with reference to FIG. 6; flowchart 700 described with reference to FIG. 7), and computer program products according to example embodiments contemplated herein. It will be understood that each operation of the flowcharts, and combinations of operations in the flowcharts, may be implemented by various means, such as hardware, firmware, processor, circuitry, and/or other devices associated with execution of software including one or more computer program instructions. For example, one or more of the procedures described above may be performed by execution of computer program instructions. In this regard, the computer program instructions that, when executed, cause performance of the procedures described above may be stored by a memory (e.g., memory 204) of an apparatus (e.g., apparatus 200) and executed by a processor (e.g., processing circuitry 202) of the apparatus. As will be appreciated, any such computer program instructions may be loaded onto a computer or other programmable apparatus (e.g., hardware) to produce a machine, such that the resulting computer or other programmable apparatus implements the functions specified in the flowchart operations. These computer program instructions may also be stored in a computer-readable memory that may direct a computer or other programmable apparatus to function in a particular manner, such that the instructions stored in the computer-readable memory produce an article of manufacture, the execution of which implements the functions specified in the flowchart operations. The computer program instructions may also be loaded onto a computer or other programmable apparatus to cause a series of operations to be performed on the computer or other programmable apparatus to produce a computer-implemented process such that the instructions executed on the computer or other programmable apparatus provide operations for implementing the functions specified in the flowchart operations.

The flowchart operations described with reference to FIGS. 3-7 support combinations of means for performing the specified functions and combinations of operations for performing the specified functions. It will be understood that one or more operations of the flowcharts, and combinations of operations in the flowcharts, may be implemented by special purpose hardware-based computer systems which perform the specified functions, or combinations of special purpose hardware and computer instructions.

CONCLUSION

While various embodiments in accordance with the principles disclosed herein have been shown and described above, modifications thereof may be made by one skilled in the art without departing from the teachings of the disclosure. The embodiments described herein are representative only and are not intended to be limiting. Many variations, combinations, and modifications are possible and are within the scope of the disclosure. Alternative embodiments that result from combining, integrating, and/or omitting features of the embodiment(s) are also within the scope of the disclosure. Accordingly, the scope of protection is not limited by the description set out above, but is defined by the claims which follow, that scope including all equivalents of the subject matter of the claims. Each and every claim is incorporated as further disclosure into the specification and the claims are embodiment(s) of the present disclosure. Furthermore, any advantages and features described above may relate to specific embodiments but shall not limit the application of such issued claims to processes and structures accomplishing any or all of the above advantages or having any or all of the above features.

In addition, the section headings used herein are provided for consistency with the suggestions under 37 C.F.R. § 1.77 or to otherwise provide organizational cues. These headings shall not limit or characterize the disclosure set out in any claims that may issue from this disclosure. For instance, a description of a technology in the "Background" is not to be construed as an admission that certain technology is prior art to any disclosure in this disclosure. Neither is the "Summary" to be considered as a limiting characterization of the disclosure set forth in issued claims. Furthermore, any reference in this disclosure to "disclosure" or "embodiment" in the singular should not be used to argue that there is only a single point of novelty in this disclosure. Multiple embodiments of the present disclosure may be set forth according to the limitations of the multiple claims issuing from this disclosure, and such claims accordingly define the disclosure, and their equivalents, that are protected thereby. In all instances, the scope of the claims shall be considered on their own merits in light of this disclosure but should not be constrained by the headings set forth herein.

Also, techniques, systems, subsystems, and methods described and illustrated in the various embodiments as discrete or separate may be combined or integrated with other systems, modules, techniques, or methods without departing from the scope of the present disclosure. Other devices or components shown or discussed as coupled to, or in communication with, each other may be indirectly coupled through some intermediate device or component, whether electrically, mechanically, or otherwise. Other examples of changes, substitutions, and alterations are ascertainable by one skilled in the art and could be made without departing from the scope disclosed herein.

Many modifications and other embodiments of the disclosure set forth herein will come to mind to one skilled in the art to which these embodiments pertain having the benefit of teachings presented in the foregoing descriptions and the associated figures. Although the figures only show certain components of the apparatus and systems described herein, it is understood that various other components may be used in conjunction with the QC detection system. Therefore, it is to be understood that the disclosure is not to be limited to the specific embodiments disclosed and that modifications and other embodiments are intended to be included within the scope of the appended claims. For example, the various elements or components may be combined, rearranged, or integrated in another system or certain features may be omitted or not implemented. Moreover, the steps in any method described above may not necessarily occur in the order depicted in the accompanying figures, and in some cases one or more of the steps depicted may occur substantially simultaneously, or additional steps may be involved. Although specific terms are employed herein, they are used in a generic and descriptive sense only and not for purposes of limitation.

What is claimed is:

1. A system for quantum computing (QC) detection, the system comprising:
   QC detection data generation circuitry configured to:
     generate QC detection data;
   cryptographic circuitry configured to:
     generate a pair of asymmetric cryptographic keys comprising a public cryptographic key and a private cryptographic key;
     generate a QC detection digital signature based on the pair of asymmetric cryptographic keys;
     generate encrypted QC detection data based on the QC detection digital signature;
     destroy the private cryptographic key;
     generate a QC detection public cryptography key certificate based on the public cryptographic key and the QC detection digital signature;
     transmit the QC detection public cryptography key certificate to a remote device;
     receive a request for the QC detection public cryptography key certificate; and
     generate a flagged QC detection public cryptography key certificate comprising the QC detection public cryptography key certificate and an elevated monitoring flag that identifies the QC detection data for an elevated level of monitoring; and
   data monitoring circuitry configured to:
     monitor a set of data environments for electronic information related to the encrypted QC detection data.

2. The system of claim 1, wherein the data monitoring circuitry is further configured to generate a QC detection alert control signal in response to detection of the electronic information related to the encrypted QC detection data.

3. The system of claim 1, wherein the QC detection data comprises a fictitious code-signing certificate.

4. The system of claim 1, wherein the pair of asymmetric cryptographic keys is a pair of Rivest-Shamir-Adleman (RSA) asymmetric cryptographic keys comprising an RSA public cryptographic key and an RSA private cryptographic key.

5. The system of claim 1, wherein the pair of asymmetric cryptographic keys is a pair of Diffie-Hellman (DH) asymmetric cryptographic keys comprising a DH public cryptographic key and a DH private cryptographic key.

6. The system of claim 1, wherein the cryptographic circuitry is configured to double encrypt the encrypted QC detection data based on a PQC cryptographic technique, and wherein the system further comprises data storage circuitry configured to store the double encrypted QC detection data in a QC detection storage device.

7. The system of claim 1, wherein the cryptographic circuitry is configured to not transmit the encrypted QC detection data, and wherein the data monitoring circuitry configured to:
   in response to detection of the electronic information related to the encrypted QC detection data, generate a leakage alert control signal.

8. The system of claim 1, wherein the electronic information related to the encrypted QC detection data comprises decrypted QC detection data that is the same as the QC detection data.

9. The system of claim 1, wherein the encrypted QC detection data comprises the QC detection data that has been digitally signed based on a digital signature, and wherein the electronic information related to the encrypted QC detection data comprises payload data that has been digitally signed based on the digital signature.

10. The system of claim 1, wherein the data monitoring circuitry is configured to:
    detect electronic information related to the encrypted QC detection data, wherein the detected electronic information related to the encrypted QC detection data comprises a detected digital signature; and
    verify the detected digital signature based on the public cryptographic key.

11. The system of claim 10, wherein the detected electronic information related to the encrypted QC detection data further comprises detected payload data that has been digitally signed based on the detected digital signature, wherein the detected digital signature is the same as the QC detection digital signature, wherein the detected payload data is different from the QC detection data, and wherein the data monitoring circuitry is further configured to:
    generate a tampering alert control signal.

12. The system of claim 1, wherein the cryptographic circuitry is configured to:
    generate a symmetric cryptographic key; and
    encrypt the symmetric cryptographic key based on the pair of asymmetric cryptographic keys.

13. The system of claim 12, wherein the cryptographic circuitry is configured to:
    encrypt the QC detection data based on the symmetric cryptographic key.

14. The system of claim 12, wherein the symmetric cryptographic key is an Advanced Encryption Standard (AES) symmetric cryptographic key, and wherein the pair of asymmetric cryptographic keys is a pair of RSA cryptographic keys.

15. The system of claim 1, wherein the cryptographic circuitry is configured to:
    generate a symmetric cryptographic key based on the pair of asymmetric cryptographic keys; and
    encrypt the QC detection data based on the symmetric cryptographic key.

16. The system of claim 15, wherein the symmetric cryptographic key is an Advanced Encryption Standard (AES) symmetric cryptographic key, and wherein the pair of asymmetric cryptographic keys is a pair of DH cryptographic keys.

17. A method for quantum computing (QC) detection, the method comprising:
- generating, by QC detection data generation circuitry, QC detection data;
- generating, by cryptographic circuitry, a pair of asymmetric cryptographic keys comprising a public cryptographic key and a private cryptographic key;
- generating, by the cryptographic circuitry, a QC detection digital signature based on the pair of asymmetric cryptographic keys;
- generating, by the cryptographic circuitry, encrypted QC detection data based on the QC detection digital signature;
- destroying, by the cryptographic circuitry, the private cryptographic key;
- generating, by the cryptographic circuitry, a QC detection public cryptography key certificate based on the public cryptographic key and the QC detection digital signature;
- transmitting, by the cryptographic circuitry, the QC detection public cryptography key certificate to a remote device;
- receiving, by the cryptographic circuitry, a request for the QC detection public cryptography key certificate;
- generating, by the cryptographic circuitry, a flagged QC detection public cryptography key certificate comprising the QC detection public cryptography key certificate and an elevated monitoring flag that identifies the QC detection data for an elevated level of monitoring; and
- monitoring, by data monitoring circuitry, a set of data environments for electronic information related to the encrypted QC detection data.

18. The method of claim 17, further comprising generating, by the data monitoring circuitry, a QC detection alert control signal in response to detection of the electronic information related to the encrypted QC detection data.

19. A computer program product for quantum computing (QC) detection, the computer program product comprising at least one non-transitory computer-readable storage medium storing program instructions that, when executed, cause a system to:
- generate QC detection data;
- generate a pair of asymmetric cryptographic keys comprising a public cryptographic key and a private cryptographic key;
- generate a QC detection digital signature based on the pair of asymmetric cryptographic keys;
- generate encrypted QC detection data based on the QC detection digital signature;
- destroy the private cryptographic key;
- generate a QC detection public cryptography key certificate based on the public cryptographic key and the QC detection digital signature;
- transmit the QC detection public cryptography key certificate to a remote device;
- receive a request for the QC detection public cryptography key certificate;
- generate a flagged QC detection public cryptography key certificate comprising the QC detection public cryptography key certificate and an elevated monitoring flag that identifies the QC detection data for an elevated level of monitoring; and
- monitor a set of data environments for electronic information related to the encrypted QC detection data.

20. The computer program product according to claim 19, the computer program product comprising at least one non-transitory computer-readable storage medium storing program instructions that, when executed, further cause the system to generate a QC detection alert control signal in response to detection of the electronic information related to the encrypted QC detection data.

* * * * *